US012587710B2

(12) United States Patent (10) Patent No.: US 12,587,710 B2
Zhang et al. (45) Date of Patent: Mar. 24, 2026

(54) DATA PROCESSING METHOD AND APPARATUS, COMPUTER DEVICE, AND READABLE STORAGE MEDIUM

(71) Applicant: Tencent Technology (Shenzhen) Company Limited, Shenzhen (CN)

(72) Inventors: Tianchi Zhang, Shenzhen (CN); Yibin Zhang, Shenzhen (CN); Duo Yu, Shenzhen (CN); Yihong Cai, Shenzhen (CN); Xiaochen Huang, Shenzhen (CN); Nan Luo, Shenzhen (CN); Fushi Su, Shenzhen (CN); Jing Guo, Shenzhen (CN); Longfei Duan, Shenzhen (CN); Youhua He, Shenzhen (CN); Daozhen Zhong, Shenzhen (CN); Dong Shi, Shenzhen (CN); Fei Mao, Shenzhen (CN); Ning Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 83 days.

(21) Appl. No.: 18/612,963

(22) Filed: Mar. 21, 2024

(65) Prior Publication Data

US 2024/0298075 A1 Sep. 5, 2024

Related U.S. Application Data

(63) Continuation of application No. PCT/CN2023/083323, filed on Mar. 23, 2023.

(30) Foreign Application Priority Data

Jul. 22, 2022 (CN) .......................... 202210866570.3

(51) Int. Cl.
H04N 21/4788 (2011.01)
H04N 21/472 (2011.01)

(52) U.S. Cl.
CPC ... H04N 21/4788 (2013.01); H04N 21/47217 (2013.01)

(58) Field of Classification Search
CPC ......... H04N 21/4788; H04N 21/47217; H04N 21/472
(Continued)

(56) References Cited

U.S. PATENT DOCUMENTS

2012/0311618 A1* 12/2012 Blaxland ................ H04H 60/73
725/9
2014/0325557 A1* 10/2014 Evans .................. H04N 21/458
725/32
(Continued)

FOREIGN PATENT DOCUMENTS

CN 105898627 A * 8/2016 ........... H04N 21/858
CN 110572716 A 12/2019
(Continued)

OTHER PUBLICATIONS

Weitenberner, Christian, Embedded Video Commentary, May 20, 2014, The IP.com Journal (Year: 2014).*
Tencent Technology, ISR, PCT/CN2023/083323, May 17, 2023, 3 pgs.

*Primary Examiner* — Cynthia M Fogg
(74) *Attorney, Agent, or Firm* — Morgan, Lewis & Bockius LLP

(57) ABSTRACT

Embodiments of this application provide a method for annotating video data performed by a computer device. The method includes: displaying target video data in a video application; displaying annotated media data in the video application in response to a trigger operation performed on a progress time point annotation function in the video
(Continued)

application, the annotated media data being media data associated with a current progress time point, the current progress time point being a progress time point corresponding to the trigger operation to which the target video data is played; and sharing the annotated media data with another user in response to a confirmation operation performed on the annotated media data, the annotated media data enabling the second user to perform a progress jump on the target video data based on the current progress time point. Through this application, efficiency of video progress positioning can be improved.

20 Claims, 28 Drawing Sheets

(58) Field of Classification Search
       USPC ........................................................... 725/16
       See application file for complete search history.

(56) References Cited

U.S. PATENT DOCUMENTS

| | | | | |
|---|---|---|---|---|
| 2015/0373077 A1* | 12/2015 | Ramamurthi | ........... | H04L 67/02 |
| | | | | 709/219 |
| 2018/0254065 A1* | 9/2018 | Chen | ..................... | G11B 27/34 |
| 2020/0067867 A1* | 2/2020 | Tal | .......................... | H04L 51/18 |
| 2021/0342385 A1 | 11/2021 | Yu | | |
| 2022/0038783 A1* | 2/2022 | Wee | ................... | H04N 21/8455 |

FOREIGN PATENT DOCUMENTS

| | | | | | |
|---|---|---|---|---|---|
| CN | 110933509 A | | 3/2020 | | |
| CN | 113194349 A | | 7/2021 | | |
| CN | 113343027 A | * | 9/2021 | ............. | G06F 16/74 |
| CN | 114245218 A | | 3/2022 | | |
| CN | 115238125 A | | 10/2022 | | |

* cited by examiner

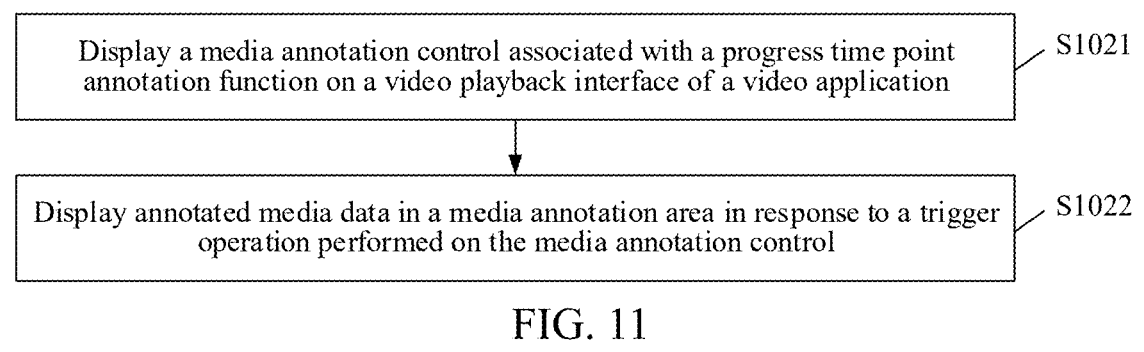

Display a media annotation control associated with a progress time point annotation function on a video playback interface of a video application — S1021

Display annotated media data in a media annotation area in response to a trigger operation performed on the media annotation control — S1022

FIG. 11

Display posted annotated media data on a media data display interface of a video application    S201

Perform a progress jump on to-be-played video data in the video application based on a current progress time point in response to a trigger operation performed on the posted annotated media data    S202

DATA PROCESSING METHOD AND APPARATUS, COMPUTER DEVICE, AND READABLE STORAGE MEDIUM

CROSS-REFERENCE TO RELATED APPLICATIONS

This application is a continuation application of PCT Patent Application No. PCT/CN2023/083323, entitled "DATA PROCESSING METHOD AND APPARATUS, COMPUTER DEVICE, AND READABLE STORAGE MEDIUM" filed on Mar. 23, 2023, which claims priority to Chinese Patent Application No. 202210866570.3, entitled "DATA PROCESSING METHOD AND APPARATUS, COMPUTER DEVICE, AND READABLE STORAGE MEDIUM" filed with the China National Intellectual Property Administration on Jul. 22, 2022, all of which is incorporated by reference in its entirety.

FIELD OF THE TECHNOLOGY

This application relates to the field of computer technologies, and in particular, to a data processing technology.

BACKGROUND OF THE DISCLOSURE

As multimedia technologies develop, videos become main carriers for information obtaining and entertainment of people in daily life. During browsing of comment information associated with video data (for example, target video data) by a user, if the user views comment information (for example, a comment P) of interest (that is, the user has the same feeling on or does not agree with the comment information), the user may want to watch video clips in the target video data associated with the comment P.

Currently, if the user wants to watch the video clips associated with the comment P, the user needs to actively open the target video data and manually adjusts a video progress bar of the target video data based on the comment P, that is, manually searches the target video data for the video clips associated with the comment P. The current positioning manner of manually adjusting the progress of the target video data requires the user to adjust the video progress bar a plurality of times, which brings inconvenience to the user and reduces efficiency of video progress positioning.

SUMMARY

Embodiments of this application provide a data processing method and apparatus, a computer device, and a readable storage medium, which can improve efficiency of video progress positioning.

An aspect of the embodiments of this application provides a data processing method. The method is performed by a computer device, and includes:

displaying target video data in a video application;

displaying annotated media data in the video application in response to a trigger operation performed by a first user of the video application on a progress time point annotation function in the video application, the annotated media data indicating a current progress time point of the target video data corresponding to the trigger operation; and sharing the annotated media data with a second user of the video application in response to a confirmation operation performed on the annotated media data by the first user of the video application, wherein the annotated media data enables the second user to perform a progress jump on the target video data based on the current progress time point.

An aspect of the embodiments of this application provides a computer device, including: a processor and a memory, the processor being connected to memory, the memory being configured to store a computer program, the computer program, when executed by the processor, causing the computer device to perform the method provided in the embodiments of this application.

An aspect of the embodiments of this application provides a non-transitory computer-readable storage medium, having a computer program stored therein, the computer program being adapted to be loaded and executed by a processor, to cause a computer device having the processor to perform the method provided in the embodiments of this application.

In the embodiments of this application, the computer device can display the target video data in the video application, and then display the annotated media data in the video application in response to the trigger operation performed on the progress time point annotation function in the video application. The annotated media data is the media data associated with the current progress time point corresponding to the trigger operation. Further, the computer devices can post the annotated media data in response to the confirmation operation performed on the annotated media data. The posted annotated media data has the function of instructing the target video data to perform the progress jump based on the current progress time point. It may be learned from the above that, in the embodiments of this application, the current progress time point can be bound to the annotated media data to implement an association between the annotated media data and the target video data. Therefore, after the annotated media data is posted, the progress jump can be performed on the target video data through the current progress time point bound to the posted annotated media data. In other words, the playback progress of the target video data in the video application can intelligently jump to the playback progress indicated by the current progress time point. In this way, manual positioning of the playback progress associated with the annotated media data in the target video data is not required. Instead, the positioning is implemented based on the association between the annotated media data and the target video data, which improves efficiency of video progress positioning.

BRIEF DESCRIPTION OF THE DRAWINGS

To describe technical solutions in embodiments of this application or in the related art more clearly, drawings required for describing the embodiments or the related art are briefly described below. Apparently, the drawings in the following description show only some embodiments of this application, and a person of ordinary skill in the art may still derive other drawings from the drawings without creative efforts.

FIG. 11 is a schematic flowchart of a data processing method according to an embodiment of this application.

DESCRIPTION OF EMBODIMENTS

Technical solutions in embodiments of this application are clearly and completely described below with reference to drawings in the embodiments of this application. Apparently, the described embodiments are merely some rather than all of the embodiments of this application. All other embodiments obtained by a person of ordinary skill in the art based on the embodiments of this application without creative efforts fall within the protection scope of this application.

It is to be understood that, the embodiments of this application may relate to artificial intelligence technologies, through which a playback progress of target video data in a video application can intelligently jump to a playback progress indicated by a current progress time point. In this way, manual positioning of the playback progress associated with annotated media data in the target video data is not required. Instead, the positioning is implemented based on an association between the annotated media data and the target video data, which improves efficiency of video progress positioning.

Figure 1:
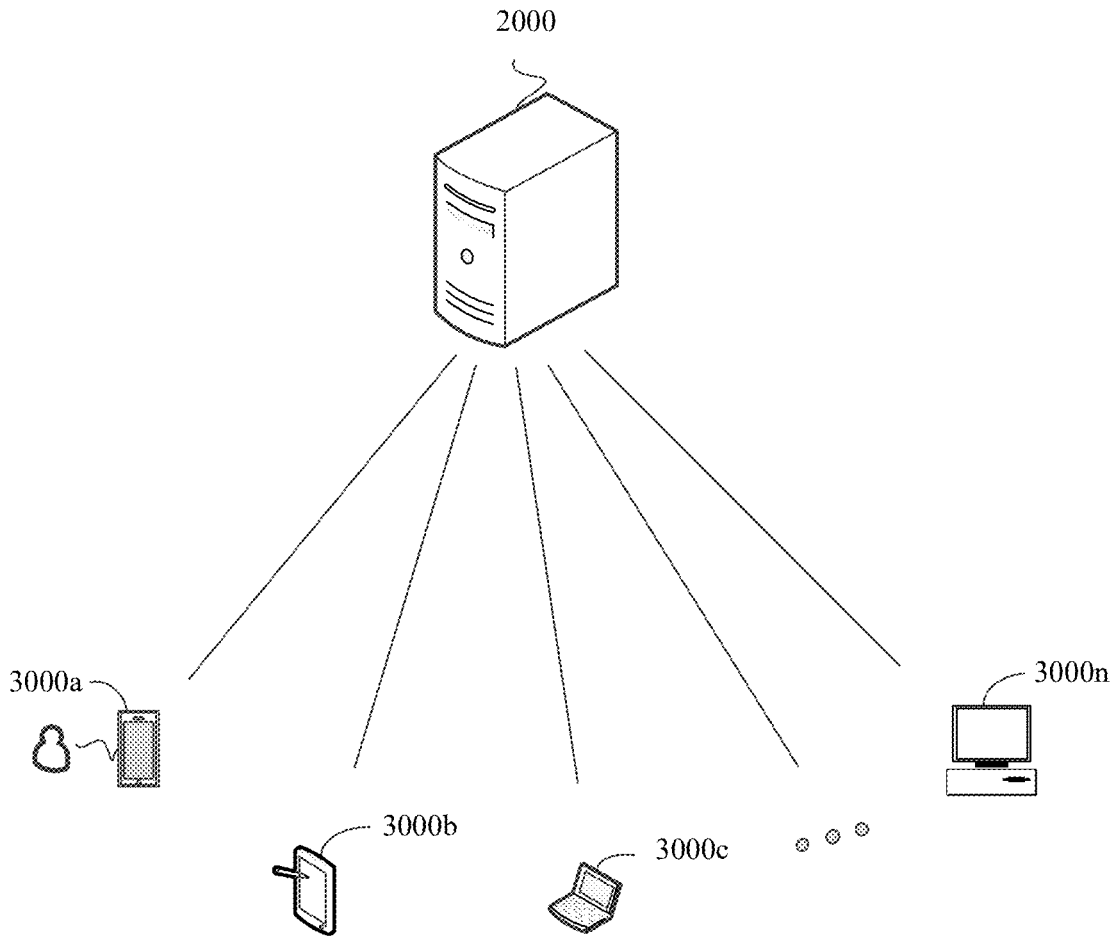
FIG. 1 is a schematic structural diagram of a network architecture according to an embodiment of this application.

FIG. 1 is a schematic structural diagram of a network architecture according to an embodiment of this application. As shown in FIG. 1, the network architecture may include a server 2000 and a terminal device cluster. The terminal device cluster may specifically include one or more terminal devices. A quantity of the terminal devices in the terminal device cluster is not limited herein. As shown in FIG. 1, the plurality of terminal devices may specifically include a terminal device 3000*a*, a terminal device 3000*b*, a terminal device 3000*c*, . . . , and a terminal device 3000*n*. The terminal device 3000*a*, the terminal device 3000*b*, the terminal device 3000*c*, . . . , and the terminal device 3000*n* may respectively establish a network connection to the server 2000 directly or indirectly through wired or wireless communication, so that each terminal device can perform data exchange with the server 2000 through the network connection.

Each terminal device in the terminal device cluster may include intelligent terminals having a video data processing function, such as a smartphone, a tablet computer, a notebook computer, a desktop computer, a smart home appliance (for example, a smart television), a wearable device, and an on-board terminal. It is to be understood that each terminal device in the terminal device cluster shown in FIG. 1 may have an application client installed therein. When the application clients run in the terminal devices, the application clients may respectively perform data exchange with the server 2000 shown in FIG. 1. The application client may be an independent client, or may be an embedded sub-client integrated in a client, which is not limited in this application.

The application client may specifically include clients having a multimedia data processing function such as a browser, an on-board client, a smart home client, an entertainment client, a multimedia client (for example, a video client), a social client, and an information client. In this embodiment of this application, the application client may be referred to as a multimedia application, and a video application is used as an example for description.

The server 2000 may be a server corresponding to the application client. The server 2000 may be an independent physical server, a server cluster formed by a plurality of physical servers, a distributed system, or a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform.

For ease of understanding, in this embodiment of this application, one terminal device may be selected from the plurality of terminal devices shown in FIG. 1 as a target terminal device. For example, in this embodiment of this application, the terminal device 3000*b* shown in FIG. 1 may be used as the target terminal device. The target terminal device may have a video application with a video data processing function installed therein. In this case, the target terminal device can perform data exchange with the server 2000 through the video application.

For ease of understanding, in this embodiment of this application, videos selected by a user (for example, an object Y) on a video recommendation interface of the video application that fit interests of the user may be collectively referred to as a to-be-played video, and video data corresponding to the to-be-played video may be referred to as target video data. The to-be-played video herein may be a long video such as a variety show, a movie, and a TV series, or may be a short video extracted from a long video, which is not limited herein in this application. For ease of understanding, annotated media data may be information associated with the to-be-played video. In this embodiment of this application, based on a possible posting form of the information, the annotated media data may be referred to as comment information associated with the to-be-played video, or may be referred to as a post associated with the to-be-played video. For ease of understanding, in this embodiment of this application, a user corresponding to the video application (for example, the above object Y) may be referred to as a viewing object.

It is to be understood that, service scenarios applicable to the above network framework may specifically include an entertainment program on-demand scenario, an online cinema movie-watching scenario, and an online classroom listening scenario. The network framework can annotate a current progress time point in the service scenarios such as the entertainment program on-demand scenario, the online cinema movie-watching scenario, and the online classroom listening scenario. The service scenarios applicable to the network framework are not enumerated herein. For example, in the entertainment program on-demand scenario, the to-be-played video herein may be an entertainment program selected by the object Y on the video recommendation interface (for example, an entertainment program recommendation list) that fits interests. For another example, in the online cinema movie-watching scenario, the to-be-played video herein may be a movie selected by the object Y on the video recommendation interface (for example, a movie recommendation list) that fits interests. For another example, in the online classroom listening scenario, the to-be-played video herein may be a course selected by the object Y on the video recommendation interface (for example, a course recommendation list) that fits interests.

It is to be understood that, the target terminal device may display annotated media data associated with the current progress time point in response to a trigger operation performed by the object Y on a progress time point annotation function, the current progress time point being a progress time point corresponding to the trigger operation to which the target video data is played, and then post the annotated media data, the posted annotated media data having a function of implementing a progress jump. In other words, a progress jump may be performed on the target video data based on the annotated media data annotated with the current progress time point. In this case, the annotated media data may be various types of data. For example, the annotated media data may be image data (including static images and dynamic images) and video data intercepted from the target video data, or may be text data corresponding to the current progress time point (that is, a playback progress of a target video at a specific moment), or may be comment data for the target video, which is not limited herein.

Figure 2:
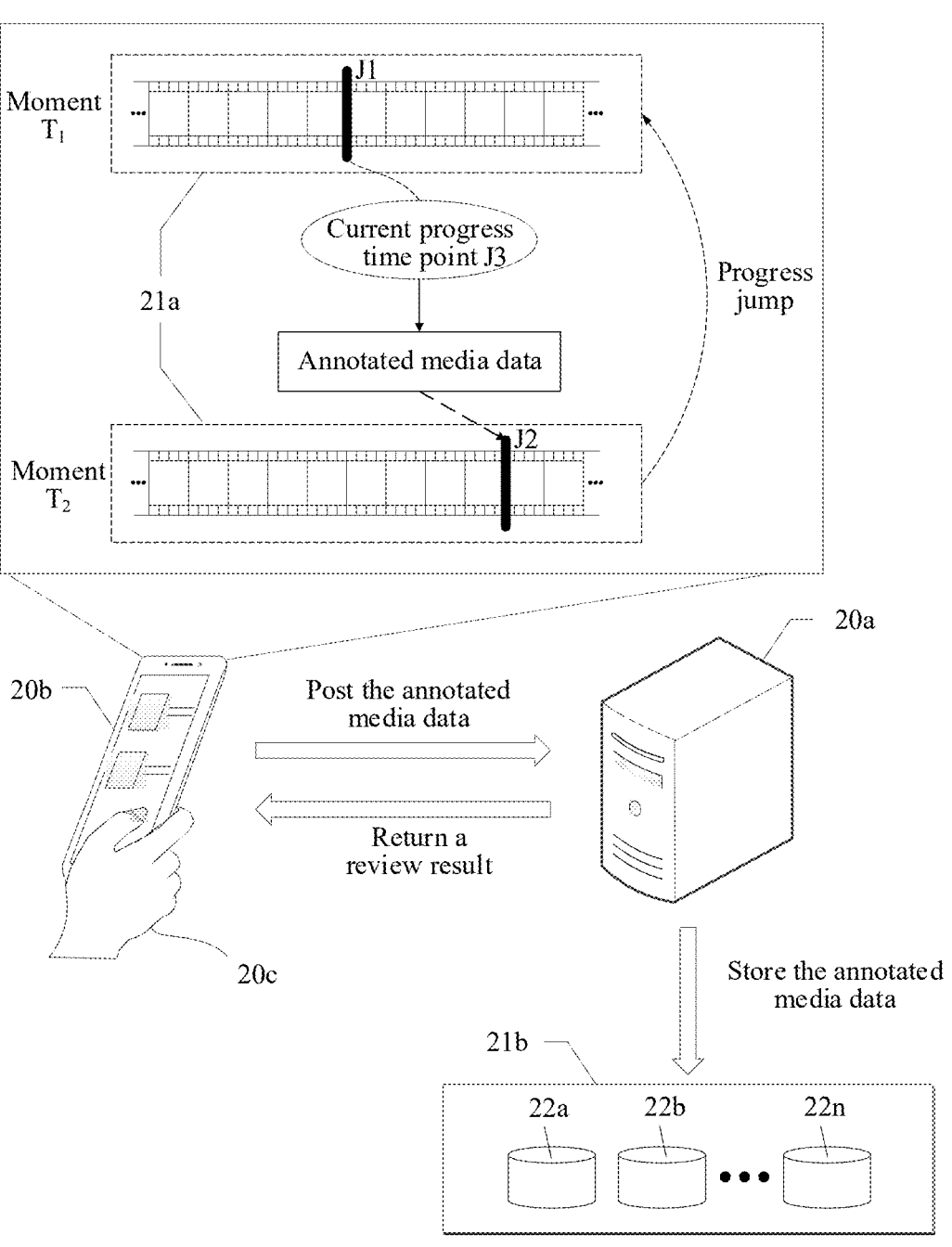
FIG. 2 is a schematic diagram of a scenario of data exchange according to an embodiment of this application.

For ease of understanding, further, FIG. 2 is a schematic diagram of a scenario of data exchange according to an embodiment of this application. A server 20*a* shown in FIG. 2 may be the above server 2000 in the embodiment corresponding to FIG. 1, and a terminal device 20*b* shown in FIG. 2 may be the above target terminal device in the embodiment corresponding to FIG. 1. The terminal device 20*b* has a video application installed therein. The video application may be configured to display target video data and annotated media data bound with a current progress time point. A user corresponding to the terminal device 20*b* may be an object 20*c*.

The terminal device 20*b* shown in FIG. 2 can display the target video data through the video application. The target video data herein may be target video data 21*a*. The target video data 21*a* has different playback progresses at different moments. A playback progress of the target video data 21*a* at a moment T1 may be a playback progress J1, and a playback progress of the target video data 21*a* at a moment T2 may be a playback progress J2.

As shown in FIG. 2, at the moment T1, the object 20*c* may perform a trigger operation on a progress time point annotation function. In this case, the terminal device 20*b* can obtain a current progress time point corresponding to the trigger operation in response to the trigger operation performed by the object 20*c* on the progress time point annotation function, and obtain annotated media data associated with the current progress time point from the target video data, and then display the annotated media data in the video application. The current progress time point is a progress time point corresponding to the trigger operation to which the target video data is played. Generally, a playback progress indicated by the current progress time point may be a playback progress J3. The playback progress J3 and the playback progress J1 may be a same playback progress, or the playback progress J3 and the playback progress J1 may be different playback progresses.

The object 20*c* may perform a confirmation operation on the annotated media data. In this case, the terminal device 20*b* can bind the current progress time point to the annotated media data in response to the confirmation operation performed by the object 20*c* on the annotated media data, and post the annotated media data bound with the current progress time point. In this case, the terminal device 20*b* can transmit the annotated media data to the server 20*a*. In this case, the server 20*a* can review whether the annotated media data is valid to obtain a review result.

It may be understood that if the review result indicates that the review succeeds (that is, the annotated media data is valid), the server 20*a* can store the annotated media data into a media database 21*b*, and return the review result indicating that the review succeeds to the terminal device 20*b*. The media database 21*b* may be arranged alone, or may be integrated on the server 20*a*, or may be integrated on another device or a cloud, which is not limited herein. In some embodiments, if the review result indicates that the review fails (that is, the annotated media data is not valid), the server 20*a* does not need to store the annotated media data into the media database 21*b*, and return the review result indicating that the review fails to the terminal device 20*b*.

The media database 21*b* may include a plurality of databases. The plurality of databases may specifically include a database 22*a*, a database 22*b*, . . . , and a database 22*n*. The database 22*a*, the database 22*b*, . . . , and the database 22*n* may be configured to store data associated with the video application. For example, the database 22*a* may be configured to store video materials, the database 22*b* may be configured to store interactive information, . . . , and the database 22*n* may be configured to store topic materials. Therefore, because the annotated media data represents comment information of video data, the server 20*a* can store the annotated media data into the database 22*a* configured to store video materials.

It may be understood that, when receiving the review result indicating that the review succeeds, the terminal device 20*b* can determine that the annotated media data is successfully posted, and can display the posted annotated media data on a media data display interface of the video application. The posted annotated media data has a function of instructing the target video data to perform a progress jump based on the current progress time point. As shown in FIG. 2, at the moment T2, the object 20*c* may perform a trigger operation on the posted annotated media data. In this case, the terminal device 20*b* can obtain the bound current progress time point from the annotated media data in response to the trigger operation performed by the object 20*c* on the posted annotated media data, and then perform the progress jump on the target video data based on the current progress time point. In other words, the playback progress J2 of the target video data 21*a* at the moment T2 is switched to the playback progress J3 indicated by the current progress time point.

It is to be understood that, after transmitting the annotated media data to the server 20*a* and before receiving the review result returned by the server 20*a*, the terminal device 20*b* can display the annotated media data in the video application. In this case, the annotated media data is in a state of under review. It is to be understood that, when receiving the review result indicating that the review succeeds, the terminal device 20*a* can determine that the annotated media data is successfully posted. In this case, the terminal device 20*a* can update the state of under review of the annotated media data displayed in the video application. An updated state may indicate a posting time of the annotated media data. In some embodiments, when receiving the review result indicating that the review fails, the terminal device 20*a* can determine that the annotated media data is unsuccessfully posted. In this case, the terminal device 20*a* can delete the annotated media data under review displayed in the video application, and display review prompt information. For example, the review prompt information herein may be "The comment review fails!".

It may be learned from the above that, in this embodiment of this application, the current progress time point can be bound to the annotated media data in response to the trigger operation performed on the progress time point annotation function. The current progress time point indicates the playback progress of the target video data corresponding to the trigger operation. Therefore, after the annotated media data is posted, the progress jump can be implemented on the target video data based on the current progress time point bound to the posted annotated media data. In other words, the playback progress of the target video data jumps to the playback progress indicated by the current progress time point, which can improve efficiency of video progress positioning.

Figure 3:
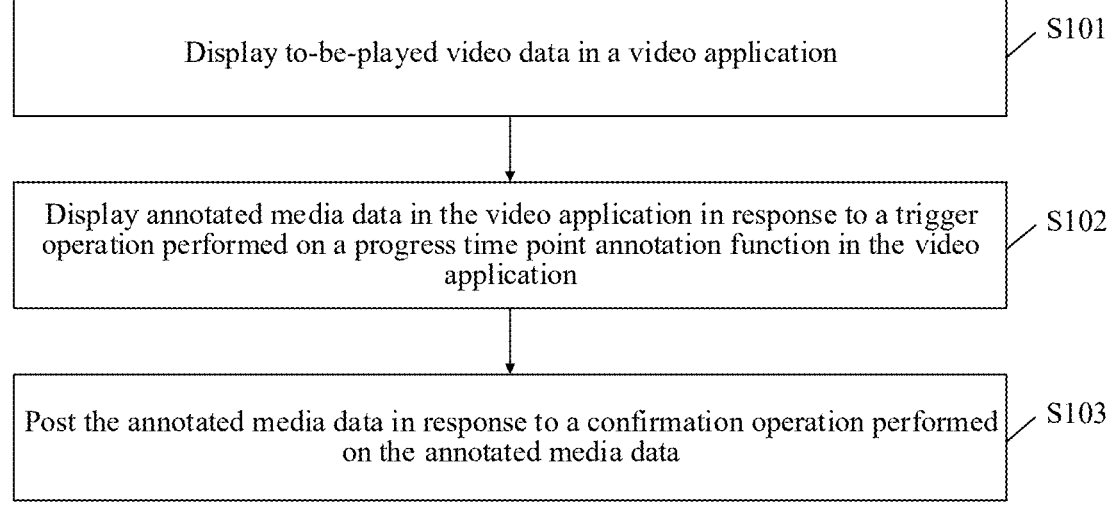
FIG. 3 is a schematic flowchart of a data processing method according to an embodiment of this application.

FIG. 3 is a schematic flowchart of a data processing method according to an embodiment of this application. The method may be performed by a server, or may be performed by a terminal device, or may be performed jointly by the server and the terminal device. The server may be the above server 20*a* in the embodiment corresponding to FIG. 2, and the terminal device may be the above terminal device 20*b* in the embodiment corresponding to FIG. 2. For ease of understanding, this embodiment of this application is described by using an example in which the method is performed by the terminal device. The data processing method may include the following S101 to S103.

S101: Display target video data in a video application.

It may be understood that, when a viewing object needs to watch a video (for example, a target video) in the video application, the viewing object may perform a trigger operation on a plurality of recommended videos on a video recommendation interface of the video application. In this case, the terminal device can determine the recommended videos corresponding to the trigger operation as to-be-played videos in response to the trigger operation performed by the viewing object on the plurality of recommended videos, then transmit a video playback request to a server corresponding to the video application based on video identifiers of the to-be-played videos, and then display and play, after receiving target video data corresponding to the to-be-played videos returned by the server, the target video data on a video playback interface of the video application.

Figure 4:
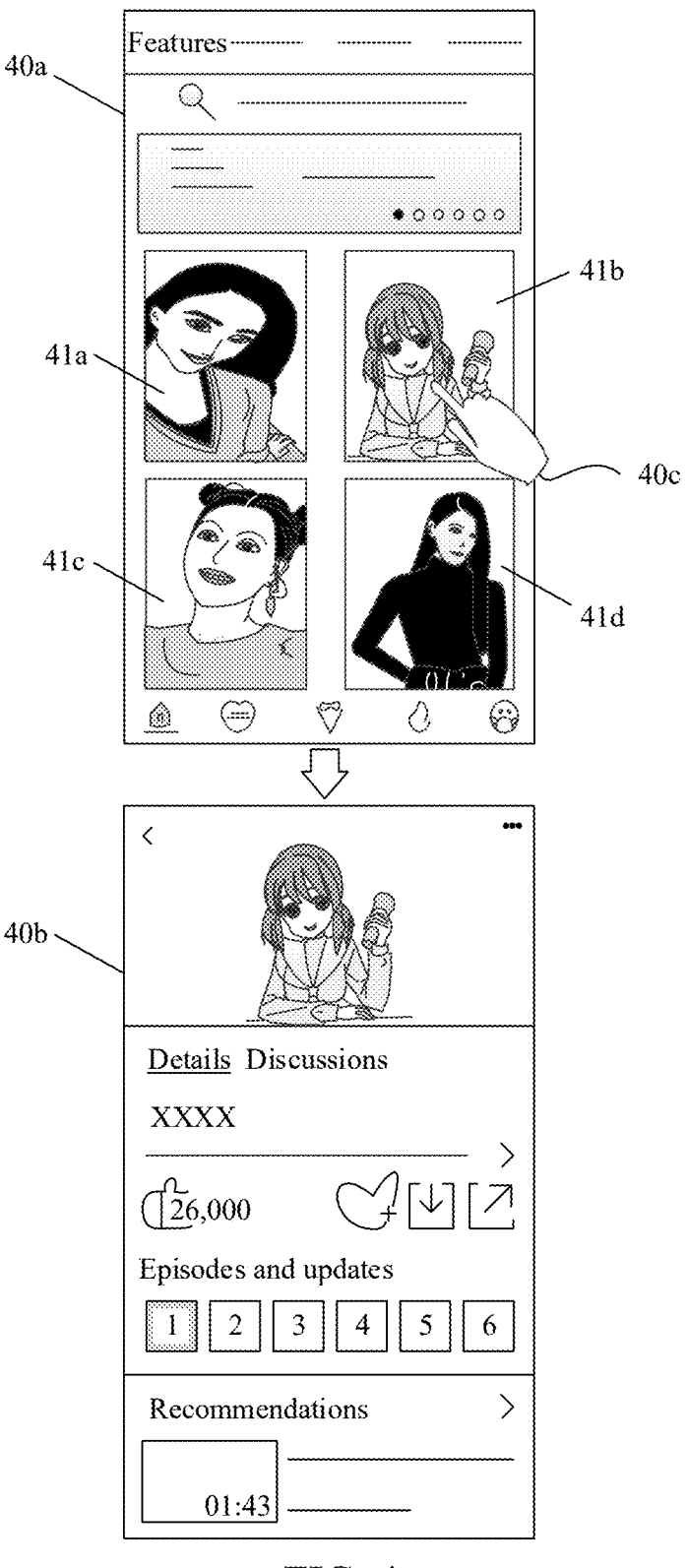
FIG. 4 is a schematic diagram of a scenario of opening target video data according to an embodiment of this application.

For ease of understanding, FIG. 4 is a schematic diagram of a scenario of opening target video data according to an embodiment of this application. A video recommendation interface 40*a* and a video playback interface 40*b* shown in FIG. 4 may be interfaces of the video application at different moments. The video recommendation interface 40*a* may include a plurality of recommended videos. The plurality of recommended videos may include a recommended video 41*a*, a recommended video 41*b*, a recommended video 41*c*, and a recommended video 41*d*.

As shown in FIG. 4, an object 40*c* may perform a trigger operation on the recommended video 41*b* (that is, a target video 41*b*) in the plurality of recommended videos. In this case, the terminal device can transmit the video playback request to the server corresponding to the video application based on a video identifier of the recommended video 41*b* in response to the trigger operation performed by the object 40*c* on the recommended video 41*b*, and then receive video data (that is, the target video data) corresponding to the recommended video 41*b* returned by the server. In this case, the terminal device can switch the video recommendation interface 40*a* to the video playback interface 40*b*, and display and play the video data corresponding to the recommended video 41*b* on the video playback interface 40*b*.

It may be understood that, the video playback interface 40*b* shown in FIG. 4 may be referred to as a half-screen playback interface (that is, a half-screen playback interface 40*b*) of the video application. When the viewing object needs to watch the target video data in a full-screen mode, the viewing object may perform a trigger operation on a screen conversion control (also referred to as a full-screen conversion control) on the half-screen playback interface. In this case, the terminal device may display and play the target video data on a full-screen playback interface of the video application in response to the trigger operation performed by the viewing object on the full-screen conversion control. The half-screen playback interface and the full-screen playback interface may be collectively referred to as a video playback interface. The half-screen playback interface and the full-screen playback interface may represent different playback modes of the target video data. The half-screen playback interface and the full-screen playback interface both represent the entire interface displayed on a display of the terminal device, that is, the half-screen playback interface and the full-screen playback interface are both an application interface that occupies an entire terminal screen. A size of a playback area on the half-screen playback interface is less than a size of the entire terminal screen, and a size of a playback area on the full-screen playback interface is equal to the size of the entire terminal screen.

Figure 5:
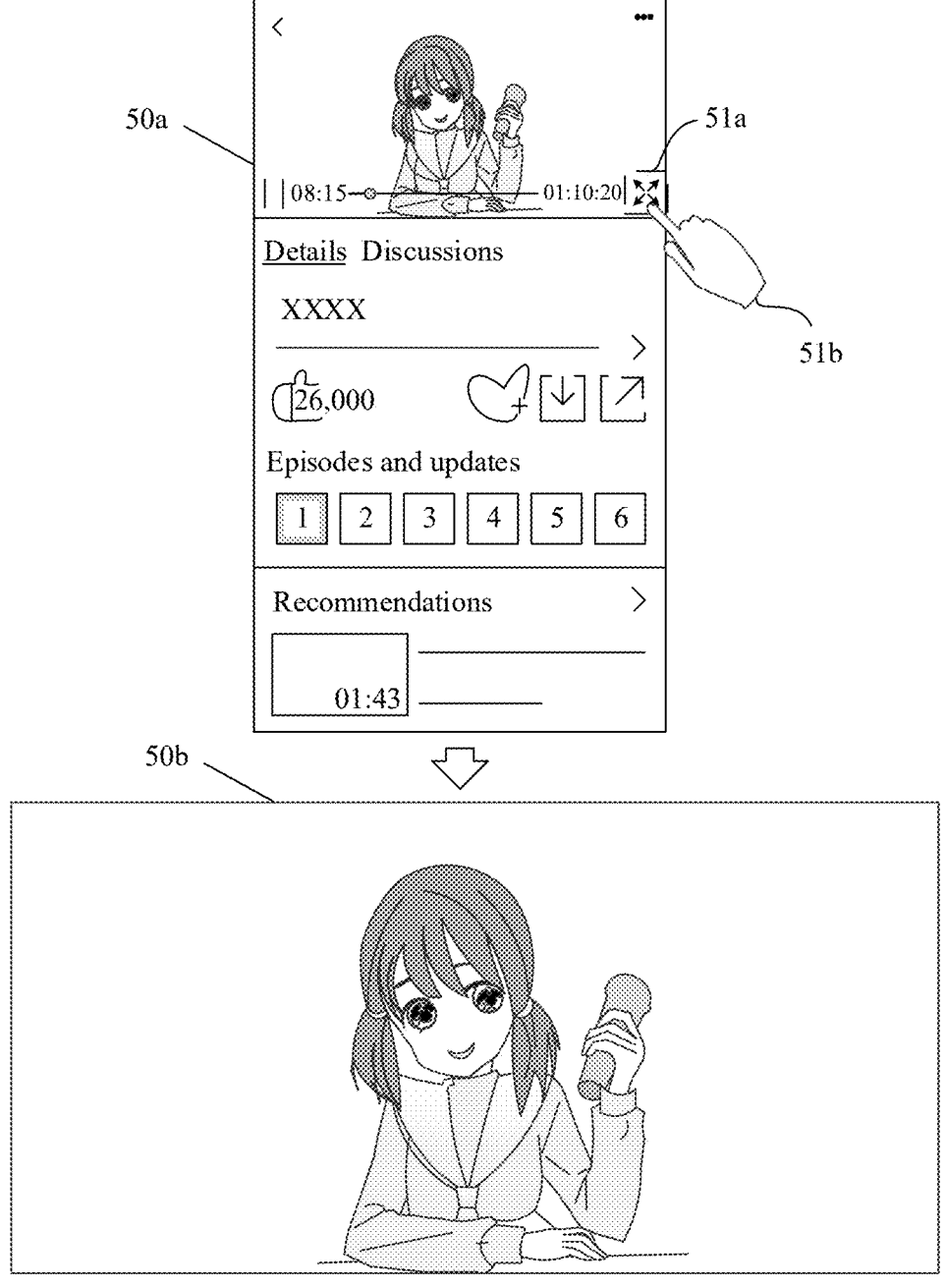
FIG. 5 is a schematic diagram of a scenario of switching a playback mode according to an embodiment of this application.

For ease of understanding, FIG. 5 is a schematic diagram of a scenario of switching a playback mode according to an embodiment of this application. An object 51*b* shown in FIG. 5 may be the object 40*c* shown in FIG. 4. A video playback interface 50*a* and a video playback interface 50*b* shown in FIG. 5 may be video playback interfaces of the video application at different moments. The video playback interface 50*a* may be a half-screen playback interface, and the video playback interface 50*b* may be a full-screen playback interface.

It may be understood that when the object 51*b* needs to watch the target video data in the full-screen mode, the object may perform a trigger operation (for example, a click/tap operation) on the video playback interface 40*b* shown in FIG. 4. In this case, the terminal device can display a full-screen conversion control 51*a* on the video playback interface 40*b* in response to the trigger operation performed by the object 51*b* on the video playback interface 40*b*, to obtain the video playback interface 50*a* (that is, a half-screen playback interface 50*a*).

As shown in FIG. 5, the object 51*b* may perform a trigger operation on the full-screen conversion control 51*a* on the video playback interface 50*a*. In this case, the terminal device can switch the video playback interface 50*a* to the video playback interface 50*b* (that is, a full-screen playback interface 50*b*) and display and play the video data corresponding to the recommended video 41*b* on the video playback interface 50*b* in response to the trigger operation performed by the object 51*b* on the full-screen conversion control 51*a*.

Similarly, it may be understood that, when the viewing object needs to watch the target video data in a half-screen mode, the viewing object may perform a trigger operation on a screen conversion control (also referred to as a half-screen conversion control) on the full-screen playback interface. In this case, the terminal device can display and play the target video data on the half-screen playback interface of the video application in response to the trigger operation performed by the viewing object on the half-screen conversion control. For a specific process of displaying the half-screen conversion control on the full-screen playback interface, reference may be made to the above description of displaying the full-screen conversion control on the half-screen playback interface. The details are not described herein.

S102: Display annotated media data in the video application in response to a trigger operation performed on a progress time point annotation function in the video application, the annotated media data being media data associated with a current progress time point. The current progress time point is a progress time point corresponding to the trigger operation to which the target video data is played. The annotated media data may be at least one of annotated image data, annotated video data, annotated graphics interchange format (GIF for short) image data, annotated text data, or to-be-posted comment media data. The annotated image data and the annotated GIF image data herein may be collectively referred to as image data. Annotated media data formed by any combination of the above can be bound to the current progress time point. That is to say, in subsequent steps, when annotated media data formed by any combination is triggered, the target video data can be instructed to perform a progress jump based on the current progress time point.

It may be understood that, when the annotated media data includes at least two of the annotated image data, the annotated video data, the annotated GIF image data, the annotated text data, and the to-be-posted comment media data, progress time points respectively bound to the at least two pieces of data may be a same progress time point or may be different progress time points. For example, when the annotated media data includes the annotated image data and the annotated text data, a progress time point bound to the annotated image data and a progress time point bound to the annotated text data may be a same progress time point (that is, the current progress time point). For another example, when the annotated media data includes two pieces of the annotated image data, progress time points bound to the two pieces annotated image data may be different progress time points. For another example, when the annotated media data includes the annotated image data and the annotated video data, a progress time point bound to the annotated image data and a progress time point bound to the annotated video data may be different progress time points.

In a possible implementation, the annotated media data may include annotated image data intercepted from the target video data. It is to be understood that, the terminal device can display a media image interception control associated with the progress time point annotation function on the video playback interface of the video application. Further, the terminal device can display the annotated image data in an image annotation area of the video application at the current progress time point in response to a trigger operation performed on the media image interception control. A binding relationship exists between the annotated image data and the current progress time point. A progress time point of the annotated image data in the target video data is the current progress time point. The annotated media data can show a video picture corresponding to the current progress time point, so that another user can determine whether to perform a progress jump through the annotated media data.

Figure 6A:
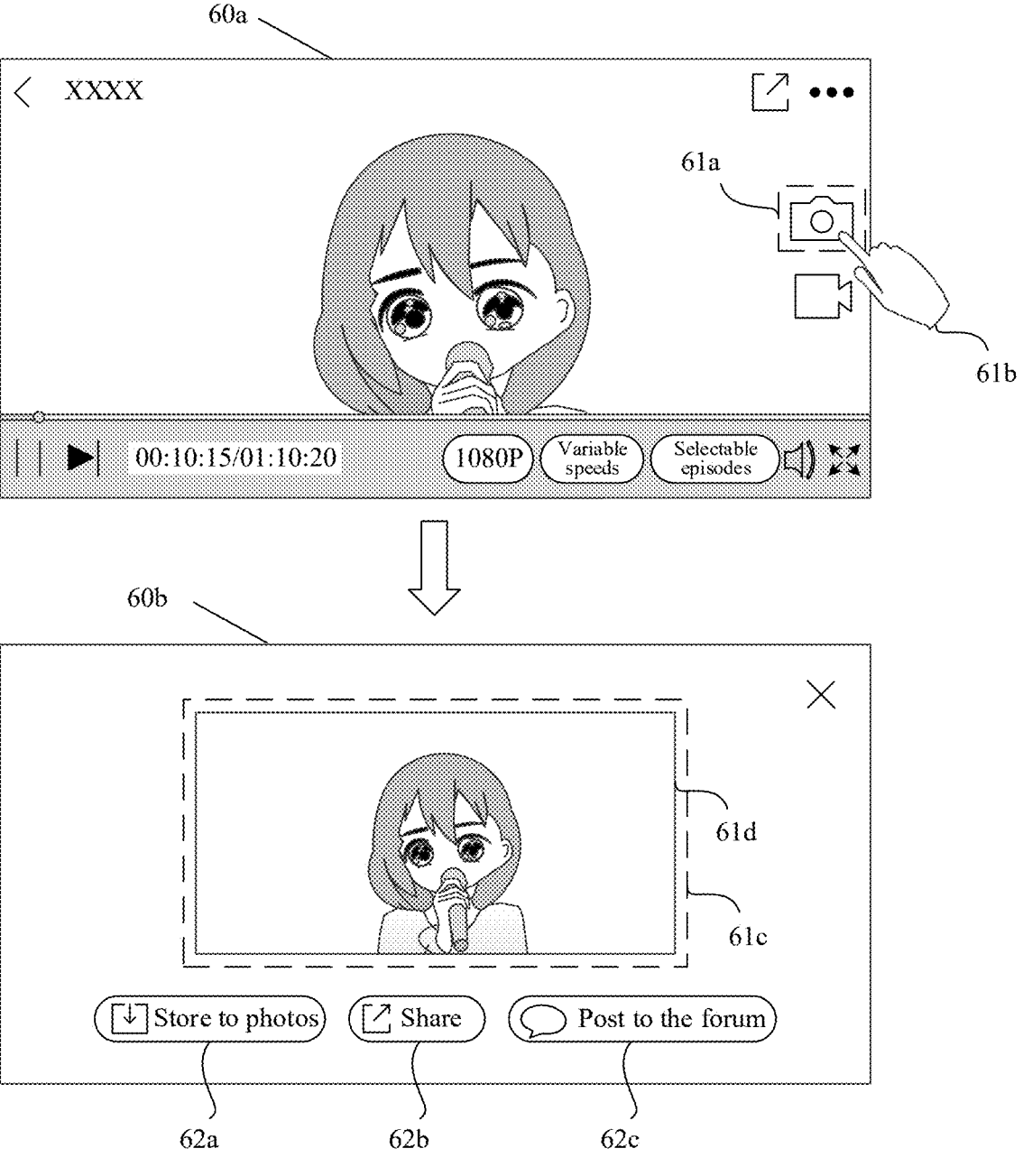
FIG. 6A is a schematic diagram of a scenario of intercepting annotated image data according to an embodiment of this application.
Figure 6B:
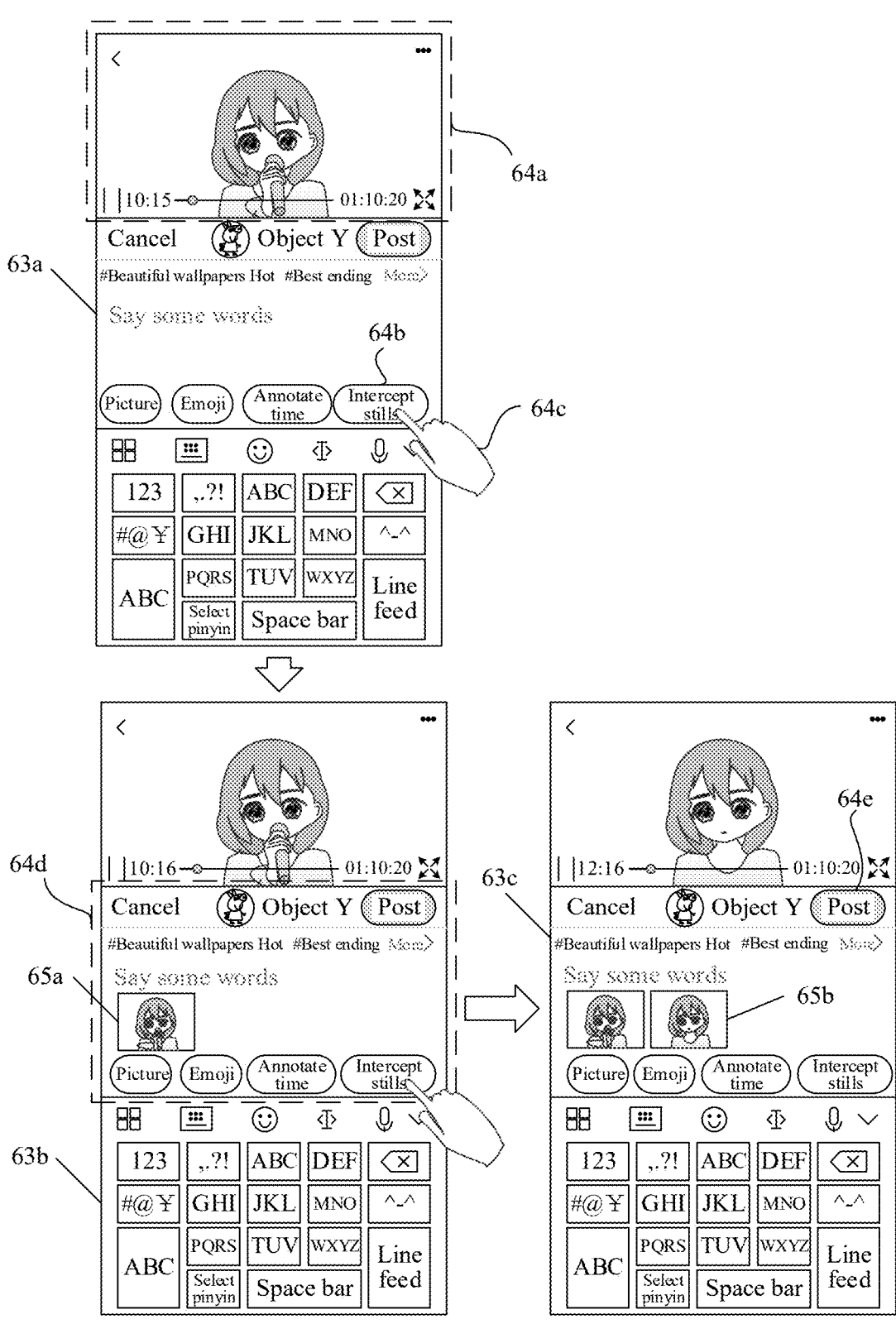
FIG. 6B is a schematic diagram of a scenario of intercepting annotated image data according to an embodiment of this application.

For ease of understanding, FIG. 6A and FIG. 6B are schematic diagrams of a scenario of intercepting annotated image data according to an embodiment of this application. FIG. 6A is a schematic diagram of a scenario of intercepting the annotated image data on the full-screen playback interface, and FIG. 6B is a schematic diagram of a scenario of intercepting the annotated image data on the half-screen playback interface. It may be understood that, during interception of the annotated image data on the full-screen playback interface and the half-screen playback interface, screenshot of a picture of currently played video data (that is, the target video data) can be implemented through a one-button quick operation in this application.

A video playback interface 60a (that is, a full-screen playback interface 60a) shown in FIG. 6A and the video playback interface 50b shown in FIG. 5 may be video playback interfaces of the video application at different moments. The video playback interface 60a may include a media image interception control 61a, and target video data is played on the video playback interface 60a. As shown in FIG. 6A, an object 61b may perform a trigger operation on the media image interception control 61a at the current progress time point. In this case, the terminal device can switch the video playback interface 60a to a media control interface 60b and display annotated image data 61d in an image annotation area 61c of the media control interface 60b in response to the trigger operation performed by the object 61b on the media image interception control 61a. The annotated image data 61d herein is image data corresponding to the target video data at the current progress time point.

As shown in FIG. 6A, the media control interface 60b may further include a media image storage control 62a, a media image sharing control 62b, and a media image posting control 62c. The media image storage control 62a may be configured to store the annotated image data 61d to photos in the terminal device, the media image sharing control 62b may be configured to share the annotated image data 61d to another platform other than the video application, and the media image posting control 62c may be configured to post the annotated image data 61d within the video application.

A video playback interface 63a (that is, a half-screen playback interface 63a) shown in FIG. 6B and the video playback interface 40b shown in FIG. 4 may be video playback interfaces of the video application at different moments. The video playback interface 63a may include a media image interception control 64b, and target video data is played on a playback area 64a of the video playback interface 63a.

As shown in FIG. 6B, an object 64c may perform a trigger operation on the media image interception control 64b at the current progress time point. In this case, the terminal device can switch the video playback interface 63a to a video playback interface 63b and display annotated image data in an image annotation area 64d of the video playback interface 63b in response to the trigger operation performed by the object 64c on the media image interception control 64b. The annotated image data herein may be annotated image data 65a. The annotated image data 65a is the image data corresponding to the target video data at the current progress time point.

As shown in FIG. 6B, the object 64c may perform a trigger operation again on the media image interception control 64b at a next progress time point (that is, an auxiliary progress time point) of the current progress time point. In this case, the terminal device can switch the video playback interface 63b to a video playback interface 63c and display annotated image data on the video playback interface 63c in response to the trigger operation performed by the object 64c again on the media image interception control 64b. The annotated image data herein may be annotated image data 65b. The annotated image data 65b is image data corresponding to the target video data at the auxiliary progress time point.

As shown in FIG. 6B, the video playback interface 63c may further include a media image posting control 64e. The media image posting control 64e may be configured to post the annotated image data 65a and the annotated image data 65b within the video application. Similarly, the video playback interface 63b may further include the media image posting control 64e. The media image posting control 64e may be configured to post the annotated image data 65a within the video application. Therefore, in this embodiment of this application, a plurality of pieces of annotated image data can be intercepted, and each annotated image data may carry a progress time point, thereby improving operation efficiency of the viewing object.

In a possible implementation, the annotated media data may include the to-be-posted comment media data and the annotated text data. It is to be understood that, the terminal device can display a media text interception control associated with the progress time point annotation function on the video playback interface of the video application. Further, the terminal device can display the annotated text data in a text annotation area of the video application at the current progress time point in response to a trigger operation performed on the media text interception control. A binding relationship exists between the annotated text data and the current progress time point. Further, the terminal device can display the inputted to-be-posted comment media data in the text annotation area in response to an input operation performed on the text annotation area. In some embodiments, the terminal device may directly use the annotated text data displayed in the text annotation area as the annotated media data without a need to respond to the input operation performed on the text annotation area.

In a possible implementation, the annotated media data may include the to-be-posted comment media data. It is to be understood that, the terminal device can display the media text interception control associated with the progress time point annotation function on the video playback interface of the video application, then display the text annotation area in the video application at the current progress time point in response to the trigger operation performed on the media text interception control, and then display the inputted to-be-posted comment media data in the text annotation area in response to the input operation performed on the text annotation area. In this case, the terminal device can directly use the to-be-posted comment media data displayed in the text annotation area as the annotated media data. In other words, the annotated media data includes the to-be-posted comment media data.

The annotated text data may be text data corresponding to the current progress time point. For example, when the current progress time point is 03:12 (min:sec) in Episode 10, the annotated text data may be "00:03:12 in Episode 10". In other words, this application supports annotation of episode No. information and time point information (a current playback progress) of currently played video data (that is, the target video data). "Episode 10" is the episode No. information of the target video data, and "00:03:12" is the time point information of the target video data. In some embodiments, the target video data may not include an episode No. (for example, the target video data is a movie). For example, when the current progress time point is 03:12, the annotated text data may be "00:03:12". In some embodiments, in response to the trigger operation performed on the media text interception control, the terminal device can further display annotated icon data in the text annotation area of the video application, and then use the annotated icon data as the annotated text data. For example, the annotated icon data may be an icon such as a triangle, a square, or an emoji.

The annotated media data can show the current progress time point and the comment media data of the viewing user, so that another user can determine whether to perform a progress jump through the annotated media data based on the comment media data.

In a possible implementation, the annotated text data may be displayed in the text annotation area of video applications in many manners. In some cases, to attract a user for watching, the annotated text data may show a relevant video content at the current progress time point. In this case, the annotated text data may be displayed in the text annotation area of video application in the following manner: The terminal device obtains, at the current progress time point, a target video clip in K video clips corresponding to the current progress time point in response to the trigger operation performed on the media text interception control. The K video clips are video clips associated with the target video data. K herein may be a positive integer. Further, the terminal device can use clip attribute information of the target video clip as the annotated text data, and display the annotated text data in the text annotation area of the video application. The clip attribute information can show a relevant video content at the current progress time point. For example, the target video clip corresponding to the current progress time point may be the first video clip of the K video clips, and clip attribute information of the first video clip may be "festive atmosphere". Therefore, the annotated text data may be "festive atmosphere". It is to be understood that, the terminal device can uniformly divide the target video data into the K video clips based on a time length, or can cluster video frames in the target video data as the K video clips based on a similarity. A specific manner of dividing the target video data is not limited in this embodiment of this application. In addition, the K video clips obtained through division may be inputted into a target attribute model, to output clip attribute information respectively corresponding to the K video clips. A model type of the target attribute model is not limited in this embodiment of this application.

Figure 7A:
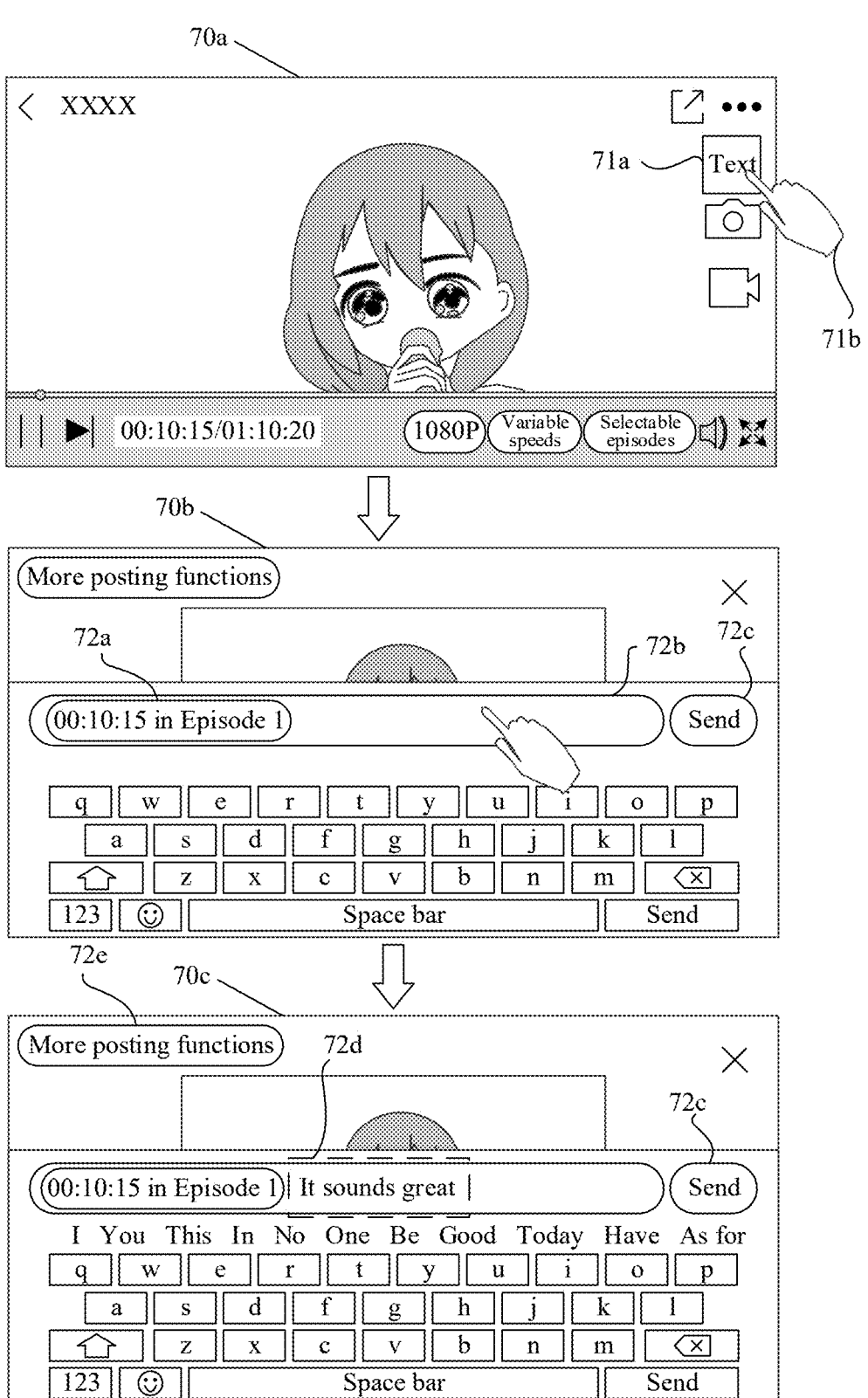
FIG. 7A is a schematic diagram of a scenario of generating annotated text data according to an embodiment of this application.
Figure 7B:
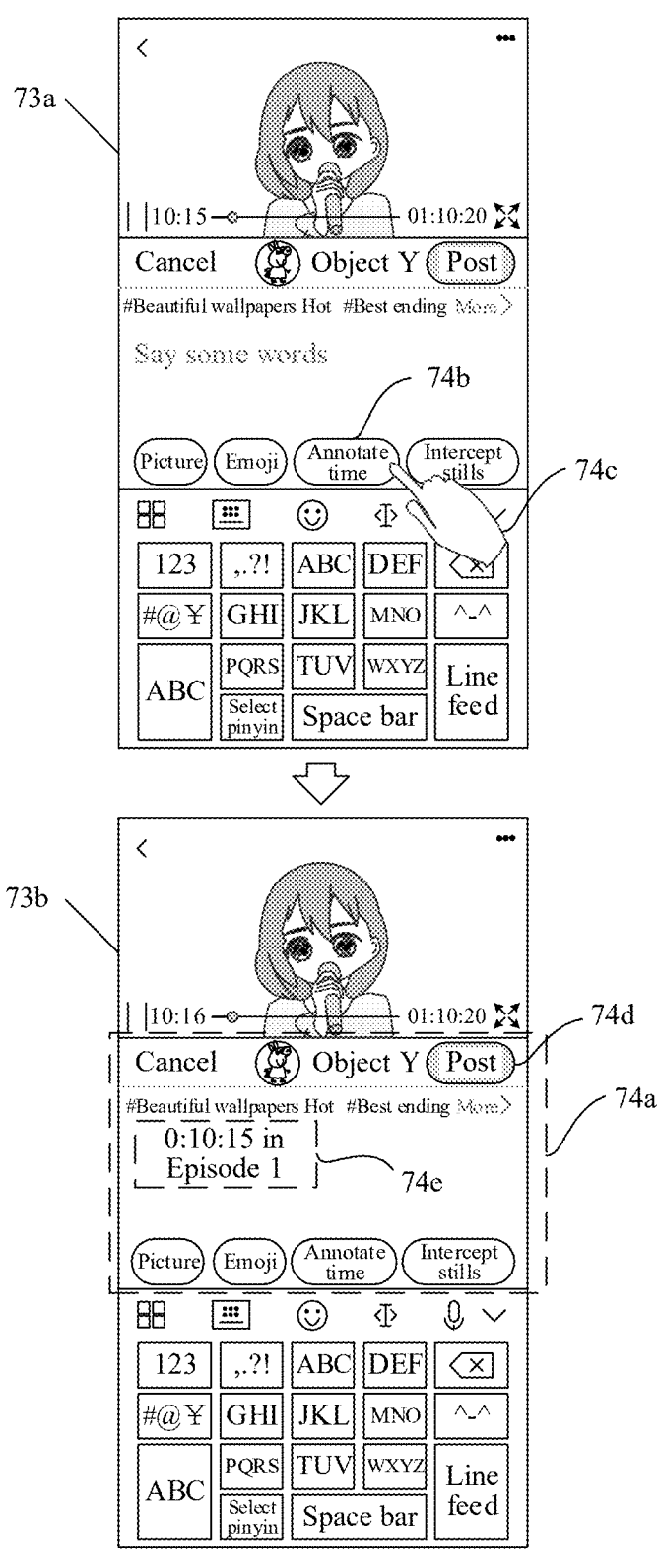
FIG. 7B is a schematic diagram of a scenario of generating annotated text data according to an embodiment of this application.

For ease of understanding, FIG. 7A and FIG. 7B are schematic diagrams of a scenario of generating annotated text data according to an embodiment of this application. FIG. 7A is a schematic diagram of a scenario of generating the annotated text data on the full-screen playback interface, and FIG. 7B is a schematic diagram of a scenario of generating the annotated text data on the half-screen playback interface.

A video playback interface 70a (that is, a full-screen playback interface 70a) shown in FIG. 7A and the video playback interface 50b shown in FIG. 5 may be video playback interfaces of the video application at different moments. The video playback interface 70a may include a media text interception control 71a, and target video data is played on the video playback interface 70a.

As shown in FIG. 7A, an object 71b may perform a trigger operation on the media text interception control 71a at the current progress time point. In this case, the terminal device can switch the video playback interface 70a to a video playback interface 70b and display annotated text data 72a in a text annotation area 72b of the video playback interface 70b in response to the trigger operation performed by the object 71b on the media text interception control 71a. The annotated text data 72a herein may be "00:10:15 in Episode 1".

As shown in FIG. 7A, the video playback interface 70b may further include a media text posting control 72c. The media text posting control 72c may be configured to post the annotated text data 72a within the video application. In addition, the video playback interface 70b may further include a function control 72e. The function control 72e may be configured to perform more detailed editing on the annotated media data. The generated annotated media data may be updated through the function control 72e.

As shown in FIG. 7A, the object 71b may perform an input operation on the text annotation area 72b. In this case, the terminal device can switch the video playback interface 70b to a video playback interface 70c and display inputted to-be-posted comment media data 72d in the text annotation area 72b of the video playback interface 70c in response to the input operation performed by the object 71b on the text annotation area 72b. The to-be-posted comment media data 72d herein may be "It sounds great".

Similarly, as shown in FIG. 7A, the video playback interface 70c may further include the media text posting control 72c. The media text posting control 72c may be configured to post the annotated text data 72a and the to-be-posted comment media data 72d within the video application.

A video playback interface 73a (that is, a half-screen playback interface 73a) shown in FIG. 7B may be the above video playback interface 63a shown in the embodiment corresponding to FIG. 6B. The video playback interface 73a may include a media text interception control 74b. As shown in FIG. 7B, an object 74c may perform a trigger operation on the media text interception control 74b at the current progress time point. In this case, the terminal device can switch the video playback interface 73a to a video playback interface 73b and display annotated text data 74e in a text annotation area 74a of the video playback interface 73b in response to the trigger operation performed by the object 74c on the media text interception control 74b. The annotated text data 74e is text data corresponding to the target video data at the current progress time point. The annotated text data 74e herein is may be "00:10:15 in Episode 1".

The object 74c may perform an input operation on the text annotation area 74a. For a specific process of performing the input operation on the text annotation area 74a by the object 74c, reference may be made to the above description of performing the input operation on the text annotation area 72b by the object 71b in the embodiment corresponding to FIG. 7A. The details are not described herein. As shown in FIG. 7B, the video playback interface 73b may further include a media text posting control 74d. The media text posting control 74d may be configured to post the annotated text data 74e within the video application.

In a possible implementation, the annotated media data may include the annotated text data and annotated image data intercepted from the target video data. It is to be understood that, the terminal device can display a media image interception control associated with the progress time point annotation function on the video playback interface of the video application. Further, the terminal device can display the annotated image data in an image annotation area of the video application at the current progress time point in response to a trigger operation performed on the media image interception control. A binding relationship exists between the annotated image data and the current progress time point. A progress time point of the annotated image data in the target video data is the current progress time point. Further, the terminal device can display the media image posting control corresponding to the annotated image data in the video application. Further, the terminal device can display the annotated text data in a comment annotation area of the video application in response to a confirmation operation performed on the media image posting control. A binding relationship exists between the annotated text data and the current progress time point.

Refer to FIG. 6A and FIG. 7A together. It may be understood that, the terminal device can switch the media control interface 60b to the media control interface 70b and display the annotated text data 72*a* in the text annotation area 72*b* of the media control interface 70*b* in response to the trigger operation performed on the media image posting control 62*c* on the media control interface 60*b*. Therefore, the terminal device can post the annotated text data 72*a* and the annotated image data 61*d* within the video application in response to the trigger operation performed on the media data posting control 72*c* on the media control interface 70*b*.

When the object 71*b* inputs the to-be-posted comment media data into the text annotation area 72*b*, the terminal device can switch the media control interface 70*b* to the media control interface 70*c*, and display the inputted to-be-posted comment media data 72*d* on the media control interface 70*c*. Therefore, the terminal device can post the annotated text data 72*a*, the annotated image data 61*d*, and the to-be-posted comment media data 72*d* within the video application in response to the trigger operation performed on the media data posting control 72*c* on the media control interface 70*c*. In this case, the annotated media data includes the to-be-posted comment media data, the annotated text data, and the annotated image data intercepted from the target video data.

Refer to FIG. 6A and FIG. 7A together. The terminal device can switch the media control interface 60*b* to another media control interface in response to the confirmation operation performed on the media image posting control 62*c* on the media control interface 60*b*. In this case, the media control interface obtained by switching may be the media control interface 70*b* that does not include the annotated text data 72*a*. Further, When the object 71*b* inputs the to-be-posted comment media data in the text annotation area 72*b*, the terminal device can display the inputted to-be-posted comment media data 72*d* in the text annotation area 72*b*, to obtain the media control interface 70*c* that does not include the annotated text data 72*a*. Therefore, the terminal device can post the annotated image data 61*d* and the to-be-posted comment media data 72*d* within the video application in response to the trigger operation performed on the media data posting control 72*c* on the media control interface 70*c*. In this case, the annotated media data includes the to-be-posted comment media data and the annotated image data intercepted from the target video data.

The annotated media data can show a video picture and comment media data corresponding to the current progress time point, so that another user can determine whether to perform a progress jump through the annotated media data.

In a possible implementation, the annotated media data may include annotated video data intercepted from the target video data. It is to be understood that, the terminal device can display a media video interception control associated with the progress time point annotation function on the video playback interface of the video application. Further, the terminal device can display the annotated video data in a video annotation area of the video application at a triggered progress time point in response to a trigger operation performed on the media video interception control. A binding relationship exists between the annotated video data and the current progress time point. The triggered progress time point is used for determining the current progress time point in the target video data. The current progress time point is used for determining an interception start time in the target video data. A duration of the annotated video data is an interception duration associated with the progress time point annotation function.

It may be understood that, the current progress time point in the target video data can be determined based on the triggered progress time point, and an interception end time in the target video data can be determined based on the interception start time indicated by the current progress time point. It is to be understood that, a specific duration of the interception duration associated with the progress time point annotation function is not limited in this embodiment of this application. For example, the interception duration may be 30 seconds.

Figure 8:
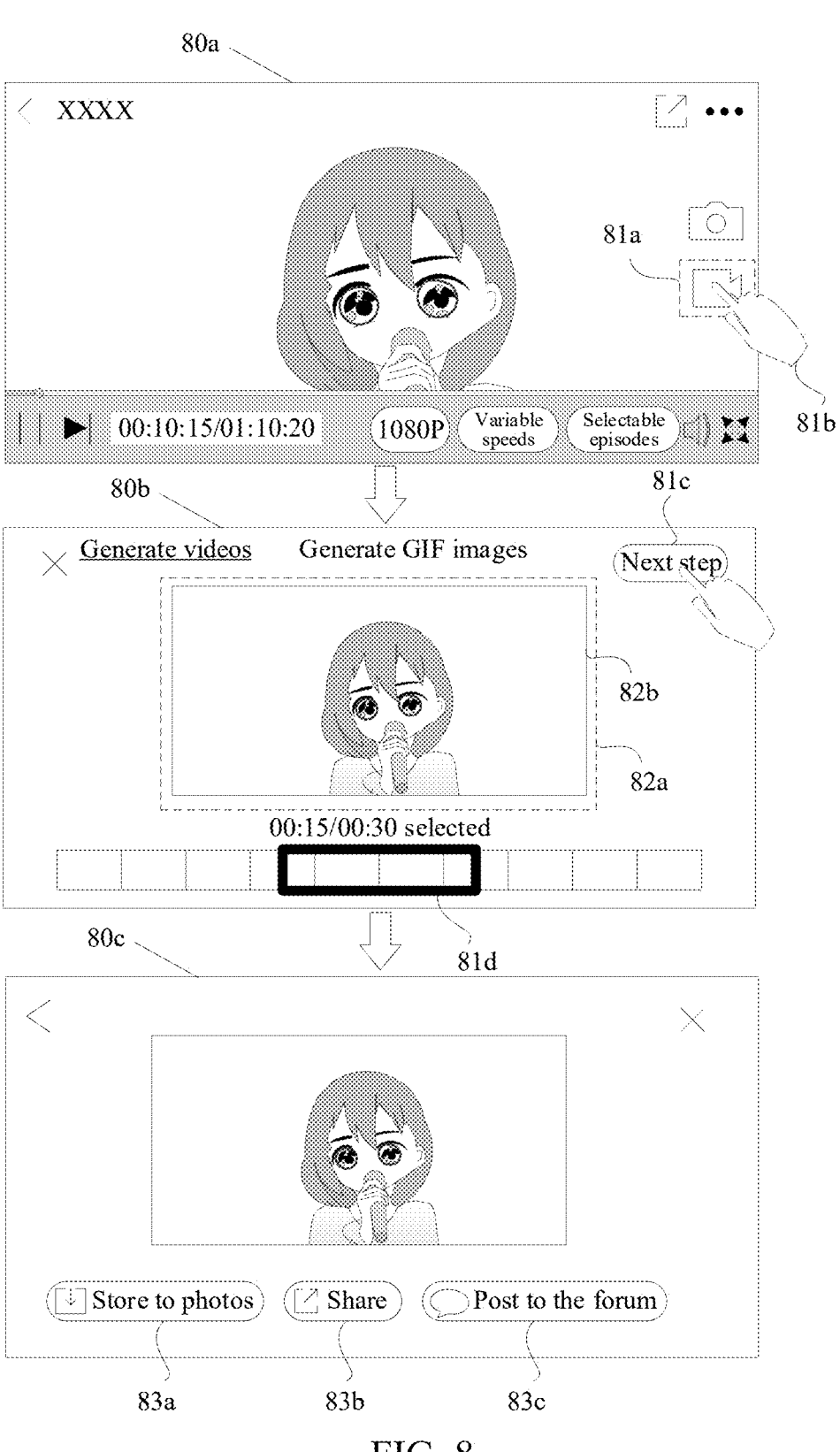
FIG. 8 is a schematic diagram of a scenario of intercepting annotated video data according to an embodiment of this application.

For ease of understanding, FIG. 8 is a schematic diagram of a scenario of intercepting annotated video data according to an embodiment of this application. FIG. 8 is a schematic diagram of a scenario of intercepting the annotated video data on the full-screen playback interface. A video playback interface 80*a* (that is, a full-screen playback interface 80*a*) shown in FIG. 8 and the video playback interface 50*b* shown in FIG. 5 may be video playback interfaces of the video application at different moments. The video playback interface 80*a* may include a media video interception control 81*a*. It is to be understood that, for a specific process of intercepting the annotated video data on the half-screen playback interface, reference may be made to the above description of intercepting the annotated video data on the full-screen playback interface. The details are not described in this application.

As shown in FIG. 8, an object 81*b* may perform a trigger operation on the media video interception control 81*a* at the triggered progress time point. In this case, the terminal device can switch the video playback interface 80*a* to a media control interface 80*b* and display annotated video data 82*b* in a video annotation area 82*a* of the media control interface 80*b* in response to the trigger operation performed by the object 81*b* on the media video interception control 81*a*. A start progress time point of the annotated video data 82*b* herein in the target video data is the current progress time point. The annotated video data 82*b* can be automatically played in the video annotation area 82*a*.

It is to be understood that, FIG. 8 shows the specific process of intercepting the annotated video data on the full-screen playback interface. For the specific process of intercepting the annotated video data on the half-screen playback interface, reference may be made to the above description of intercepting the annotated video data on the full-screen playback interface. The details are not described in this application.

As shown in FIG. 8, the media control interface 80*b* includes a media video confirmation control 81*c*. The object 81*b* may perform a trigger operation on the media video confirmation control 81*c*. In this case, the terminal device can switch the media control interface 80*b* to a media control interface 80*c* in response to the trigger operation performed by the object 81*b* on the media video confirmation control 81*c*. The media control interface 80*c* may include a media video storage control 83*a*, a media video sharing control 83*b*, and a media video posting control 83*c*. The media video storage control 83*a* may be configured to store the annotated video data 82*b* into the photos in the terminal device, the media video sharing control 83*b* may be configured to share the annotated video data 82*b* to another platform other than the video application, and the media video posting control 83*c* may be configured to post the annotated video data 82*b* within the video application.

It is to be understood that, for a specific process of posting the annotated video data 82*b* by the terminal device based on the media video posting control 83*c*, reference may be made to the above description of posting the annotated image data 61*d* based on the media image posting control 62*a* in the embodiment corresponding to FIG. 6*a*. The details are not described herein.

As shown in FIG. 8, the media control interface 80*b* further includes a media video adjustment control 81*d*. The media video adjustment control 81*d* may be configured to adjust video information of the annotated video data 82*b*, and update the annotated video data 82*b* through adjusted annotated video data 82*b*. The video information of the annotated video data 82*b* may include a video duration and a video position. The video duration may represent an interception duration of the annotated video data 82*b* in the target video data, and the video position may represent an interception start time and an interception end time of the annotated video data 82*b* in the target video data.

In another possible implementation, the annotated media data may include the annotated GIF image data intercepted from the target video data. It is to be understood that, the terminal device can display a media GIF image interception control associated with the progress time point annotation function on the video playback interface of the video application. Further, the terminal device can display the annotated GIF image data in a GIF image annotation area of the video application in response to a trigger operation performed on the media GIF image interception control. A binding relationship exists between the annotated GIF image data and the current progress time point. The current progress time point is used for determining the interception start time in the target video data.

Figure 9:
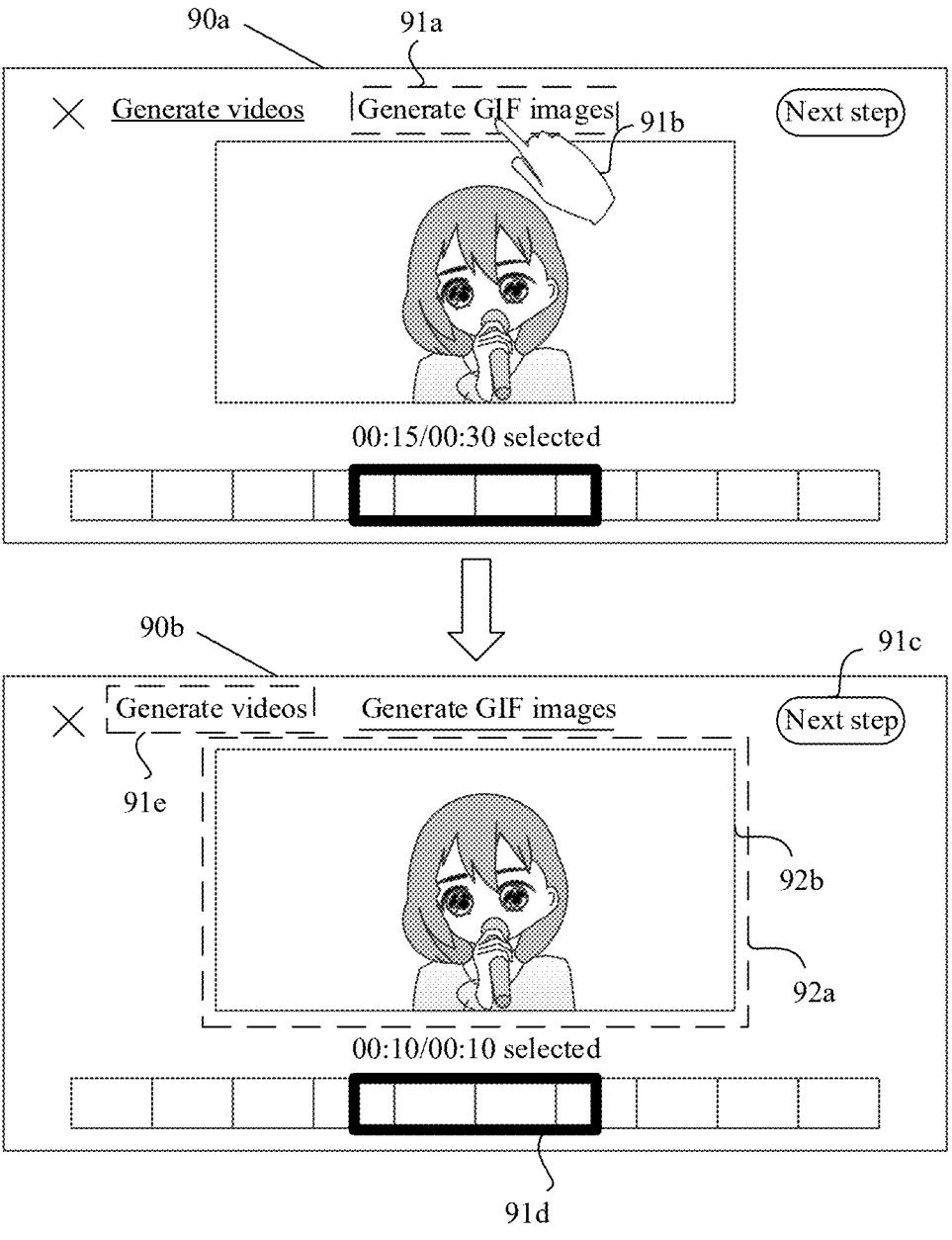
FIG. 9 is a schematic diagram of a scenario of intercepting annotated graphics interchange format (GIF) image data according to an embodiment of this application.

For ease of understanding, FIG. 9 is a schematic diagram of a scenario of intercepting annotated GIF image data according to an embodiment of this application. A media control interface 90*a* shown in FIG. 9 may be the above media control interface 80*b* in the embodiment corresponding to FIG. 8. The media control interface 90*a* may include a media GIF image interception control 91*a* (that is, a GIF image switch control 91*a*). An object 91*b* may perform a trigger operation on the media GIF image interception control 91*a*. In this case, the terminal device can switch the media control interface 90*a* to a media control interface 90*b* and display annotated GIF image data 92*b* in a GIF image annotation area 92*a* of the media control interface 90*b* in response to the trigger operation performed by the object 91*b* on the media GIF image interception control 91*a*. A start progress time point of the annotated GIF image data 92*b* herein in the target video data is the current progress time point. The annotated GIF image data 92*b* can be automatically played in the GIF image annotation area 92*a*.

It is to be understood that, FIG. 9 shows a specific process of intercepting the annotated GIF image data on the full-screen playback interface. For the specific process of intercepting the annotated GIF image data on the half-screen playback interface, reference may be made to the above description of intercepting the annotated GIF image data on the full-screen playback interface. The details are not described in this application.

As shown in FIG. 9, the media control interface 90*b* may further include a video switch control 91*e*. The object 91*b* may perform a trigger operation on the video switch control 91*e*. In this case, the terminal device can switch the media control interface 90*b* back to the media control interface 90*a* in response to the trigger operation performed by the object 91*b* on the video switch control 91*e*.

As shown in FIG. 9, the media control interface 90*b* further includes a media GIF image confirmation control 91*c*. The object 91*b* may perform a trigger operation on the media GIF image confirmation control 91*c*. In this case, the terminal device can switch the media control interface 90*b* in response to the trigger operation performed by the object 91*b* on the media GIF image confirmation control 91*c*. For a media control interface 90*b* after the switching, reference may be made to the above media control interface 80*c* in the embodiment corresponding to FIG. 8. The details are not described herein. The media control interface 90*b* after the switching may include a media GIF image posting control. It is to be understood that, for a specific process of posting the annotated GIF image data by the terminal device based on the media GIF image posting control, reference may be made to the above description of posting the annotated image data 61*d* based on the media image posting control 62*a* in the embodiment corresponding to FIG. 6A. The details are not described herein.

As shown in FIG. 9, the media control interface 90*b* further includes a media GIF image adjustment control 91*d*. The media GIF image adjustment control 91*d* may be configured to adjust GIF image information of the annotated GIF image data 92*b*, and update the annotated GIF image data 92*b* through adjusted annotated GIF image data 92*b*. The GIF image information of the annotated GIF image data 92*b* may include a GIF image duration and a GIF image position. The GIF image duration may represent a quantity of video frames of the annotated GIF image data 92*b* in the target video data, and the GIF image position may represent an interception start time and an interception end time of the annotated GIF image data 92*b* in the target video data.

Refer to FIG. 8 and FIG. 9 together. Similar to the implementation of the media video interception control 91*a*, the terminal device can directly display the media GIF image interception control 91*a* (not shown in the figure) on the video playback interface 80*a*. The terminal device can switch the video playback interface 80*a* to the media control interface 90*b* and display the annotated GIF image data 92*b* in the GIF image annotation area 92*a* of the media control interface 90*b* in response to the trigger operation performed on the media GIF image interception control 91*a* on the video playback interface 80*a*.

It is to be understood that, the annotated GIF image data and the annotated video data both may represent annotated media data intercepted from the target video data. The annotated video data may be understood as a video clip in the target video data, and the annotated GIF image data may be understood as a dynamic image composed of key video frames in the target video data. The key video frames are obtained through frame extraction of the target video data. In addition, the annotated video data has a sound, and the annotated GIF image data has no sound.

S103: Post the annotated media data in response to a confirmation operation performed on the annotated media data.

Posted annotated media data has a function of instructing the target video data to perform a progress jump based on the current progress time point. For a specific process of performing the progress jump on the target video data based on the posted annotated media data, reference may be made to the following description in an embodiment corresponding to FIG. 17.

It may be understood that, if the annotated media data includes the annotated image data, the terminal device can display a media image posting control corresponding to the annotated image data in the video application. The media image posting control may be the above media image posting control 62*c* in the embodiment corresponding to FIG. 6A, or may be the above media image posting control 64*e* in the embodiment corresponding to FIG. 6B. Further, the terminal device can post annotated image data bound with the current progress time point in response to the confirmation operation performed on the media image posting control.

It may be understood that, if the annotated media data includes the annotated text data and the to-be-posted comment media data, the terminal device can display a media text posting control corresponding to the annotated text data in the video application. The media text posting control may be the above media text posting control 72*c* in the embodiment corresponding to FIG. 7A, or may be the above media text posting control 74*d* in the embodiment corresponding to FIG. 7B. Further, the terminal device can post the to-be-posted comment media data and annotated text data bound with the current progress time point in response to a trigger operation performed on the media text posting control. The to-be-posted comment media data may be media data bound with the current progress time point, or may be media data unbound with the current progress time point, which is not limited herein.

It may be understood that, if the annotated media data includes the annotated text data and the annotated image data, the terminal device can display both the annotated text data and a media data posting control in the comment annotation area. The media data posting control may be the above media data posting control 72*c* in the embodiment corresponding to FIG. 7A. Further, the terminal device can post the annotated text data bound with the current progress time point and the annotated image data bound with the current progress time point in response to a trigger operation performed on the media data posting control.

It may be understood that if the annotated media data includes the annotated video data, the terminal device can display a media video posting control corresponding to the annotated video data in the video application in response to a confirmation operation performed on the annotated video data (for example, in response to a trigger operation performed on a media video confirmation control). The media video posting control may be the above media video posting control 83*c* in the embodiment corresponding to FIG. 8. Further, the terminal device can post annotated video data bound with the current progress time point in response to a confirmation operation performed on the media video posting control.

It may be understood that, if the annotated media data includes the annotated GIF image data, the terminal device can display a media GIF image posting control corresponding to the annotated GIF image data in the video application in response to a confirmation operation performed on the annotated GIF image data (for example, in response to a trigger operation performed on a media GIF image confirmation control). Further, the terminal device can post annotated GIF image data bound with the current progress time point in response to a confirmation operation performed on the media GIF image posting control.

It may be understood that, if the annotated media data includes the to-be-posted comment media data, the terminal device can display a media text posting control corresponding to the to-be-posted comment media data in the video application. Further, the terminal device can post the to-be-posted comment media data in response to a trigger operation performed on the media text posting control. The to-be-posted comment media data may be media data bound with the current progress time point, or may be media data unbound with the current progress time point, which is not limited herein.

It may be understood that, if the annotated media data includes the to-be-posted comment media data and the annotated image data, the terminal device can display a media image posting control corresponding to the annotated image data in the video application. Further, the terminal device can display the media data posting control in the comment annotation area of the video application in response to a confirmation operation performed on the media image posting control. Further, the terminal device can display the inputted to-be-posted comment media data in the comment annotation area in response to the input operation performed on the comment annotation area. Further, the terminal device can post the to-be-posted comment media data and the annotated image data in response to the trigger operation performed on the media data posting control.

Figure 10A:
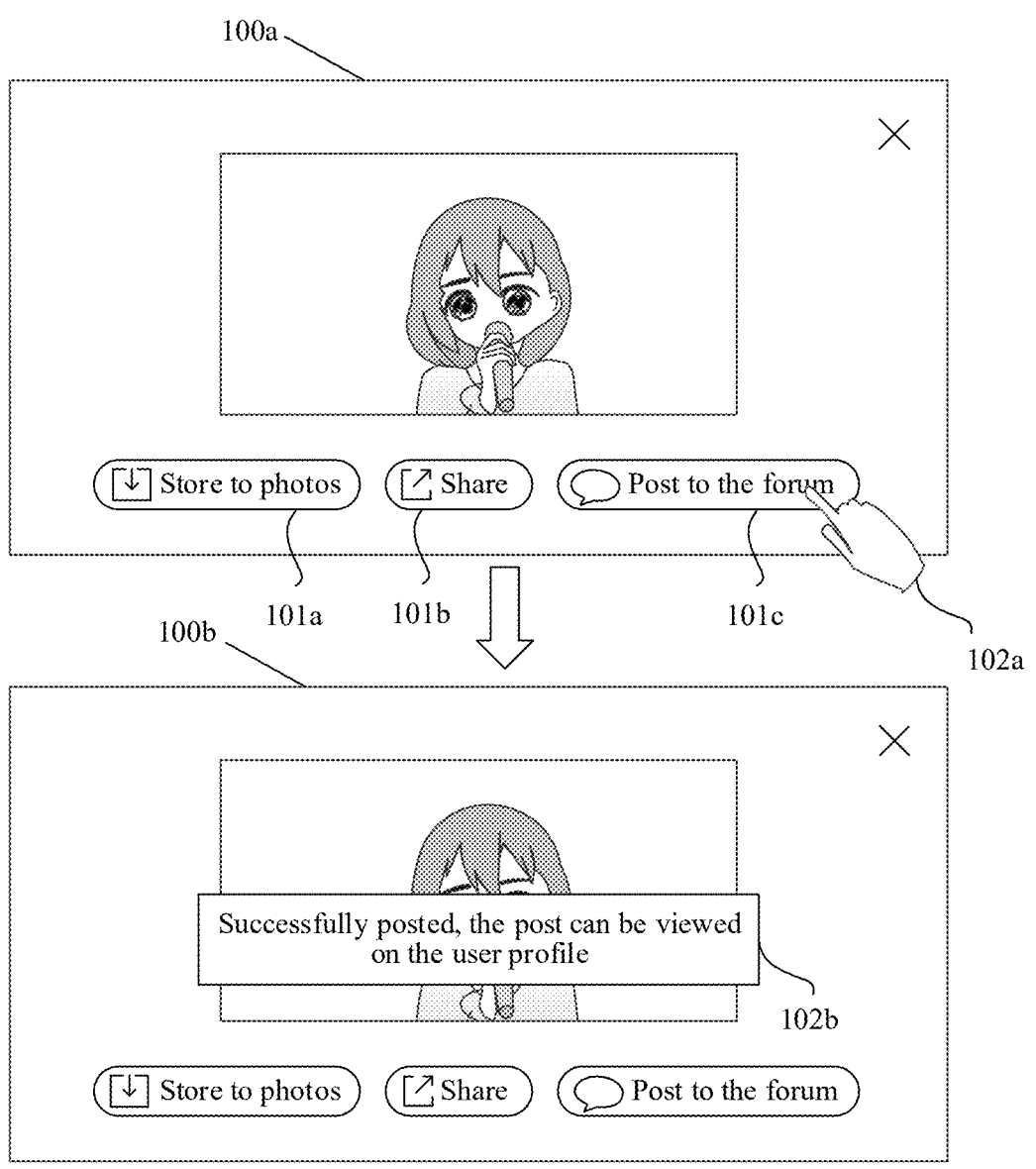
FIG. 10A is a schematic diagram of a scenario of posting annotated media data according to an embodiment of this application.
Figure 10B:
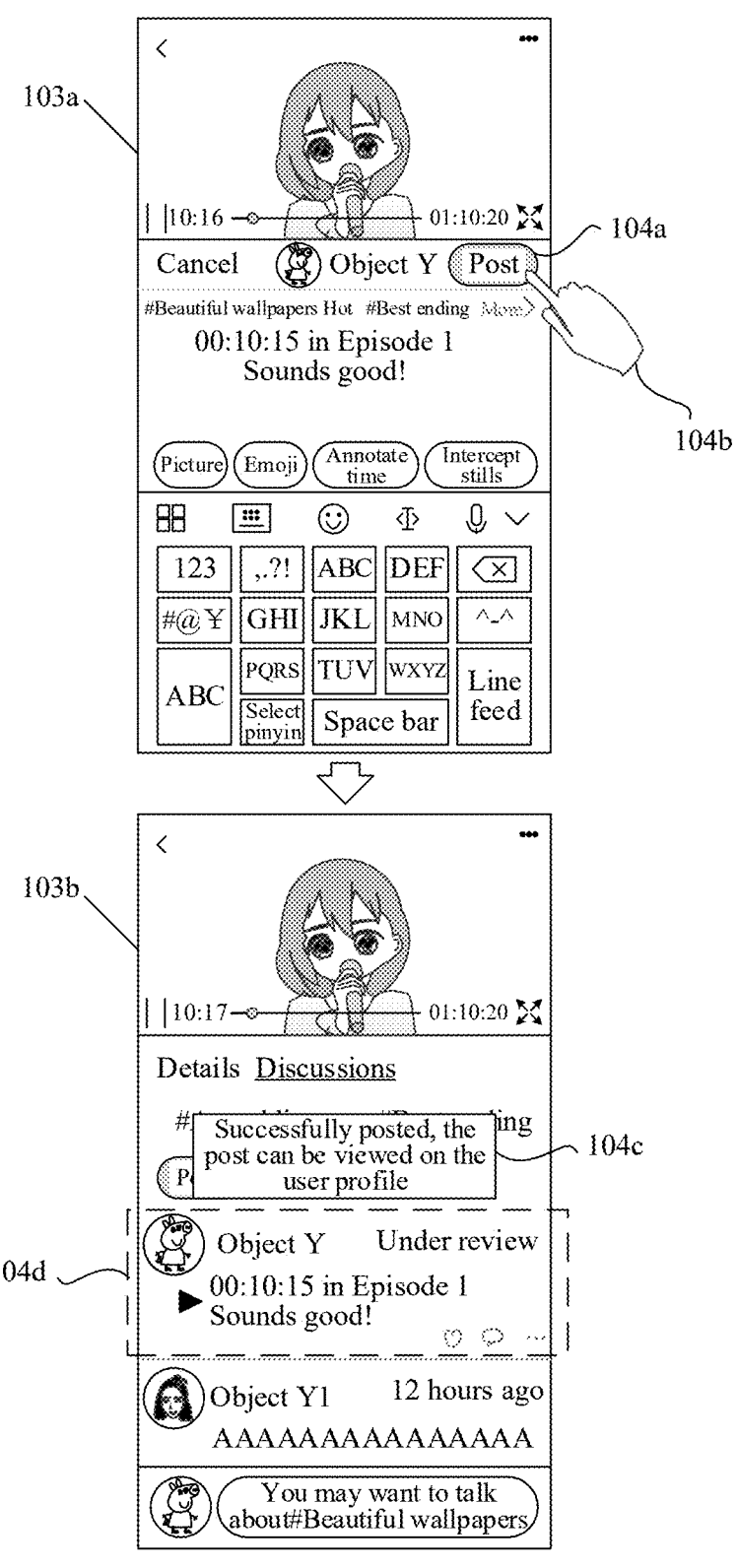
FIG. 10B is a schematic diagram of a scenario of posting annotated media data according to an embodiment of this application.

For ease of understanding, FIG. 10A and FIG. 10B are schematic diagrams of a scenario of posting annotated media data according to an embodiment of this application. FIG. 10A is a schematic diagram of a scenario of posting the annotated media data on the media control interface, and FIG. 10B is a schematic diagram of a scenario of posting the annotated media data on the video playback interface.

A media control interface 100*a* shown in FIG. 10A may be the above media control interface 60*b* in the embodiment corresponding to FIG. 6A, or may be the above media control interface 80*c* in the embodiment corresponding to FIG. 8. A description is provided herein by using an example in which the media control interface 100*a* is the media control interface 60*b*. The media control interface 100*a* may include a media image storage control 101*a*, a media image sharing control 101*b*, and a media image posting control 101*c*.

As shown in FIG. 10A, an object 102*a* may perform a trigger operation on the media image posting control 101*c*. In this case, the terminal device can post annotated media data (that is, annotated image data) displayed in the media control interface 100*a* and display posting prompt information 102*b* in the media control interface 100*a* to obtain a media control interface 100*b* in response to the trigger operation performed by the object 102*a* on the media image posting control 101*c*. The posting prompt information 102*b* herein may be "Successfully posted, the post can be viewed on the user profile". It may be understood that, the terminal device can switch the media control interface 100*b* to a media reading interface 183*c* in an embodiment corresponding to FIG. 18B in the following description in response to a trigger operation performed on the posting prompt information 102*b*.

A video playback interface 103*a* shown in FIG. 10B and the above video playback interface 73*b* in the embodiment corresponding to FIG. 7B may be video playback interfaces of the video application at different moments. The video playback interface 103*a* may include a media text posting control 104*a*.

As shown in FIG. 10B, an object 104*b* may perform a trigger operation on the media text posting control 104*a*. In this case, the terminal device can post annotated media data (that is, annotated text data and to-be-posted comment media data) displayed on the video playback interface 103*a* and display posting prompt information 104*c* on the video playback interface 103*a* to obtain a video playback interface 103*b* in response to the trigger operation performed by the object 104*b* on the media text posting control 104*a*. The posting prompt information 104*c* herein may be "Successfully posted, the post can be viewed on the user profile". The video playback interface 103*b* herein may also be referred to as a long bottom forum. It may be understood that, the terminal device can switch the video playback interface 103*b* to a media reading interface 183*c* in an embodiment corresponding to FIG. 18B in the following description in response to a trigger operation performed on the posting prompt information 104c.

As shown in FIG. 10B, the video playback interface 103b further includes a media data display area 104d. The terminal device can display annotated media data under posting in the media data display area 104d. The annotated media data under posting indicates that the annotated media data is being posted (that is, under review). In this case, the server is reviewing the annotated media data. After the server successfully reviews the annotated media data, "under review" displayed in the media data display area 104d may be updated to a time at which the annotated media data is posted.

It may be learned from the above that, in the embodiments of this application, the current progress time point can be bound to the annotated media data to implement an association between the annotated media data and the target video data. Therefore, after the annotated media data is posted, the progress jump can be performed on the target video data through the current progress time point bound to the posted annotated media data. In other words, the playback progress of the target video data in the video application can intelligently jump to the playback progress indicated by the current progress time point. In this way, manual positioning of the playback progress associated with the annotated media data in the target video data is not required. Instead, the positioning is implemented based on the association between the annotated media data and the target video data, which improves efficiency of video progress positioning.

FIG. 11 is a schematic flowchart of a data processing method according to an embodiment of this application. The data processing method may include the following S1021 to S1022, and S1021 to S1022 are an embodiment in a possible case of S102 in the embodiment corresponding to FIG. 3.

S1021: Display a media annotation control associated with the progress time point annotation function on a video playback interface of the video application.

It is to be understood that, the terminal device can display a comment display control associated with the progress time point annotation function on the video playback interface of the video application. Further, the terminal device can display a comment display area on the video playback interface in response to a trigger operation performed on the comment display control. The comment display area includes a comment input area. The comment input area may also be referred to as a forum. The comment input area may be a posting entrance of the forum. Further, the terminal device can display a media annotation area on the video playback interface in response to a trigger operation performed on the comment input area. The media annotation area includes a media annotation control. The media annotation area may also be referred to as a post posting page.

The media annotation control may include at least one of a media image interception control, a media text interception control, a media video interception control, or a media GIF image interception control. In other words, in this embodiment of this application, the media image interception control, the media text interception control, the media video interception control, and the media GIF image interception control may be collectively referred to as a media annotation control. Similarly, in this embodiment of this application, an image annotation area, a text annotation area, a comment annotation area, a video annotation area, and a GIF image annotation area may be collectively referred to as a media annotation area. Similarly, in this embodiment of this application, a media image posting control, a media text posting control, a media data posting control, a media video posting control, and a media GIF image posting control may be collectively referred to as a media posting control.

Figure 12A:
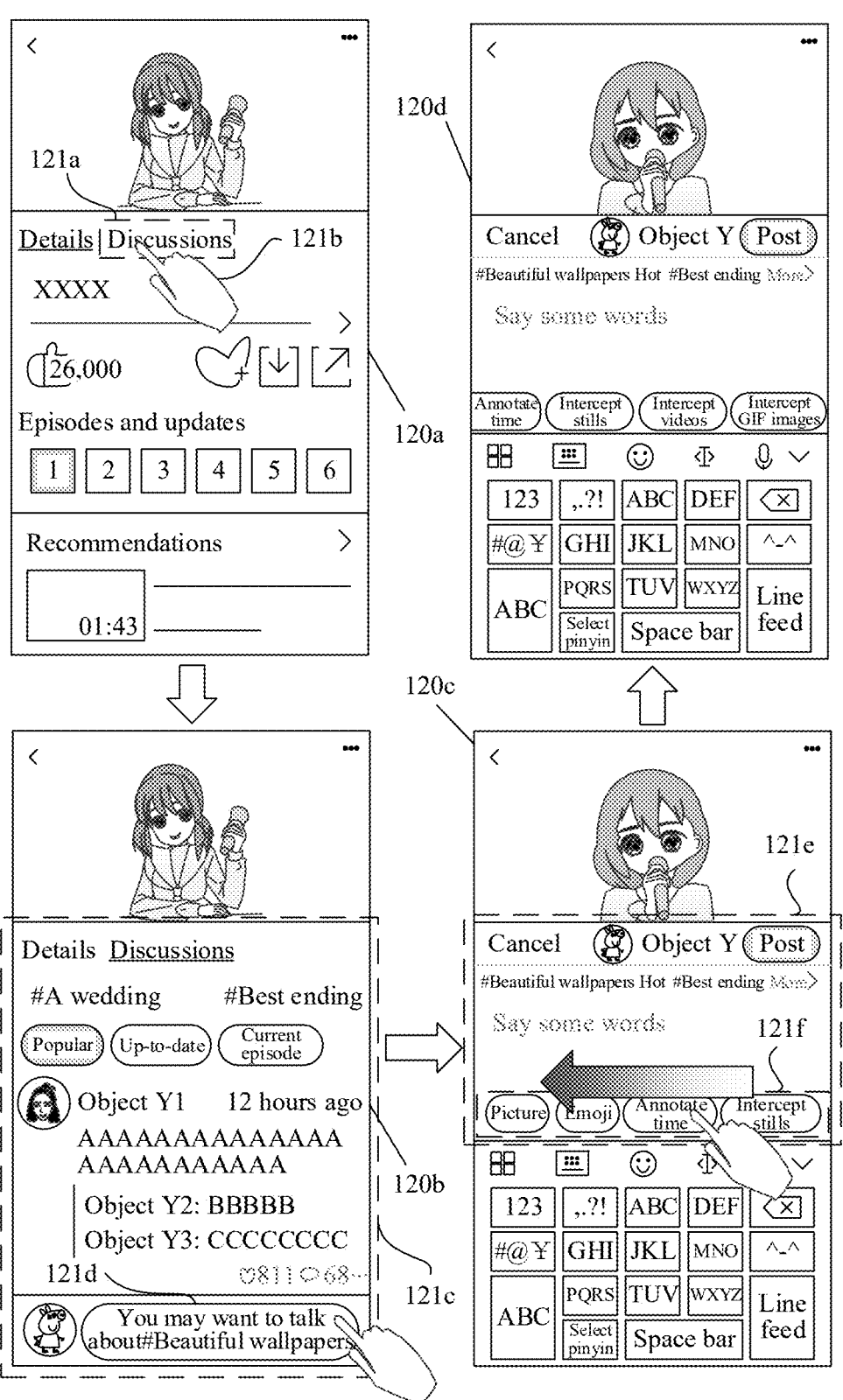
FIG. 12A is a schematic diagram of a scenario of displaying a media annotation control according to an embodiment of this application.
Figure 12B:
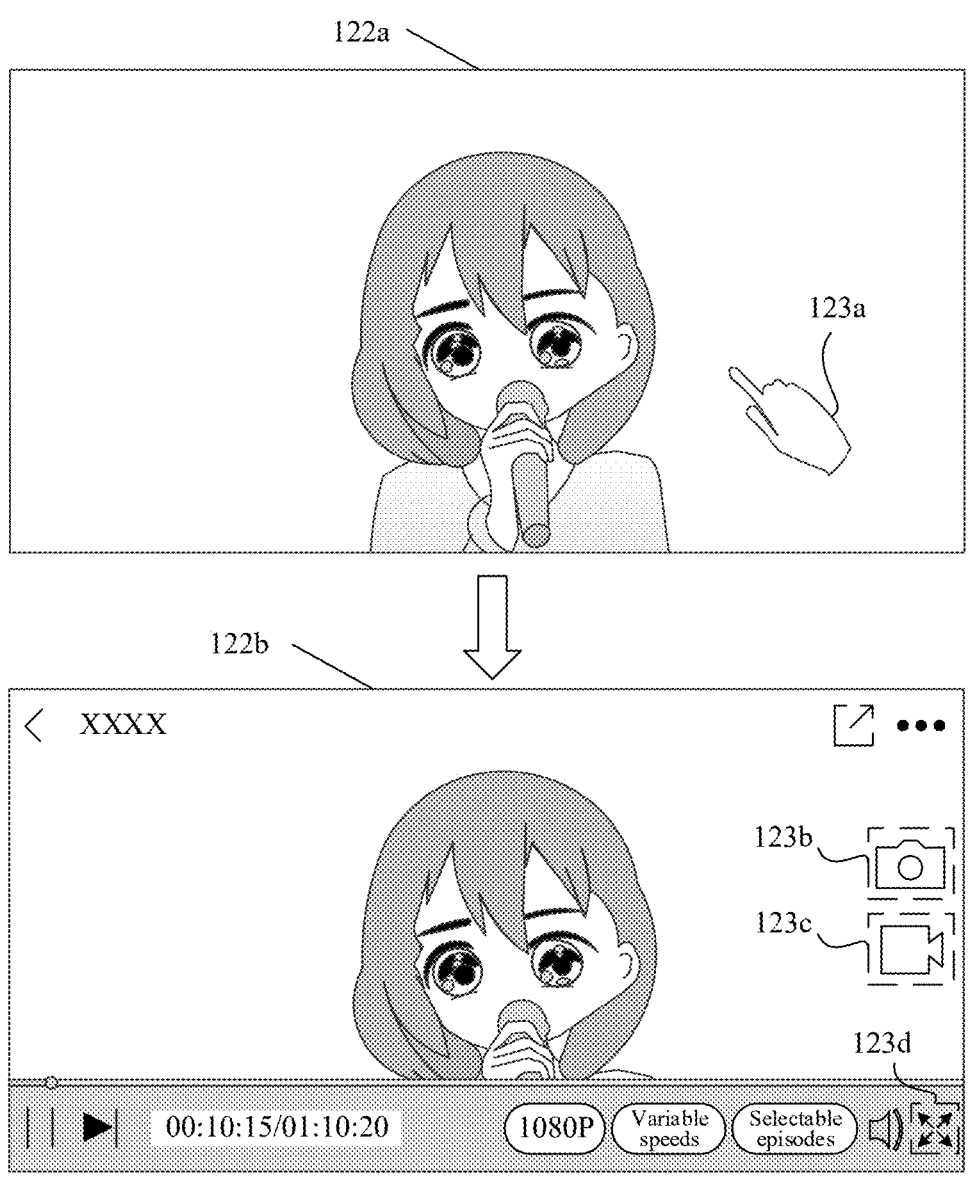
FIG. 12B is a schematic diagram of a scenario of displaying a media annotation control according to an embodiment of this application.

For ease of understanding, FIG. 12A and FIG. 12B are schematic diagrams of a scenario of displaying a media annotation control according to an embodiment of this application. FIG. 12A is a schematic diagram of a scenario of displaying the media annotation control on a half-screen playback interface, and FIG. 12B is a schematic diagram of a scenario of displaying the media annotation control on a full-screen playback interface.

A video playback interface 120a shown in FIG. 12A and the above video playback interface 50a in the embodiment corresponding to FIG. 5 may be video playback interfaces of the video application at different moments. The video playback interface 120a includes a comment display control 121a associated with the progress time point annotation function. An object 121b may perform a trigger operation on the comment display control 121a. In this case, the terminal device can switch the video playback interface 120a to a video playback interface 120b and display a comment display area 121c on the video playback interface 120b in response to the trigger operation performed by the object 121b on the comment display control 121a.

The comment display area 121c may be configured to display comment media data associated with target video data, as shown in FIG. 12A. The comment media data herein may include first comment media data posted by an object Y1, second comment media data returned by an object Y2 for the first comment media data, and third comment media data returned by an object Y3 for the first comment media data. The first comment media data may be "AAAAAAAAAAAAAAAAAAAAAAAAAAA", the second comment media data may be "BBBBB", and the third comment media data may be "CCCCCCCC".

It may be understood that, the first comment media data may be annotated media data bound with a progress time point. Similarly, the second comment media data returned by the object Y2 for the first comment media data may be annotated media data bound with a progress time point. In other words, the first comment media data has a function of instructing the target video data to perform a progress jump based on the bound progress time point (that is, a first progress time point), and the second comment media data has a function of instructing the target video data to perform a progress jump based on the bound progress time point (that is, a second progress time point).

As shown in FIG. 12A, the comment display area 121c further includes a comment input area 121d. The object 121b may perform a trigger operation on the comment input area 121d. In this case, the terminal device can switch the video playback interface 120b to a video playback interface 120c and display a media annotation area 121e on the video playback interface 120c in response to the trigger operation performed by the object 121b on the comment input area 121d.

As shown in FIG. 12A, the media annotation area 121e includes a media annotation control 121f. The media annotation control 121f may include a media image interception control (that is, a "still interception" control) and a media text interception control (that is, a "time annotation" control). The object 121b may perform a flicking operation on the media annotation control 121f. In this case, the terminal device can display an updated media annotation control 121f in the media annotation area 121e in response to the flicking operation performed by the object 121b on the media annotation control 121f. The updated media annotation control 121f may include a media video interception control (that is, a "video interception" control) and a media GIF image interception control (that is, a "GIF image interception" control). The terminal device can display at least one of annotated image data, annotated text data, annotated video data, annotated GIF image data, or to-be-posted comment media data in the media annotation area 121e.

A video playback interface 122a shown in FIG. 12B and the above video playback interface 50b in the embodiment corresponding to FIG. 5 may be video playback interfaces of the video application at different moments. The video playback interface 122b shown in FIG. 12B may be the above video playback interface 60a in the embodiment corresponding to FIG. 6A. An object 123a may perform a trigger operation (for example, a click/tap operation) on the video playback interface 122a. In this case, the terminal device can display a media annotation control on the video playback interface 122a to obtain a video playback interface 122b in response to the trigger operation performed by the object 123a on the video playback interface 122a.

The media annotation control on the video playback interface 122b may include a media image interception control 123b and a media video annotation control 123c. Specific types of the media annotation control displayed on the video playback interface 122b are not displayed one by one herein. In addition, the media annotation control displayed on the video playback interface 122b may alternatively be one control. In other words, the media image interception control 123b and the media video annotation control 123c are one control displayed on the video playback interface 122b. In addition, the video playback interface 122b may further include a screen conversion control 123d (that is, a half-screen conversion control 123d). The screen conversion control 123d may be configured to switch a playback mode of the target video data in the video application.

Figure 13:
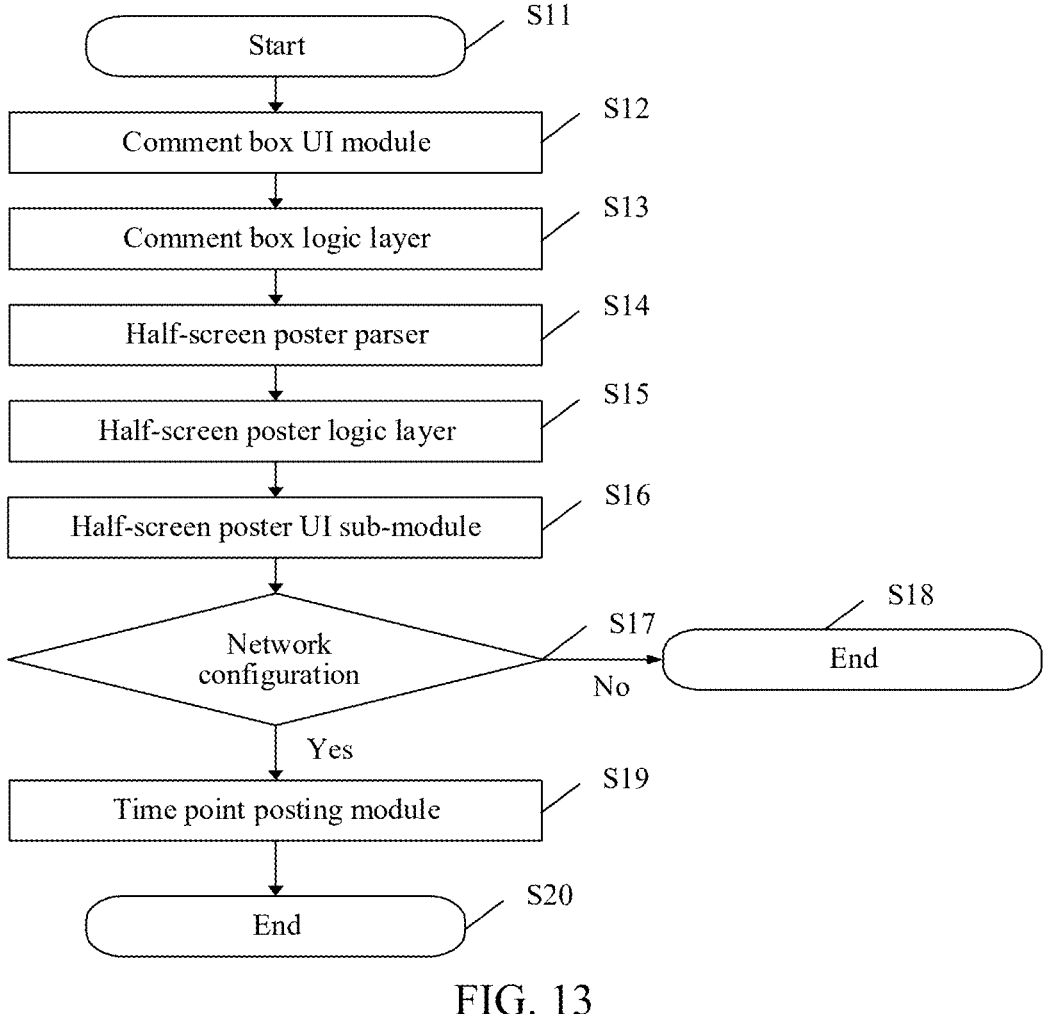
FIG. 13 is a schematic flowchart of calling a half-screen poster according to an embodiment of this application.

It is to be understood that, for a specific process of switching the video playback interface 121c shown in FIG. 12A to the video playback interface 121d (that is, S11 to S20), reference may be made to FIG. 13. FIG. 13 is a schematic flowchart of calling a half-screen poster according to an embodiment of this application. As shown in FIG. 13, the terminal device can perform S11 to start the process, call a comment box user interface (UI for short) module through S12 to display the comment input area 121d in the comment display area 121c, and then call a comment box logic layer in S13 through the comment box UI module in response to the trigger operation performed by the object 121b on the comment input area 121d (that is, a comment box 121d), so that the comment box logic layer calls the half-screen poster.

Since a precondition of time point annotation is that a posting page (that is, the media annotation area 121e) and a playback page (that is, a playback area) can exist simultaneously, the terminal device needs to parse and call the half-screen poster during pulling up of the posting page in a scenario that supports time point annotation. The half-screen poster may be understood as a component in the terminal device. The component is configured to pull up the posting page in the terminal device.

As shown in FIG. 13, the terminal device can perform S14, to call a half-screen poster parser through S14 to perform parsing, then perform S15, to call a half-screen poster logic layer through S15 to perform logical processing, and then perform S16 to call a half-screen poster UI sub-module through S16. The half-screen poster UI sub-module may be understood as a UI sub-module of a plurality of sub-modules of the half-screen poster. The UI sub-module may be configured to display the media annotation area 121e.

Further, the terminal device needs to check network configuration of the terminal device through S17 to determine whether the terminal device currently has a network. If the terminal device currently does not have the network, the terminal device can perform S18 to reject the display of the media annotation area 121e and end the process through S18. In some embodiments, if the terminal device currently has the network, the terminal device can perform S19 to call a time point posting module through S19 and to display the media annotation control 121f in the media annotation area 121e through the time point posting module, and then perform S20 to end the process.

S1022: Display the annotated media data in the media annotation area in response to a trigger operation performed on the media annotation control.

Specifically, if the annotated media data includes the annotated text data, the terminal device can transmit a progress time point annotation instruction to a player (that is, a playback component of the video application) through a poster (that is, the half-screen poster) at a current progress time point in response to a trigger operation performed on the media text interception control. Further, the terminal device can obtain progress time point information corresponding to a playback progress of the target video data through a core (that is, a player core) of the player, and transmit the progress time point information to a progress time point data generator. Further, the terminal device can render the progress time point information through the progress time point data generator, to obtain rendered progress time point information, and return the rendered progress time point information to the poster. Further, the terminal device can display annotated text data corresponding to the rendered progress time point information in the text annotation area of the video application through the poster.

It may be understood that, if the terminal device is playing the target video data through the player, the core of the player can directly obtain the playback progress of the target video data. In some embodiments, if the terminal device is playing advertisement data through the player, the core of the player can obtain a playback progress to which the target video data is to be played after an advertisement ends. In other words, the playback progress of the target video data is a playback progress of a first video frame in the target video data after the advertisement ends.

Figure 14:
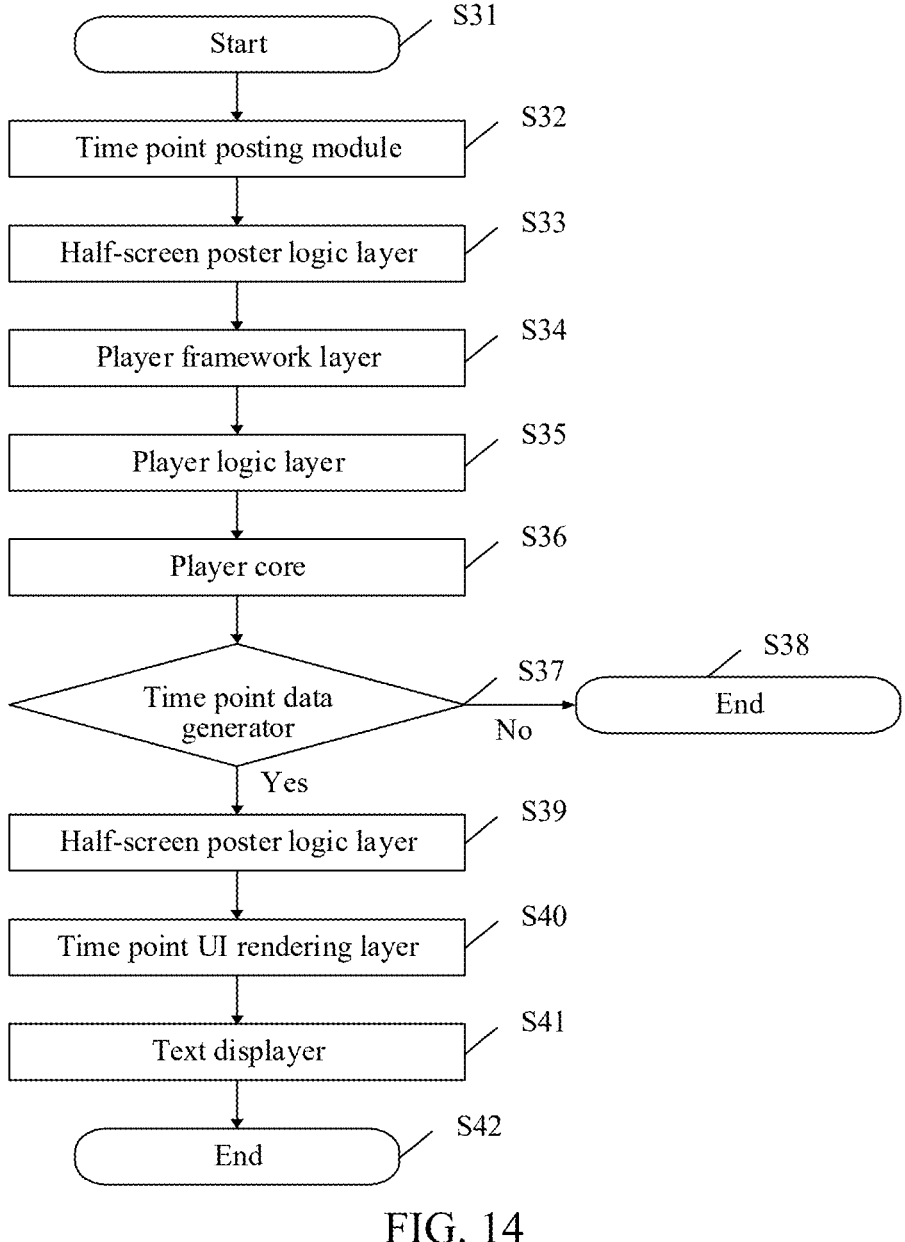
FIG. 14 is a schematic flowchart of generating annotated media data according to an embodiment of this application.

It is to be understood that, for a specific process of switching the video playback interface 73a shown in FIG. 7B to the video playback interface 73b (that is, S31 to S42), reference may be made to FIG. 14. FIG. 14 is a schematic flowchart of generating annotated media data according to an embodiment of this application. As shown in FIG. 14, the terminal device can perform S31 to start the process, and call the time point posting module through S32 in response to the trigger operation performed by the object 74c on the media text interception control 74b. In this case, data exchange needs to be performed between the player and the half-screen poster. In other words, in S33, the half-screen poster logic layer is called through the time point posting module to transmit the progress time point annotation instruction to the player, that is, the progress time point annotation instruction is transmitted to the player through the poster.

As shown in FIG. 14, the terminal device can perform S34 and S35 to process the progress time point annotation instruction through a framework layer of the player and a player logic layer, and then perform S36 to call the player core to transmit obtained progress time point information (that is, episode No. information and time point information) to the time point data generator through S36. The progress time point information is calculated in milliseconds. Therefore, an additional layer of time point data generator needs to be called. The time point data generator renders, through S37, obtained millisecond information into progress information such as hours, minutes, and seconds (that is, the rendered progress time point information) understandable by a viewing object.

As shown in FIG. 14, the time point data generator requires a network or needs to call another service. If the time point data generator fails to generate the rendered progress time point information, the terminal device can perform S38 to reject display of the annotated text data 74e and to end the process. In some embodiments, if the time point data generator successfully generates the rendered progress time point information, the terminal device can return the rendered progress time point information to the half-screen poster through the time point data generator.

As shown in FIG. 14, the terminal device can perform S39 to call the half-screen poster logic layer through S39 to receive the rendered progress time point information, then call a time point UI rendering layer through S40 to perform interface rendering, and then call a text displayer through S41 to display the annotated text data 74e in the text annotation area 74a of the video playback interface 73b, and then perform S42 to end the process. Similarly, to display annotated media data other than the annotated text data in the media annotation area, the terminal device can perform the process shown in FIG. 14. The details are not described herein.

It is to be understood that, if the annotated media data includes the annotated video data, the terminal device can input the target video data to a target classification model at the triggered progress time point in response to the trigger operation performed the media video interception control, and classify video frames in the target video data through the target classification model, to obtain scene classification information corresponding to the video frames in the target video data. Further, the terminal device can obtain intercepted video data having an interception duration from the target video data. A progress time point of a start video frame in the intercepted video data is equal to the triggered progress time point, the intercepted video data includes N video frames, and N herein may be a positive integer greater than 1. Further, the terminal device can obtain a quantity M of first video frames in the intercepted video data. The first video frames are video frames in the intercepted video data having scene classification information equal to start scene classification information, M herein may be a positive integer less than or equal to N, and the start scene classification information is scene classification information corresponding to the start video frame in the intercepted video data. Further, annotated video data having the interception duration is obtained from the target video data based on the start scene classification information and the start video frame in the intercepted video data and the annotated video data is displayed in the video annotation area of the video application when a ratio between M and N is less than a ratio threshold. A progress time point of the start video frame of the annotated video data is the current progress time point, the annotated video data includes the start video frame in the intercepted video data, a ratio between a quantity H of second video frames in the annotated video data and N is greater than or equal to the ratio threshold, and the second video frames are video frames in the annotated video data having scene classification information equal to the start scene classification information. In some embodiments, if the ratio between M and N is greater than or equal to the ratio threshold, the terminal device may directly use the intercepted video data as the annotated video data.

The terminal device may alternatively directly use the triggered progress time point as the current progress time point, that is, directly use the intercepted video data as the annotated video data. Therefore, in this embodiment of this application, the current progress time point can be intelligently determined in the target video data based on an auxiliary progress time point, which improves diversity of generated annotated video data.

The target classification model may be obtained through training of an initial classification model. In this embodiment of this application, the initial classification model may be trained based on a sample video frame and sample scene classification information of the sample video frame. Specifically, the terminal device can input the sample video frame into the initial classification model, output predicted scene classification information of the sample video frame through the initial classification model, and then determine a model loss value of the initial classification model based on the sample scene classification information and the predicted scene classification information, iteratively train the initial classification model based on the model loss value, and determine the initial classification model after the iterative training as the target classification model. It is to be understood that, model types of the initial classification model and the target classification model are not limited in this embodiment of this application.

It is to be understood that, after posting the annotated media data, the terminal device can display the posted annotated media data in the comment display area. The terminal device can store the posted annotated media data into a media database after posting the annotated media data. Further, the terminal device can call a comment media reading service during refreshing of the comment display area, read the posted annotated media data from the media database through the comment media reading service, and display the posted annotated media data in a refreshed comment display area.

Figure 15:
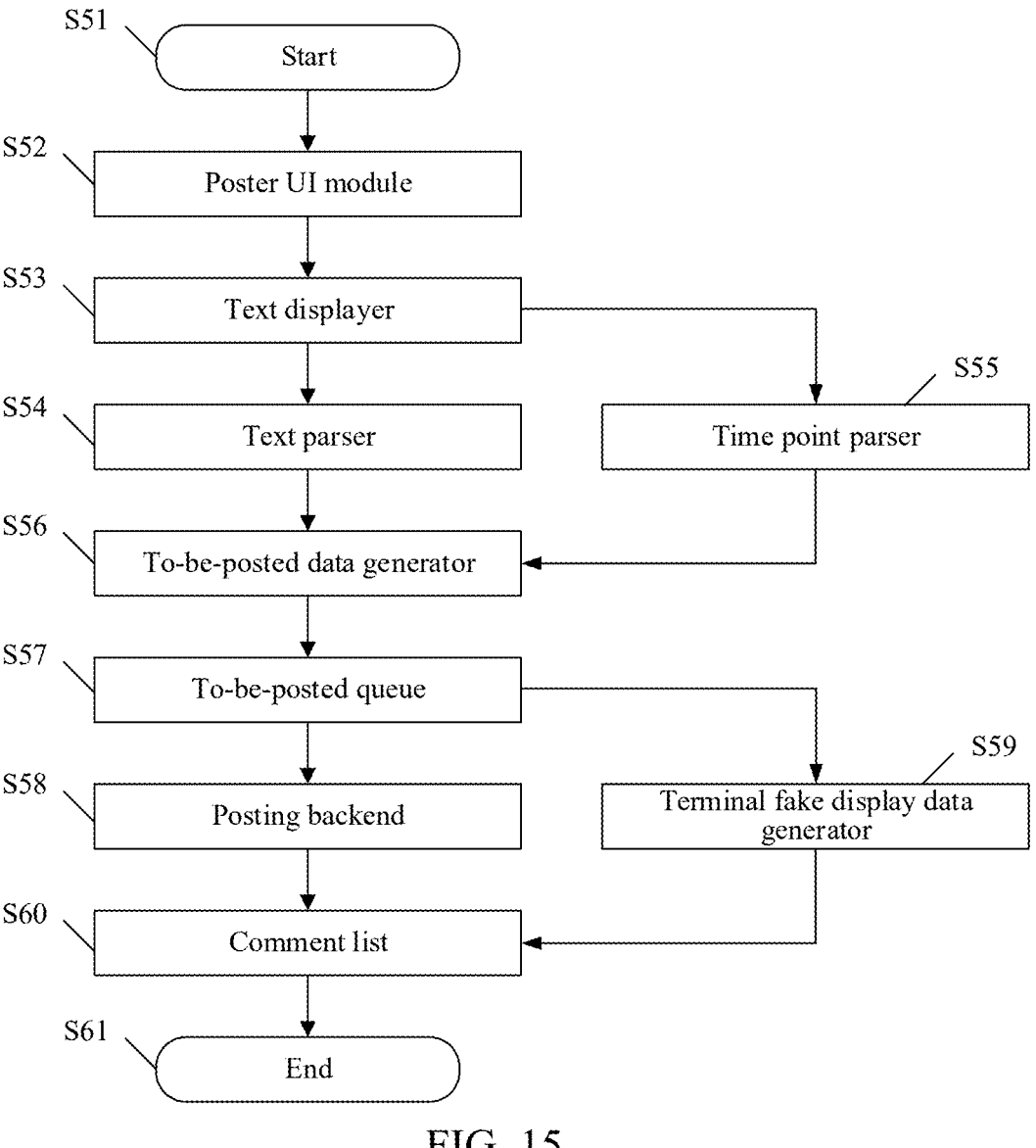
FIG. 15 is a schematic flowchart of posting annotated media data according to an embodiment of this application.

It is to be understood that, for a specific process of switching the video playback interface 103a shown in FIG. 10B to the video playback interface 103b (that is, S51 to S61), reference may be made to FIG. 15. FIG. 15 is a schematic flowchart of posting annotated media data according to an embodiment of this application. As shown in FIG. 15, the terminal device can perform S51 to start the process, call a poster UI module through S52 to display the media text posting control 104a on the video playback interface 103a, then call the text displayer through S53 in response to the trigger operation performed by the object 104b on the media text posting control 104a, then call a text parser through S54 to parse the to-be-posted comment media data, and call a time point parser through S55 to parse the annotated text data. The text parser and the time point parser can determine whether text in the annotated media data is to-be-posted comment media data or annotated text data.

As shown in FIG. 15, the terminal device can call a to-be-posted data generator through S56 to generate annotated media data including the to-be-posted comment media data and the annotated text data. Further, the terminal device needs to call a posting backend service to transmit the to-be-posted data to a backend (that is, the server) through the posting backend service. The server may perform S57 to store the annotated media data into a to-be-posted queue through S57, then call a posting backend through S58 to store the annotated media data into the media database, and obtain a comment list (that is, a list composed of comment media data) from the media database through S60 to display the comment media data in the comment list in the video application. The annotated text data may be stored into a post storage structure (that is, a video database in an embodiment corresponding to FIG. 16 in the following description), and time point information in a video material (that is, annotated text data) is read during display of a post, which is used for displaying of a post with a time point.

In addition, in the process of posting the annotated text data and the to-be-posted comment media data, the terminal device can call a terminal fake display data generator through S59, to display the annotated media data under posting (that is, the above annotated media data under posting displayed in the media data display area 104d in the embodiment corresponding to FIG. 10B) in the media data display area 104d through the terminal fake display data generator.

Figures 16, 17:
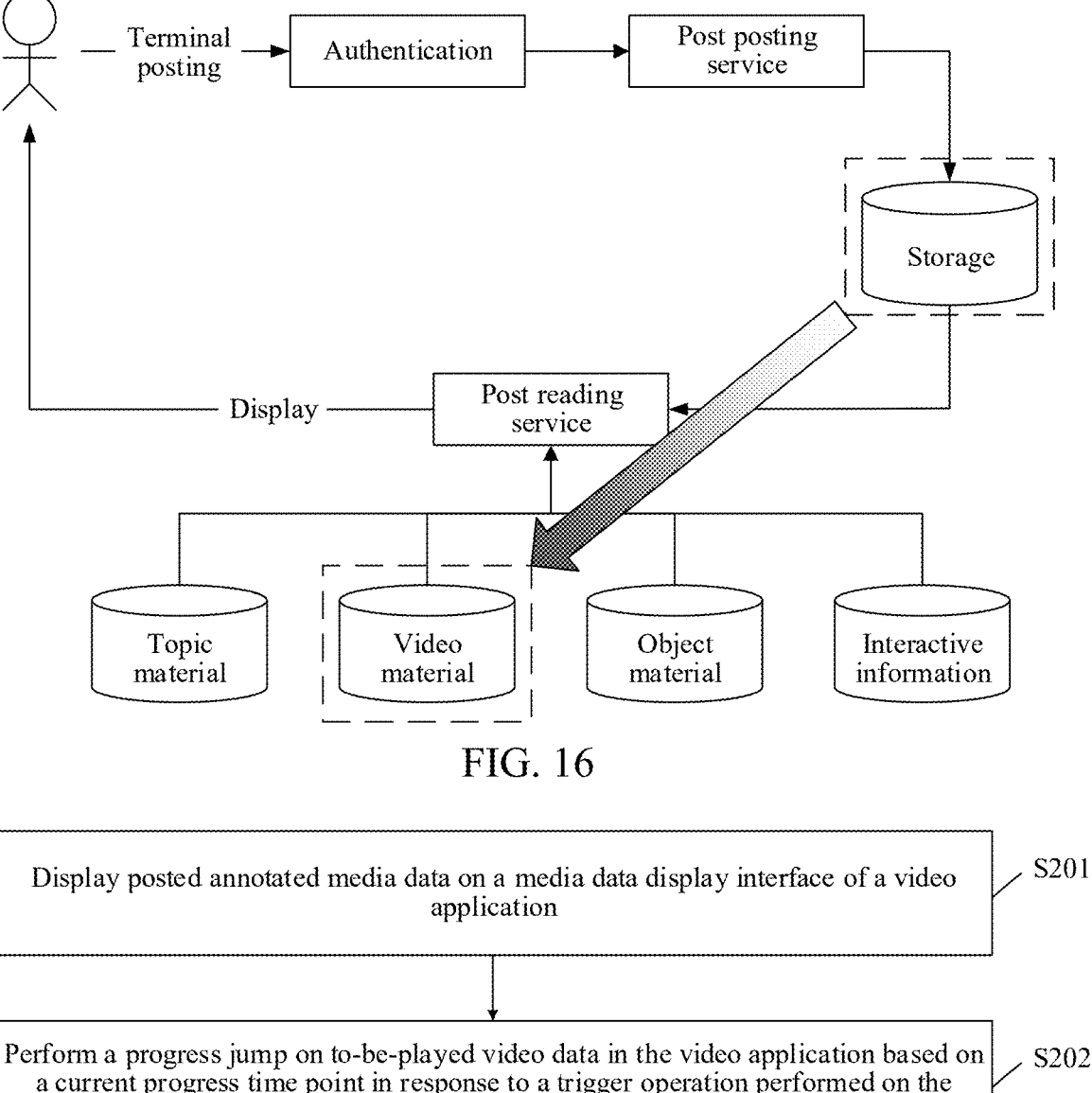
FIG. 16 is a schematic diagram of a scenario of posting annotated media data according to an embodiment of this application.
FIG. 17 is a schematic flowchart of a data processing method according to an embodiment of this application.

For ease of understanding, FIG. 16 is a schematic diagram of a scenario of posting annotated media data according to an embodiment of this application. As shown in FIG. 16, a viewing object may post the annotated media data through the terminal device. In this case, the terminal device needs to authenticate the viewing object to determine whether the viewing object has permission to post the annotated media data, that is, to determine whether the viewing object logs in the video application.

As shown in FIG. 16, if the terminal device determines that the authentication succeeds (that is, the viewing object logs in the video application), the terminal device can call a post posting service to store the annotated media data into the media database, and call a post reading service to read comment media data for displaying in the terminal device from the media database. The comment media data may include the posted annotated media data. In some embodiments, if the terminal device determines that the authentication fails (that is, the viewing object does not log in the video application), the terminal device does not need to store the annotated media data.

It is to be understood that, the video application may correspond to a plurality of databases. The plurality of databases may specifically include a topic database, a video database, an object database, and an interactive database. The video database may be configured to store video materials, the interactive database may be configured to store interactive information, the object database may be configured to store object materials, . . . , and the topic database may be configured to store topic materials. The interactive information may represent information related to video data such as likes and comments. Therefore, the terminal device can call the post posting service to store the annotated media data into the video database, and call the post reading service to read the comment media data from the video database.

It may be understood that, this application relates to related data such as the object materials and the interactive information. User permission or consent needs to be obtained when the above embodiments of this application are applied to specific products or technologies, and the collection, use, and processing of related data need to comply with relevant national laws and regulations and national standards.

The comment display area is configured to display comment media data associated with the target video data. The comment display area further includes an annotation function control. It is to be understood that, the terminal device can display a progress time point list in the video application in response to a trigger operation performed on the annotation function control. List items in the progress time point list include progress time points having a binding relationship with the comment media data, the progress time points having the binding relationship with the comment media data are ranked based on a quantity of the comment media data to which the progress time points are bound, and the progress time points having the binding relationship with the comment media data include a candidate progress time point. In other words, the list items in the progress time point list include progress time points associated with the comment media data, the progress time points associated with the comment media data are ranked based on a quantity of the comment media data with which the progress time points are associated, and the progress time points associated with the comment media data include a candidate progress time point. Further, the terminal device can perform a progress jump on the target video data in the video application based on the candidate progress time point in response to a trigger operation performed on the candidate progress time point.

In addition, the list items in the progress time point list further include a candidate media reading control corresponding to the candidate progress time point. It is to be understood that, the terminal device can display comment media data having a binding relationship with the candidate progress time point in the video application in response to a trigger operation performed on the candidate media reading control. In other words, the terminal device can display comment media data associated with the candidate progress time point in the video application in response to the trigger operation performed on the candidate media reading control.

It may be learned from the above that, in this embodiment of this application, the annotated media data may be displayed in the media annotation area in response to the trigger operation performed on the media annotation control on the video playback interface. The annotated media data is bound with the current progress time point. The current progress time point carried in the annotated media data enables the terminal device to quickly perform the progress jump on the target video data based on the current progress time point in response to a trigger operation performed on the annotated media data. Through the progress jump, the playback progress of the target video data can be positioned to a playback progress indicated by the current progress time point, which can improve efficiency of video progress positioning in a movie-watching scenario.

FIG. 17 is a schematic flowchart of a data processing method according to an embodiment of this application. The method may be performed by a server, or may be performed by a terminal device, or may be performed jointly by the server and the terminal device. The server may be the above server 20a in the embodiment corresponding to FIG. 2, and the terminal device may be the above terminal device 20b in the embodiment corresponding to FIG. 2. For ease of understanding, this embodiment of this application is described by using an example in which the method is performed by the terminal device. The data processing method may include the following S201 to S202.

S201: Display posted annotated media data on a media data display interface of a video application.

Figure 18A:
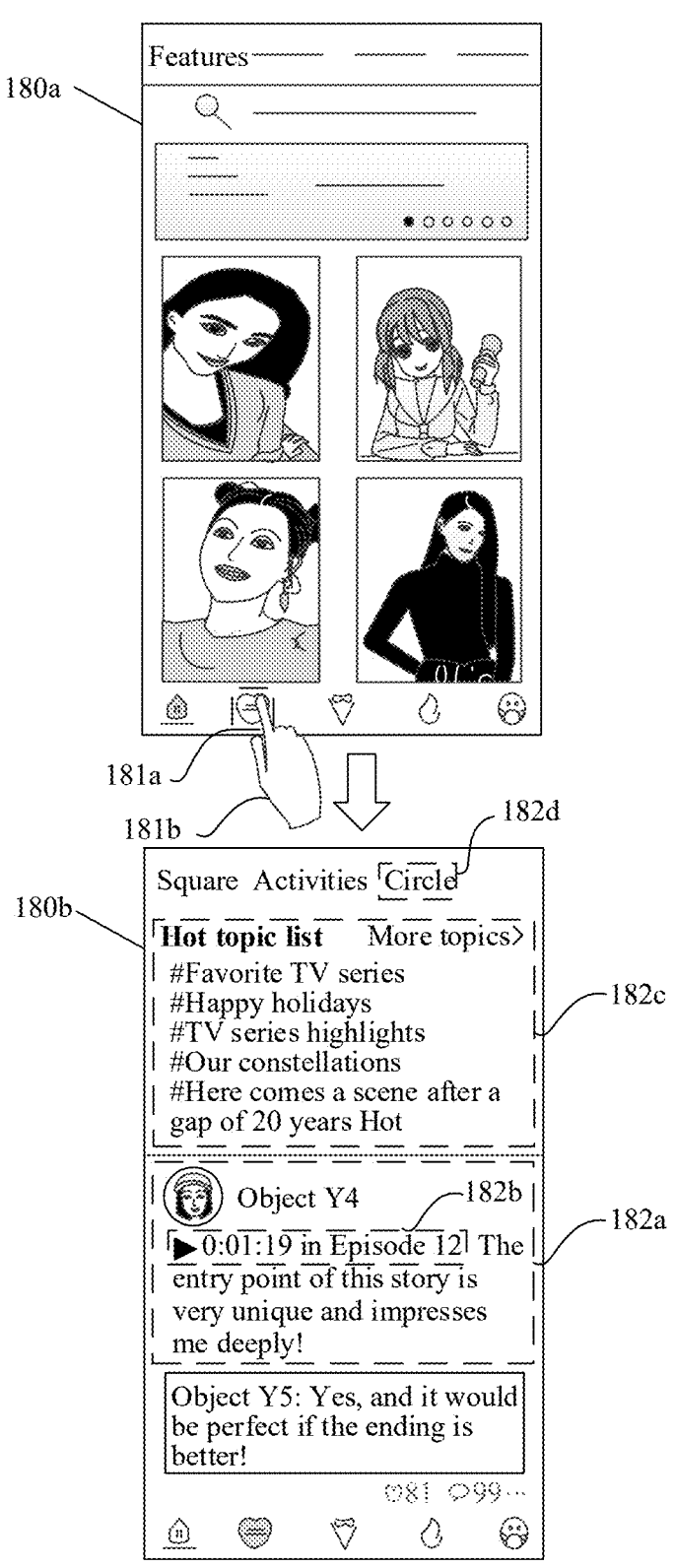
FIG. 18A is a schematic diagram of a scenario of displaying annotated media data according to an embodiment of this application.
Figure 18B:
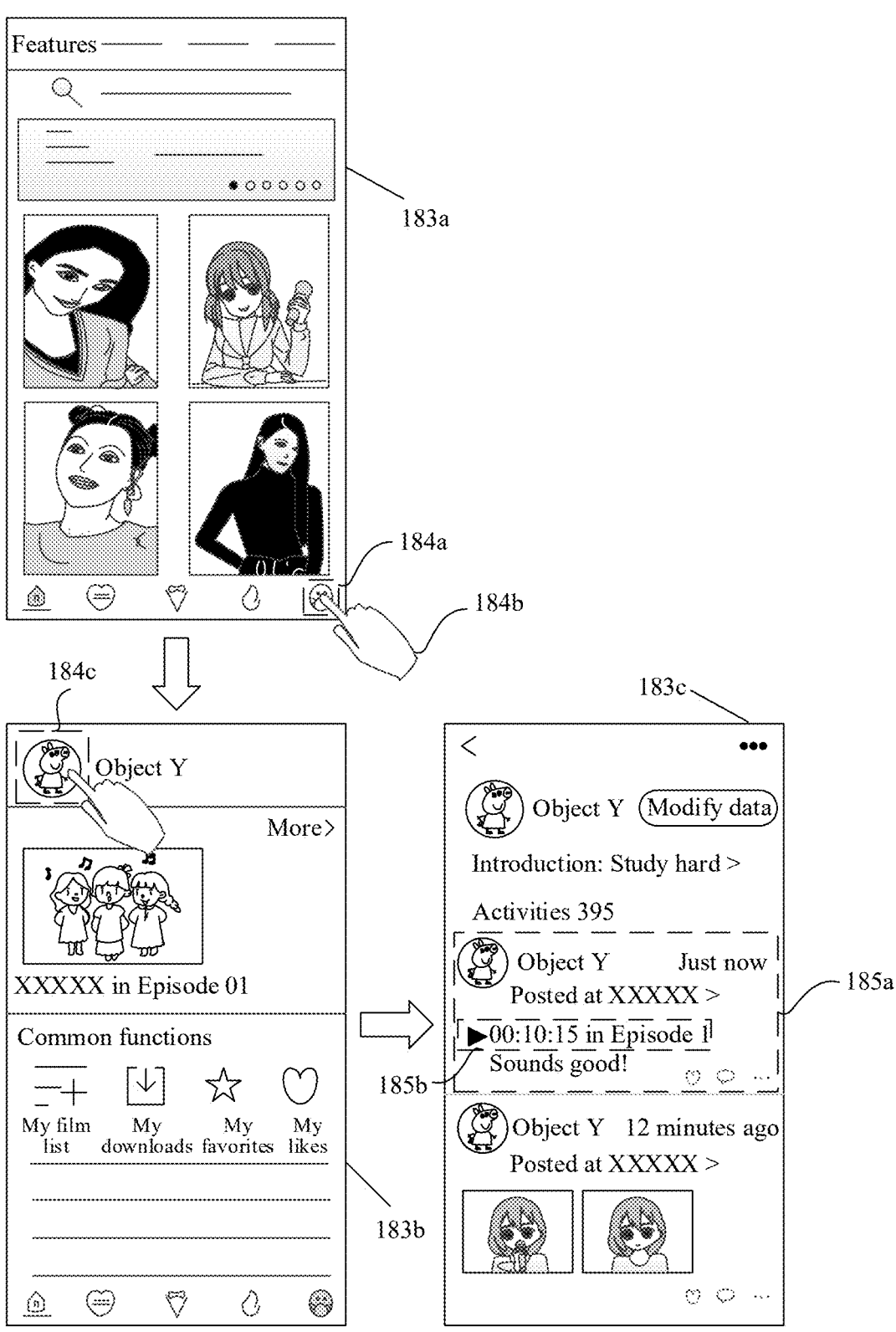
FIG. 18B is a schematic diagram of a scenario of displaying annotated media data according to an embodiment of this application.

It may be understood that, the media data display interface may include, but is not limited to, a video playback interface and a media reading interface. For a specific process of displaying the annotated media data on the media reading interface by the terminal device, reference may be made to FIG. 18A and FIG. 18B. FIG. 18A and FIG. 18B are schematic diagrams of a scenario of displaying annotated media data according to an embodiment of this application. In addition, for a specific process of displaying the annotated media data on the video playback interface by the terminal device, reference may be made to FIG. 10B.

A video recommendation interface 180a shown in FIG. 18A may be the above video recommendation interface 40a in the embodiment corresponding to FIG. 4. The video recommendation interface 180a may include a media data reading control 181a. An object 181b may perform a trigger operation on the media data reading control 181a. In this case, the terminal device can switch the video recommendation interface 180a to a media reading interface 180b in response to the trigger operation performed by the object 181b on the media data reading control 181a.

As shown in FIG. 18A, the media reading interface 180b may include comment media data 182a (the comment media data 182a may also be referred to as annotated media data 182a). The comment media data 182a may include annotated text data 182b. The annotated text data 182b herein may be "0:01:19 in Episode 12". The annotated text data 182b may be used for performing the following S202. In addition, the media reading interface 180b may further include media topic information 182c. The media topic information 182c may be used for switching a display interface of the terminal device from the media reading interface 180b to another media reading interface. The another media reading interface may be configured to display other comment media data. Details are not described herein. In addition, the media reading interface 180b may further include a circle viewing control 182d. The circle viewing control 182d may be configured to switch the display interface of the terminal device from the media reading interface 180b to another media reading interface (that is, a circle viewing interface). The circle viewing interface may be configured to display other comment media data. Details are not described herein.

It may be understood that, the media reading interface 180b shown in FIG. 18A may be configured to display comment media data distributed by the server for a viewing object (that is, the object 181b). The server may generate comment media data for pushing to the viewing object based on a progress time point. In other words, the progress time point may serve as a distribution basis for the comment media data in a video community (the video community includes but is not limited to a square, a topic page, a circle page, and a user profile). The square, the topic page, the circle page, and the user profile may be collectively referred to as a media reading interface. The square may be the media reading interface 180b shown in FIG. 18A, the user profile may be a media reading interface 183c shown in FIG. 18B, the topic page may be another media reading interface displayed in response to a trigger operation performed on the media topic information 182c, and the circle page may be another media reading interface displayed in response to a trigger operation performed on the circle viewing control 182d.

A video recommendation interface 183a shown in FIG. 18B may be the above video recommendation interface 180a in the embodiment corresponding to FIG. 18A. The video recommendation interface 183a may include an information viewing control 184a. An object 184b may perform a trigger operation on the information viewing control 184a. In this case, the terminal device can switch the video recommendation interface 183a to an information reading interface 183b in response to the trigger operation performed by the object 184b on the information viewing control 184a.

As shown in FIG. 18B, the information reading interface 183b may be configured to display a viewing record, interactive information, and the like of the object 184b in the video application. The information reading interface 183b may include an activity viewing control 184c. The object 184b may perform a trigger operation on the activity viewing control 184c. In this case, the terminal device can switch the information reading interface 183b to a media reading interface 183c in response to the trigger operation performed by the object 184b on the activity viewing control 184c.

As shown in FIG. 18B, the media reading interface 183c may include comment media data 185a (the comment media data 185a may also be referred to as annotated media data 185a). The comment media data 185a may include annotated text data 185b. The annotated text data 185b herein may be "0:10:15 in Episode 1". The annotated text data 185b may be used for performing the following S202. In addition, the media reading interface 183c may be further configured to display other comment media data. All comment media data displayed in the media reading interface 183c is posted by the object 184b in the video application.

S202: Perform a progress jump on target video data in the video application based on a current progress time point in response to a trigger operation performed on the posted annotated media data.

It is to be understood that, after the progress jump is performed on the target video data based on the current progress time point, when a historical playback progress corresponding to the target video data is obtained, the terminal device can display prompt information for the historical playback progress in the video application. The historical playback progress may represent a playback progress of the target video data made by the viewing object at a historical moment. The historical playback progress may be stored into the terminal device or the server. Further, the terminal device can switch, in the video application, a playback progress of the target video data to the historical playback progress from a playback progress indicated by the current progress time point in response to a trigger operation performed on the prompt information.

If the terminal device does not respond to the trigger operation performed on the prompt information within a period of time after the prompt information is displayed, the displaying of the prompt information may be canceled in the video application. In other words, the prompt information is continuously displayed in the video application for a period of time. The period of time is the above period of time. It is to be understood that, a specific duration of the above period of time is not limited in this embodiment of this application. For example, the above period of time may be 30 seconds.

It is to be understood that, the viewing object can quickly position the target video data to a corresponding episode and a time progress by performing a trigger operation on the posted annotated media data when consuming to the annotated media data. In this application, progress control (that is, playback progress adjustment) in a player is supported during playback of a main body in a playback scenario.

The media data display interface may be a video playback interface. It is to be understood that, the terminal device can determine whether video data is being played in a playback area of the video playback interface in response to the trigger operation performed on the posted annotated media data. Further, if the video data is being played in the playback area, the terminal device can perform the progress jump on the target video data in the playback area based on the current progress time point. In some embodiments, if no media data is played in the playback area, the terminal device can refresh the video playback interface and perform the progress jump on the target video data in a refreshed playback area based on the current progress time point.

It is to be understood that, the terminal device can determine a candidate video data identifier of the video data being played in the playback area, obtain a target video data identifier of the target video data, and compare the candidate video data identifier with the target video data identifier. If the candidate video data identifier is the same as the target video data identifier, the terminal device can determine that the video data being played in the playback area is the target video data and switch a playback progress of the target video data in the playback area to the playback progress indicated by the current progress time point. If the candidate video data identifier is different from the target video data identifier, the terminal device can determine that the video data being played in the playback area is not the target video data, switch the video data being played in the playback area to the target video data, and play the target video data from the playback progress indicated by the current progress time point.

Figure 19:
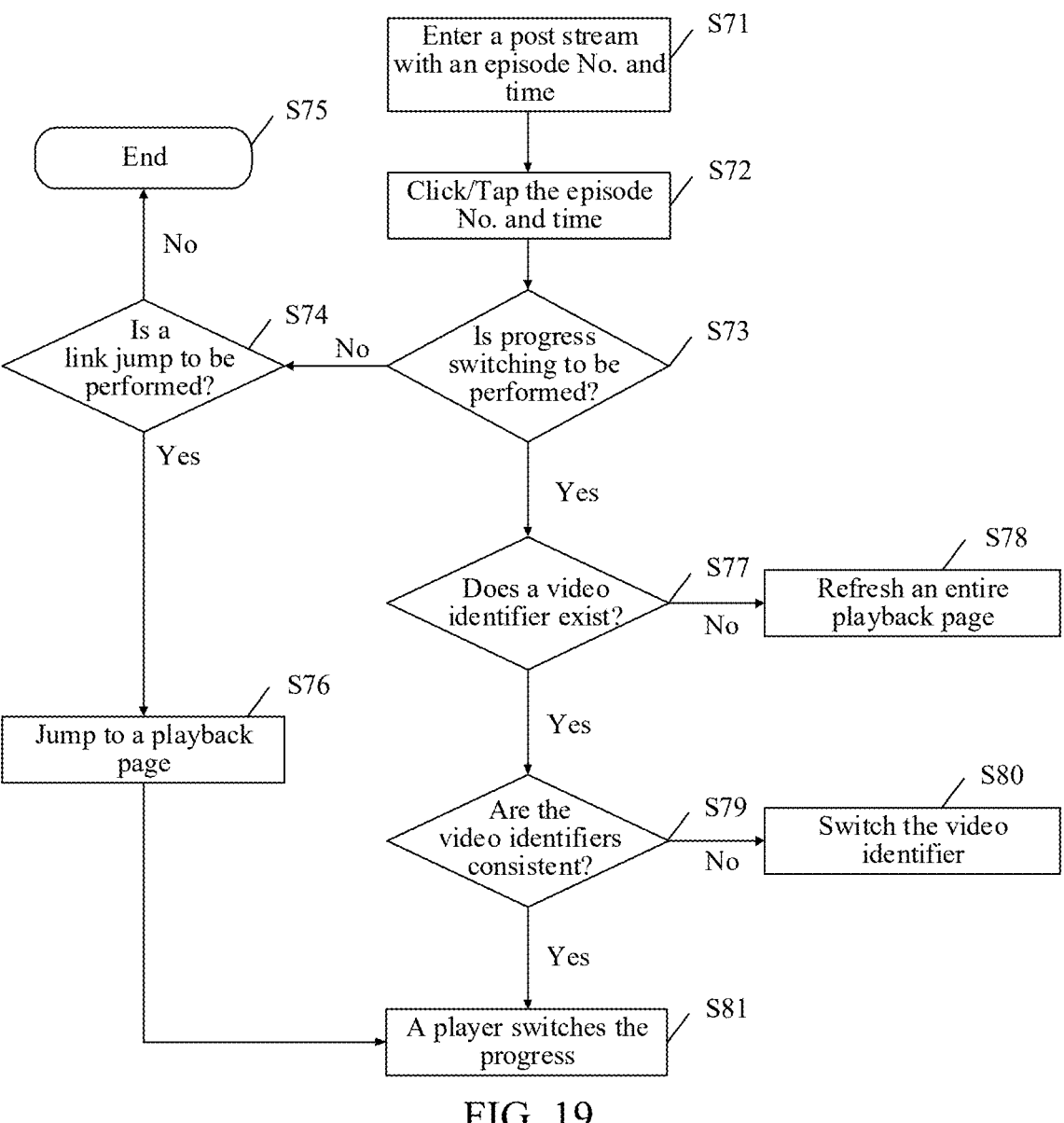
FIG. 19 is a schematic diagram of a scenario of switching a playback progress according to an embodiment of this application.

For ease of understanding, FIG. 19 is a schematic diagram of a scenario of switching a playback progress according to an embodiment of this application. As shown in FIG. 19, the terminal device can enter a post stream having an episode No. and time (that is, the comment media data) through S71. In other words, the terminal device can display posted annotated media data in the media data display interface of the video application. Further, when the viewing object clicks/taps the episode No. and time through S72, that is, when the viewing object clicks/taps the posted annotated media data, the terminal device can perform S73 to determine whether to perform progress switching through S73, that is, to determine a type of the media data display interface.

It may be understood that, if the media data display interface is a video playback interface, the terminal device does not need to perform interface switching and performs S77. If the media data display interface is a media reading interface, the terminal device needs to perform interface switching and performs S74. As shown in FIG. 19, if the media data display interface is the media reading interface, the terminal device can determine whether to perform a link jump through S74. If the terminal device can perform the link jump, the terminal device jumps to a playback page through S76, that is, switches the media reading interface to the video playback interface, and then performs progress switching in a player of the video playback interface through S81. In some embodiments, if the terminal device cannot perform the link jump, the terminal device ends the process through S75. In this case, the terminal device may not need to make any response to a trigger operation performed on S72, or display prompt information indicating a jump failure in the video application.

As shown in FIG. 19, if the media data display interface is the video playback interface, the terminal device can determine whether a video identifier exists through S77, that is, determine whether video data is being played in the playback area of the video playback interface. Further, if the terminal device determines that the video identifier exists, the terminal device can perform S79. In some embodiments, if the terminal device determines that the video identifier does not exist, the terminal device can refresh an entire playback page through S78, that is, refresh the video playback interface, and perform progress switching in a refreshed playback area through S81. Because the playback service provided by the video application may encounter a problem at a moment, the video application may not have the video identifier at the moment.

As shown in FIG. 19, the terminal device can determine whether the video identifiers are consistent through S79, that is, determine whether the candidate video data identifier of the video data being played on the video playback interface is consistent with the target video data identifier of the target video data. If the candidate video data identifier is consistent with the target video data identifier of the target video data, the terminal device can perform progress switching in the player of the video playback interface through S81, that is, switch the playback progress of the target video data in the playback area to the playback progress indicated by the current progress time point. If the candidate video data identifier is inconsistent with the target video data identifier, the terminal device can switch the video identifier through S80, and perform progress switching in the player of the video playback interface through S81, that is, switch the video data being played in the playback area to the target video data, and play the target video data from the playback progress indicated by the current progress time point.

In other words, as shown in FIG. 19, the terminal device can first determine whether the terminal device is currently in a playback scenario through S73. If the terminal device is not in the playback scenario, the terminal device directly jumps to a playback page (that is, the video playback interface) of a main body and switch to the corresponding progress. If the terminal device is in the playback scenario, the terminal device can further determine whether a main body is currently played through S77. If no main body is played, the playback page is directly refreshed to switch the playback progress. If the main body is played, it is determined through S79 whether clicked/tapped main body time point information (that is, the target video data identifier of the target video data) is consistent with information about the main body that is currently being played (that is, the candidate video data identifier of the video data being played). If the candidate video data identifier is inconsistent with the target video data identifier, the terminal device can switch to the main body for playback to the anchored time point. If the candidate video data identifier is consistent with the target video data identifier, the terminal device can directly switch the progress of the current player.

Figure 20A:
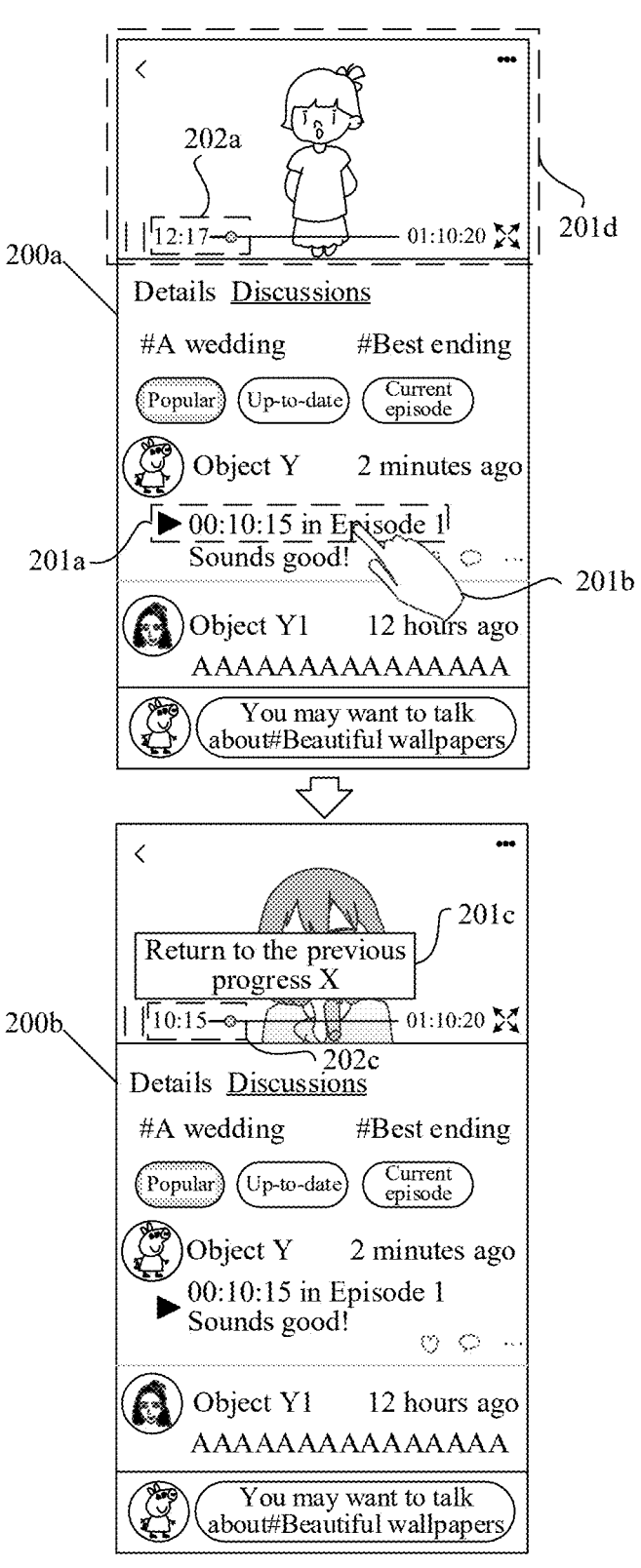
FIG. 20A is a schematic diagram of a scenario of performing a progress jump according to an embodiment of this application.

For a specific process of implementing the progress jump on the video playback interface by the terminal device, reference may be made to FIG. 20A. FIG. 20A is a schematic diagram of a scenario of performing a progress jump according to an embodiment of this application. A video playback interface 200a shown in FIG. 20A and the above video playback interface 103b in the embodiment corresponding to FIG. 10B may be video playback interfaces of the video application at different moments. A playback progress of the target video data on the video playback interface 200a is different from the playback progress of the target video data on the video playback interface 103b.

As shown in FIG. 20A, the video playback interface 200a includes a playback area 201d. The target video data is played in the playback area 201d. The video playback interface 200a further includes annotated media data. The annotated media data includes annotated text data 201a. An object 201b may perform a trigger operation on the annotated text data 201a. In this case, the terminal device can perform the progress jump on the target video data in the playback area 201d based on a current progress time point indicated in the annotated text data 201a in response to the trigger operation performed by the object 201b on the annotated text data 201a.

In this case, the terminal device can switch the video playback interface 200a to a video playback interface 200b. The playback progress of the target video data on the video playback interface 200a is a playback progress 202a, and a playback progress of the target video data on the video playback interface 200b is a playback progress 202c. The playback progress 202c is a playback progress indicated in the annotated text data 201a.

It may be understood that, in response to the trigger operation performed by the object 201b on the annotated text data 201a, the terminal device covers an original viewing progress of the target video data with the playback progress 202c indicated in the annotated text data 201a if the video application has a playback record of the target video data. In addition, the terminal device can further display prompt information 201c in the playback area 201d, to ensure that an original playback history (that is, a historical playback progress) of the viewing object in the video application is not affected, so that the viewing object can continue the historical playback progress after quickly browsing a plot content corresponding to the current progress time point, thereby ensuring smooth movie watching for the viewing object. The prompt information 201c herein may be "Return to the previous progress X". In some embodiments, if the video application does not have the historical playback progress of the target video data, the terminal device does not need to display the prompt information 201c for the original viewing progress in the playback area 201d.

The media data display interface may be a media reading interface. It is to be understood that, the terminal device can switch the media reading interface to the video playback interface in the video application in response to the trigger operation performed on the posted annotated media data. Further, the terminal device can perform the progress jump on the target video data on the video playback interface based on the current progress time point.

Figure 20B:
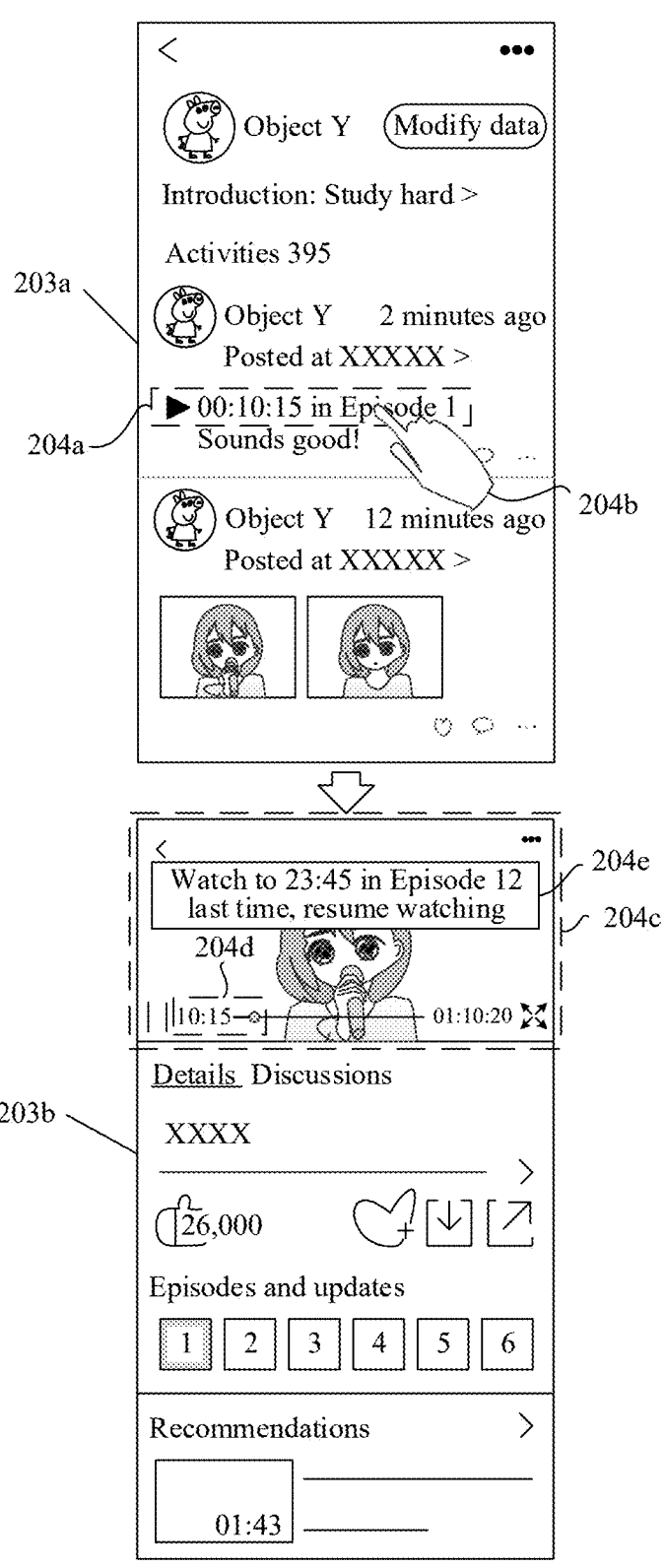
FIG. 20B is a schematic diagram of a scenario of performing a progress jump according to an embodiment of this application.

For a specific process of implementing the progress jump on the media reading interface by the terminal device, reference may be made to FIG. 20B. FIG. 20B is a schematic diagram of a scenario of performing a progress jump according to an embodiment of this application. A media reading interface 203a shown in FIG. 20B may be the above media reading interface 183c in the embodiment corresponding to FIG. 18B. The media reading interface 203a includes annotated media data. The annotated media data includes annotated text data 204a. An object 204b may perform a trigger operation on the annotated text data 204a. In this case, the terminal device can switch the media reading interface 203a to a video playback interface 203b and perform the progress jump on the target video data in a playback area 204c of the video playback interface 203b based on a current progress time point indicated in the annotated text data 204a in response to the trigger operation performed by the object 204b on the annotated text data 204a.

A playback progress of the target video data on the video playback interface 203b is a playback progress 204d. The playback progress 204d is a playback progress indicated in the annotated text data 204a. In addition, the terminal device can further display prompt information 204e in the playback area 204c. The prompt information 204e may be "Watch to 23:45 in Episode 12 last time, resume watching". In some embodiments, if the video application does not have the historical playback progress for the target video data, the terminal device does not need to display the prompt information 204e for the original viewing progress in the playback area 204c.

The media data display interface may be a media reading interface. It is to be understood that, the terminal device can display a media playback sub-interface in the video application in response to the trigger operation performed on the posted annotated media data. Further, the terminal device can perform the progress jump on the target video data on the media playback sub-interface based on the current progress time point. In other words, the terminal device can play complete target video data on the media playback sub-interface based on the current progress time point. In some embodiments, when the annotated media data is annotated video data or annotated GIF image data, the terminal device can play the annotated video data or the annotated GIF image data on the media playback sub-interface.

Figure 20C:
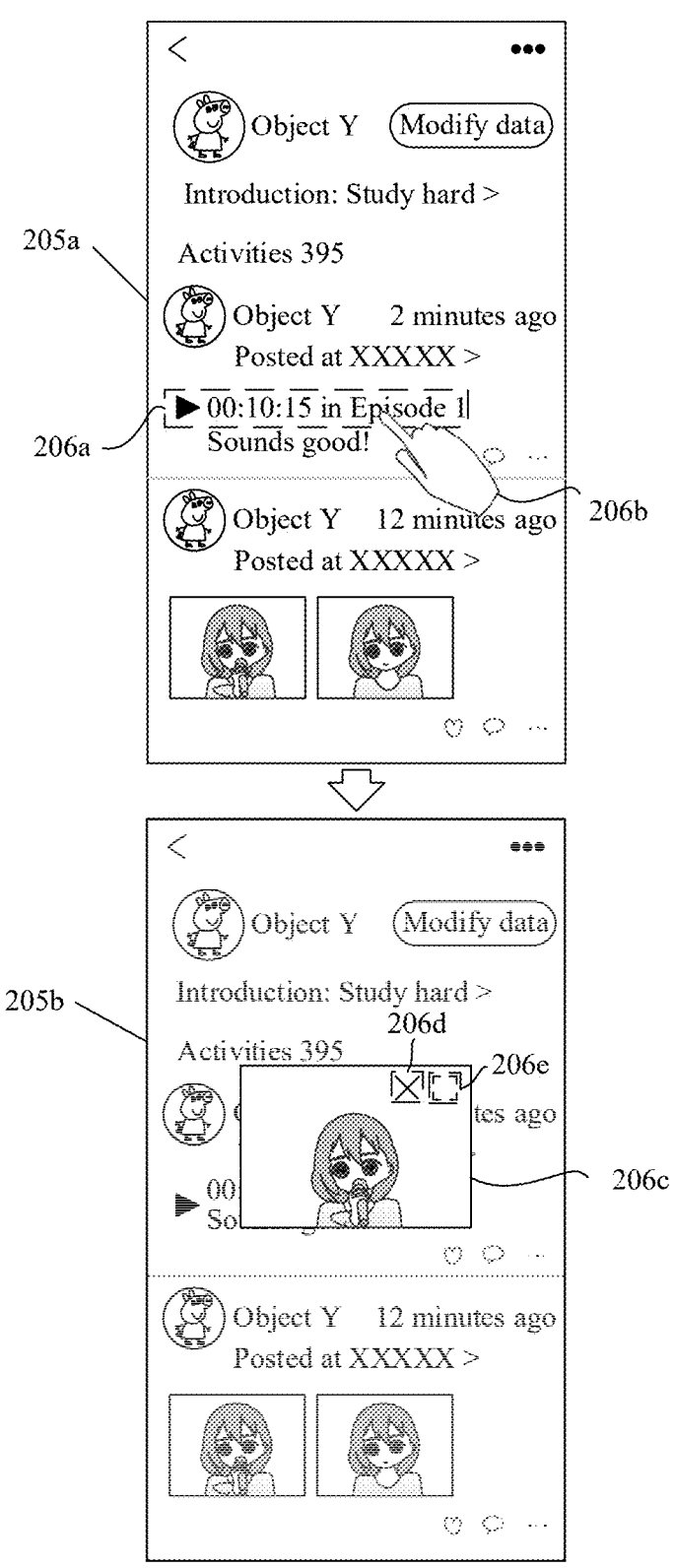
FIG. 20C is a schematic diagram of a scenario of performing a progress jump according to an embodiment of this application.

For the specific process of implementing the progress jump on the media reading interface by the terminal device, reference may be made to FIG. 20C. FIG. 20C is a schematic diagram of a scenario of performing a progress jump according to an embodiment of this application. A media reading interface 205a shown in FIG. 20C may be the above media reading interface 203a in the embodiment corresponding to FIG. 20B. The media reading interface 205a includes annotated media data. The annotated media data includes annotated text data 206a. An object 206b may perform a trigger operation on the annotated text data 206a. In this case, the terminal device can display a media playback sub-interface 206c independent of the media reading interface 205a in the video application and then perform the progress jump on the target video data on the media playback sub-interface 206c based on a current progress time point indicated in the annotated text data 206a to obtain a media reading interface 205b in response to the trigger operation performed by the object 206b on the annotated text data 206a. In this case, the terminal device does not need to display the prompt information for the historical playback progress in the video application.

The media playback sub-interface 206c may further include an interface closing control 206d. After watching a video clip corresponding to the annotated text data 206a, the object 206b may perform a trigger operation on the interface closing control 206d. In this case, the terminal device can close the media playback sub-interface 206c on the media reading interface 205b in response to the trigger operation performed by the object 206b on the interface closing control 206d, so that the object 206b can continue to browse comment media data on the media reading interface 205a. In some embodiments, the media playback sub-interface 206c may further include an interface opening control 206e. The terminal device can switch the media reading interface 205b to the above video playback interface 203b in the embodiment corresponding to FIG. 20B in response to a trigger operation performed by the object 206b on the interface opening control 206e.

The media data display interface may be a media reading interface. It is to be understood that, the terminal device can display a media playback area on the media reading interface in response to the trigger operation performed on the posted annotated media data. Further, the terminal device can perform the progress jump on the target video data on the media playback area based on the current progress time point. In other words, the terminal device can play complete target video data on the media playback area based on the current progress time point. In some embodiments, when the annotated media data is annotated video data or annotated GIF image data, the terminal device can play the annotated video data or the annotated GIF image data on the media playback area.

Figure 20D:
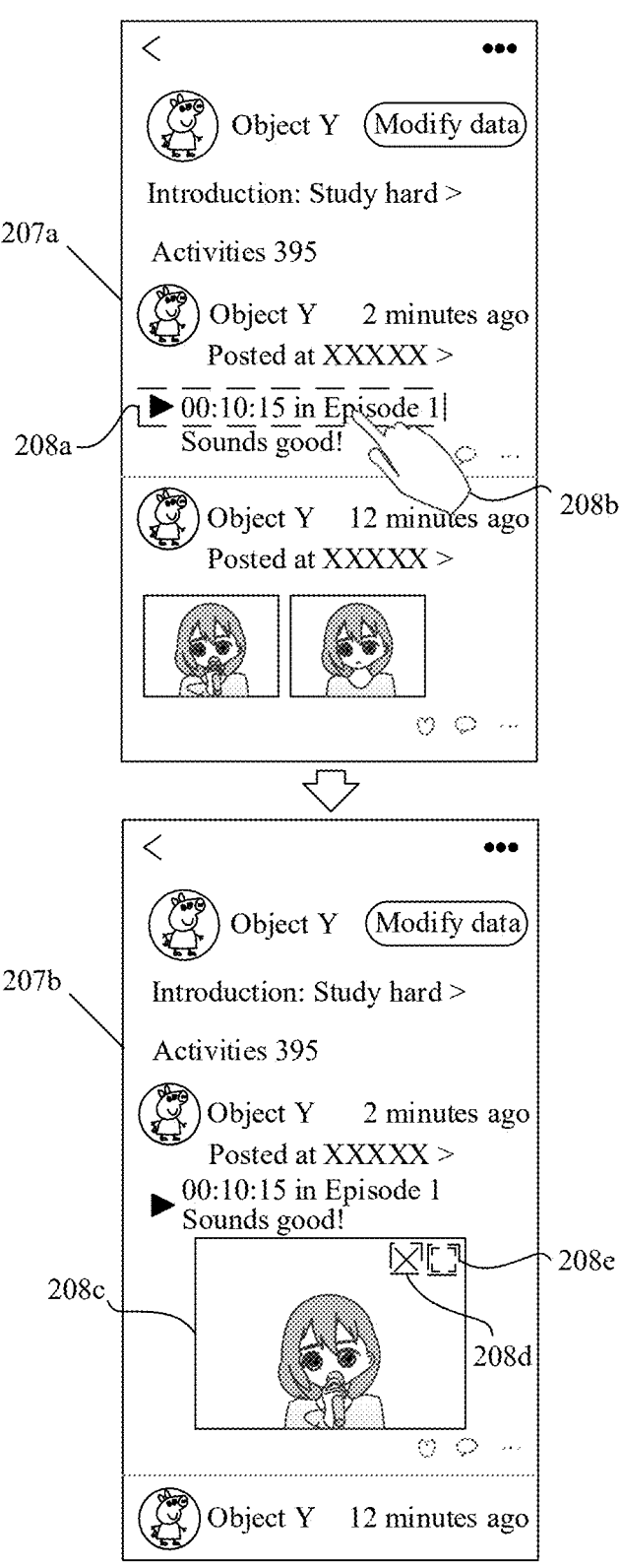
FIG. 20D is a schematic diagram of a scenario of performing a progress jump according to an embodiment of this application.

For the specific process of implementing the progress jump on the media reading interface by the terminal device, reference may be made to FIG. 20D. FIG. 20D is a schematic diagram of a scenario of performing a progress jump according to an embodiment of this application. A media reading interface 207*a* shown in FIG. 20C may be the above media reading interface 203*a* in the embodiment corresponding to FIG. 20B. The media reading interface 207*a* includes annotated media data. The annotated media data includes annotated text data 208*a*. An object 208*b* may perform a trigger operation on the annotated text data 208*a*. In this case, the terminal device can display a media playback area 208*c* on the media reading interface 207*a* and then perform the progress jump on the target video data in the media playback area 208*c* based on a current progress time point indicated in the annotated text data 208*a* to obtain a media reading interface 207*b* in response to the trigger operation performed by the object 208*b* on the annotated text data 208*a*. In this case, the terminal device does not need to display the prompt information for the historical playback progress in the video application.

The media playback area 208*c* may further include an area closing control 208*d*. After watching a video clip corresponding to the annotated text data 208*a*, the object 208*b* may perform a trigger operation on the area closing control 208*d*. In this case, the terminal device can close the media playback area 208*c* on the media reading interface 207*b* in response to the trigger operation performed by the object 208*b* on the area closing control 208*d*, so that the object 208*b* can continue to browse comment media data on the media reading interface 207*a*. In some embodiments, the media playback area 208*c* may further include an area opening control 208*e*. The terminal device can further switch the media reading interface 207*b* to the above video playback interface 203*b* in the embodiment corresponding to FIG. 20B in response to a trigger operation performed by the object 208*b* on the area opening control 208*e*.

It may be understood that, the above embodiments corresponding to FIG. 20A, FIG. 20B, FIG. 20C, and FIG. 20D are described by using the example in which the posted annotated media data includes the annotated text data (that is, the annotated text data 201*a* in the embodiment corresponding to FIG. 20A, the annotated text data 204*a* in the embodiment corresponding to FIG. 20B, the annotated text data 206*a* in the embodiment corresponding to FIG. 20C, and the annotated text data 208*a* in the embodiment corresponding to FIG. 20D). The posted annotated media data may alternatively be to-be-posted comment media data, annotated image data, annotated video data, or annotated GIF image data. The terminal device can implement the same effects as those of the above embodiments corresponding to FIG. 20A, FIG. 20B, FIG. 20C, and FIG. 20D in response to a trigger operation performed on the to-be-posted comment media data, the annotated image data, the annotated video data, or the annotated GIF image data.

It may be learned from the above that, in this embodiment of this application, after the annotated media data is posted, the posted annotated media data can be displayed on the media data display interface of the video application. In this case, in response to the trigger operation performed on the posted annotated media data, the terminal device can perform the progress jump on the target video data in the video application based on the current progress time point. Therefore, in this embodiment of this application, a discussion of plot points can be implemented through the annotated media data during the playback of the target video data, and the playback progress indicated in the annotated media data can be quickly positioned during consumption of the annotated media data. In this way, efficiency of the video progress positioning is improved while accuracy of video progress positioning is ensured. In terms of the poster side, the viewing object can express opinions more targetedly and accurately, which implements linkage between a plot inside a box and a discussion outside the box, and improves a penetration rate and a completion rate of posting. In terms of the consumption side, a content in a forum can be more closely combined with the main body (that is, the target video data) and the plot, which implements expanded consumption based on a movie watching behavior, provides diversified reasons for a user to visit the long bottom forum, and increases a duration and a community interaction rate. In addition, in this embodiment of this application, a sense of belonging to the platform and use dependence of a user are improved while user experience can be improved, thereby increasing an interaction rate of the user for the target video data.

Figure 21:
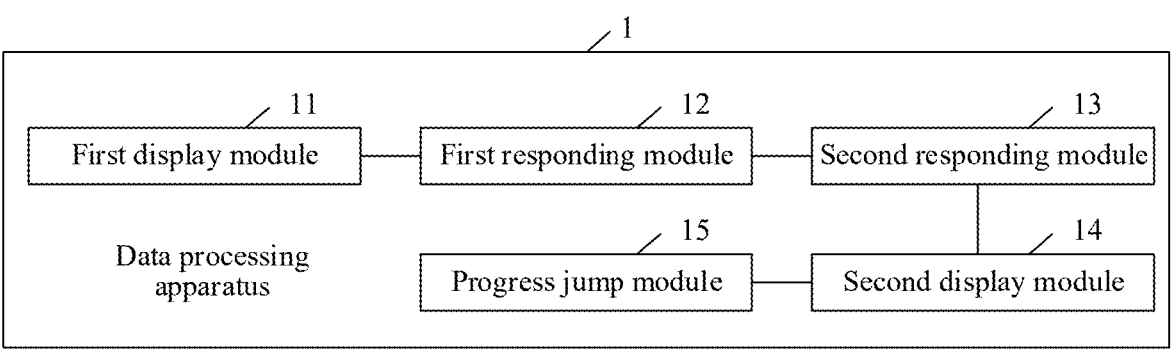
FIG. 21 is a schematic structural diagram of a data processing apparatus according to an embodiment of this application.

Further, FIG. 21 is a schematic structural diagram of a data processing apparatus according to an embodiment of this application. A data processing apparatus 1 may include a first display module 11, a first responding module 12, and a second responding module 13. Further, the data processing apparatus 1 may further include a second display module 14 and a progress jump module 15.

The first display module 11 is configured to display target video data in a video application.

The first responding module 12 is configured to display annotated media data in the video application in response to a trigger operation performed on a progress time point annotation function in the video application, the annotated media data being media data associated with a current progress time point, the current progress time point being a progress time point corresponding to the trigger operation to which the target video data is played; and The second responding module 13 is configured to post the annotated media data in response to a confirmation operation performed on the annotated media data, posted annotated media data having a function of instructing the target video data to perform a progress jump based on the current progress time point.

The annotated media data includes annotated image data intercepted from the target video data.

The first responding module 12 is further configured to display a media image interception control associated with the progress time point annotation function on a video playback interface of the video application.

The first responding module 12 is further configured to display the annotated image data in an image annotation area of the video application at the current progress time point in response to a trigger operation performed on the media image interception control, a progress time point of the annotated image data in target video data being the current progress time point.

The second responding module 13 is further configured to display a media image posting control corresponding to the annotated image data in the video application.

The second responding module 13 is further configured to post the annotated image data in response to a confirmation operation performed on the media image posting control.

The annotated media data includes to-be-posted comment media data and annotated text data.

The first responding module 12 is further configured to a media text interception control associated with the progress time point annotation function on a video playback interface of the video application.

The first responding module 12 is further configured to display the annotated text data in a text annotation area of the video application at the current progress time point in response to a trigger operation performed on the media text interception control.

The first responding module 12 is further configured to display inputted to-be-posted comment media data in the text annotation area in response to an input operation performed on the text annotation area.

The second responding module 13 is further configured to display a media text posting control corresponding to the annotated text data in the video application.

The second responding module 13 is further configured to post the to-be-posted comment media data and the annotated text data in response to a trigger operation performed on the media text posting control.

The first responding module 12 is further configured to obtain, at the current progress time point, a target video clip in K video clips corresponding to the current progress time point in response to the trigger operation performed on the media text interception control, the K video clips being video clips associated with the target video data, and K being a positive integer.

The first responding module 12 is further configured to use clip attribute information of the target video clip as the annotated text data, and display the annotated text data in the text annotation area of the video application.

The annotated media data includes annotated text data and annotated image data intercepted from the target video data.

The first responding module 12 is further configured to display a media image interception control associated with the progress time point annotation function on a video playback interface of the video application.

The first responding module 12 is further configured to display the annotated image data in an image annotation area of the video application at the current progress time point in response to a trigger operation performed on the media image interception control, a progress time point of the annotated image data in target video data being the current progress time point.

The second responding module 13 is further configured to display a media image posting control corresponding to the annotated image data in the video application.

The second responding module 13 is further configured to display the annotated text data and a media data posting control in a comment annotation area of the video application in response to a confirmation operation performed on the media image posting control.

The second responding module 13 is further configured to post the annotated text data and the annotated image data in response to a trigger operation performed on the media data posting control.

The annotated media data includes annotated video data intercepted from the target video data.

The first responding module 12 is further configured to display a media video interception control associated with the progress time point annotation function on a video playback interface of the video application.

The first responding module 12 is further configured to display the annotated video data in a video annotation area of the video application at a triggered progress time point in response to a trigger operation performed on the media video interception control, the triggered progress time point being used for determining the current progress time point in the target video data, the current progress time point being used for determining an interception start time in the target video data, and a duration of the annotated video data being an interception duration associated with the progress time point annotation function.

The second responding module 13 is further configured to display a media video posting control corresponding to the annotated video data in the video application in response to a confirmation operation performed on the annotated video data.

The second responding module 13 is further configured to post the annotated video data in response to a confirmation operation performed on the media video posting control.

The annotated media data includes to-be-posted comment media data.

The first responding module 12 is further configured to a media text interception control associated with the progress time point annotation function on a video playback interface of the video application.

The first responding module 12 is further configured to display a text annotation area in the video application at the current progress time point in response to a trigger operation performed on the media text interception control.

The first responding module 12 is further configured to display inputted to-be-posted comment media data in the text annotation area in response to an input operation performed on the text annotation area.

The second responding module 13 is further configured to display a media text posting control corresponding to the to-be-posted comment media data in the video application.

The second responding module 13 is further configured to post the to-be-posted comment media data in response to a trigger operation performed on the media text posting control.

The annotated media data includes to-be-posted comment media data and annotated image data intercepted from the target video data.

The first responding module 12 is further configured to display a media image interception control associated with the progress time point annotation function on a video playback interface of the video application.

The first responding module 12 is further configured to display the annotated image data in an image annotation area of the video application at the current progress time point in response to a trigger operation performed on the media image interception control, a progress time point of the annotated image data in target video data being the current progress time point.

The second responding module 13 is further configured to display a media image posting control corresponding to the annotated image data in the video application.

The second responding module 13 is further configured to display a media data posting control in a comment annotation area of the video application in response to a confirmation operation performed on the media image posting control.

The second responding module 13 is further configured to display the inputted to-be-posted comment media data in the comment annotation area in response to an input operation performed on the comment annotation area.

The second responding module 13 is further configured to post the to-be-posted comment media data and the annotated image data in response to a trigger operation performed on the media data posting control.

The first responding module 12 is further configured to display a comment display control associated with the progress time point annotation function on a video playback interface of the video application.

The first responding module 12 is further configured to display a comment display area on the video playback interface in response to a trigger operation performed on the comment display control, the comment display area including a comment input area.

The first responding module 12 is further configured to display a media annotation area on the video playback interface in response to a trigger operation performed on the comment input area, the media annotation area including a media annotation control.

The first responding module 12 is further configured to display the annotated media data in the media annotation area in response to a trigger operation performed on the media annotation control.

The data processing apparatus 1 is further configured to display, after the annotated media data is posted, the posted annotated media data in the comment display area.

The comment display area is configured to display comment media data associated with the target video data, and the comment display area further includes an annotation function control.

The first responding module 12 is further configured to display a progress time point list in the video application in response to a trigger operation performed on the annotation function control, list items in the progress time point list including progress time points associated with the comment media data, the progress time points associated with the comment media data being ranked based on a quantity of the comment media data with which the progress time points are associated, and the progress time points associated with the comment media data including a candidate progress time point.

The first responding module 12 is further configured to perform the progress jump on the target video data in the video application based on the candidate progress time point in response to a trigger operation performed on the candidate progress time point.

The list items in the progress time point list further include a candidate media reading control corresponding to the candidate progress time point.

The first responding module 12 is further configured to display comment media data associated with the candidate progress time point in the video application in response to a trigger operation perform on the candidate media reading control.

The first responding module 12 is further configured to input the target video data to a target classification model at the triggered progress time point in response to the trigger operation performed the media video interception control, and classify video frames in the target video data through the target classification model, to obtain scene classification information corresponding to the video frames in the target video data.

The first responding module 12 is further configured to obtain intercepted video data having the interception duration from the target video data, a progress time point of a start video frame in the intercepted video data being equal to the triggered progress time point, the intercepted video data including N video frames, and N being a positive integer greater than 1.

The first responding module 12 is further configured to obtain a quantity M of first video frames in the intercepted video data, M being a positive integer less than or equal to N, and the first video frames being video frames in the intercepted video data having scene classification information equal to start scene classification information, the start scene classification information being scene classification information corresponding to the start video frame in the intercepted video data.

The first responding module 12 is further configured to obtain annotated video data having the interception duration from the target video data based on the start scene classification information and the start video frame in the intercepted video data and display the annotated video data in the video annotation area of the video application when a ratio between M and N is less than a ratio threshold, a progress time point of the start video frame of the annotated video data being the current progress time point, the annotated video data including the start video frame in the intercepted video data, a ratio between a quantity H of second video frames in the annotated video data and N being greater than or equal to the ratio threshold, and the second video frames being video frames in the annotated video data having scene classification information equal to the start scene classification information.

The first responding module 12 is further configured to transmit a progress time point annotation instruction to a player through a poster at the current progress time point in response to the trigger operation performed on the media text interception control.

The first responding module 12 is further configured to obtain progress time point information corresponding to a playback progress of the target video data through a core of the player, and transmit the progress time point information to a progress time point data generator.

The first responding module 12 is further configured to render the progress time point information through the progress time point data generator to obtain rendered progress time point information, and return the rendered progress time point information to the poster.

The first responding module 12 is further configured to display annotated text data corresponding to the rendered progress time point information in the text annotation area of the video application through the poster.

The data processing apparatus 1 is further configured to store, after the annotated media data is posted, the posted annotated media data into a media database.

The data processing apparatus 1 is further configured to call a comment media reading service during refreshing of the comment display area, read the posted annotated media data from the media database through the comment media reading service, and display the posted annotated media data in a refreshed comment display area.

In some embodiments, the second display module 14 is configured to display the posted annotated media data on a media data display interface of the video application.

The progress jump module 15 is configured to perform a progress jump on the target video data in the video application based on the current progress time point in response to a trigger operation performed on the posted annotated media data.

The media data display interface is a video playback interface.

The progress jump module 15 is further configured to perform, when it is determined that video data is being played in a playback area of the video playback interface, the progress jump on the target video data in the playback area based on the current progress time point in response to the trigger operation performed on the posted annotated media data.

The progress jump module 15 is further configured to refresh the video playback interface and perform the progress jump on the target video data in the refreshed playback area based on the current progress time point when it is determined that no media data is played in the playback area.

The progress jump module 15 is further configured to determine a candidate video data identifier of the video data being played in the playback area, obtain a target video data identifier of the target video data, and compare the candidate video data identifier with the target video data identifier.

The progress jump module 15 is further configured to switch a playback progress of the target video data in the playback area to a playback progress indicated by the current progress time point when the candidate video data identifier is the same as the target video data identifier.

The progress jump module 15 is further configured to switch the video data being played in the playback area to the target video data and play the target video data from the playback progress indicated by the current progress time point when the candidate video data identifier is different from the target video data identifier.

The media data display interface is a media reading interface.

The progress jump module 15 is further configured to switch the media reading interface to a video playback interface in the video application in response to the trigger operation performed on the posted annotated media data.

The progress jump module 15 is further configured to perform the progress jump on the target video data on the video playback interface based on the current progress time point.

The media data display interface is a media reading interface.

The progress jump module 15 is further configured to display a media playback sub-interface in the video application in response to the trigger operation performed on the posted annotated media data.

The progress jump module 15 is further configured to perform the progress jump on the target video data on the media playback sub-interface based on the current progress time point.

The media data display interface is a media reading interface.

The progress jump module 15 is further configured to display a media playback area on the media reading interface in response to the trigger operation performed on the posted annotated media data.

The progress jump module 15 is further configured to perform the progress jump on the target video data in the media playback area based on the current progress time point.

The data processing apparatus 1 is further configured to display, when a historical playback progress corresponding to the target video data is obtained, prompt information for the historical playback progress in the video application.

The data processing apparatus 1 is further configured to switch, in the video application, a playback progress of the target video data from a playback progress indicated by the current progress time point to the historical playback progress in response to a trigger operation performed on the prompt information.

For specific implementations of the first display module 11, the first responding module 12, and the second responding module 13, reference may be made to the above descriptions of S101 to S103 in the embodiment corresponding to FIGS. 3 and S1021 to S1022 in the embodiment corresponding to FIG. 11. The details are not described herein. For specific implementations of the second display module 14 and the progress jump module 15, reference may be made to the above description of S201 to S202 in the embodiment corresponding to FIG. 17. The details are not described herein. In addition, for the description of the beneficial effects of using the same method, details are not described again.

Figure 22:
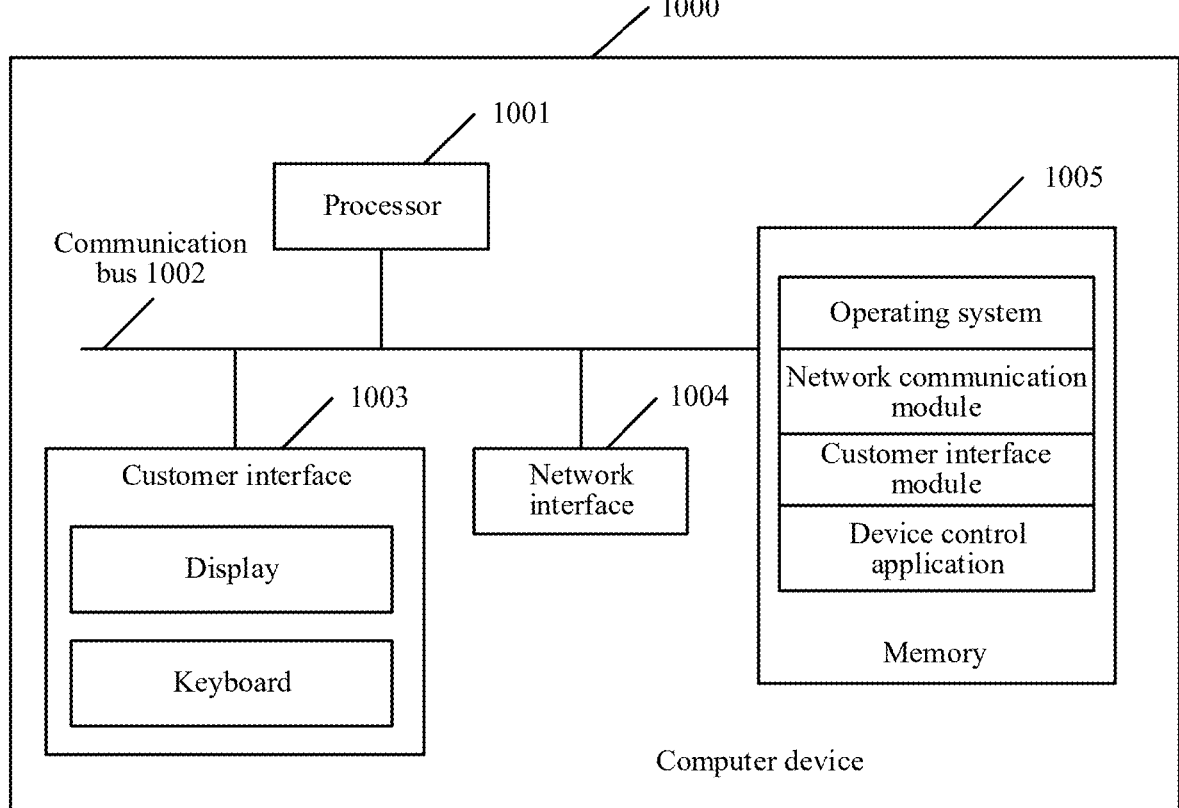
FIG. 22 is a schematic structural diagram of a computer device according to an embodiment of this application.

FIG. 22 is a schematic structural diagram of a computer device according to an embodiment of this application. A computer device 1000 shown in FIG. 22 may be the server or the terminal device in the above embodiments. The computer device 1000 may include a processor 1001, a network interface 1004, and a memory 1005. In addition, the above computer device 1000 may further include a customer interface 1003 and at least one communication bus 1002. The communication bus 1002 is configured to implement connection and communication between these components. In some embodiments, the customer interface 1003 may include a display and a keyboard. In some embodiments, the customer interface 1003 may further include a standard wired interface and a standard wireless interface. In some embodiments, the network interface 1004 may include a standard wired interface and a standard wireless interface (such as a Wi-Fi interface). The memory 1005 may be a high-speed random access memory (RAM), or may be a non-volatile memory, for example, at least one disk memory. In some embodiments, the memory 1005 may be at least one storage apparatus away from the above processor 1001. As shown in FIG. 22, the memory 1005 serving as a computer-readable storage medium may include an operating system, a network communication module, a customer interface module, and a device control application.

In the computer device 1000 shown in FIG. 22, the network interface 1004 can provide a network communication function. The customer interface 1003 is mainly configured to provide an input interface for a user. The processor 1001 may be configured to call the device control application stored in the memory 1005 to:

display target video data in a video application;

display annotated media data in the video application in response to a trigger operation performed on a progress time point annotation function in the video application, the annotated media data being media data associated with a current progress time point, the current progress time point being a progress time point corresponding to the trigger operation to which the target video data is played; and post the annotated media data in response to a confirmation operation performed on the annotated media data, posted annotated media data having a function of instructing the target video data to perform a progress jump based on the current progress time point.

It is to be understood that, the computer device 1000 described in this embodiment of this application can perform the above description of the data processing method in the above embodiment corresponding to FIG. 3, FIG. 11, or FIG. 17, or can perform the above description of the data processing apparatus 1 in the embodiment corresponding to FIG. 21. Details are not described herein. In addition, for the description of the beneficial effects of using the same method, details are not described again.

In addition, an embodiment of this application further provides a non-transitory computer-readable storage medium, having a computer program configured to be executed by the above data processing apparatus 1 stored therein. When executing the computer program, a processor can perform the above description of the data processing method in the embodiment corresponding to FIG. 3, FIG. 11, or FIG. 17. Details are not described herein. In addition, for the description of the beneficial effects of using the same method, details are not described again. For technical details not disclosed in the embodiment of the computer-readable storage medium related to this application, reference may be made to the description of the method embodiment of this application.

In addition, an embodiment of this application further provides a computer program product, including a computer program. The computer program may be stored in a non-transitory computer-readable storage medium. A processor of a computer device reads the computer program from the computer-readable storage medium, and the processor can execute the computer program to cause the computer device to perform the above description of the data processing method in the embodiment corresponding to FIG. 3, FIG. 11, or FIG. 17. Details are not described herein. In addition, for the description of the beneficial effects of using the same method, details are not described again. For technical details not disclosed in the embodiment of the computer program product related to this application, reference may be made to the description of the method embodiment of this application.

A person of ordinary skill in the art may understand that all or some of processes of the methods in the above embodiments may be implemented by instructing relevant hardware through a computer program. The computer program may be stored in a computer-readable storage medium. The computer program, when executed, may include the processes of the embodiments of the methods described above. The computer-readable storage medium may be a disk, an optical disk, a read-only memory (ROM), a RAM, or the like.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules or units. Moreover, each module can be part of an overall module that includes the functionalities of the module. The above disclosure is merely exemplary embodiments of this application, and certainly is not intended to limit the scope of the claims of this application. Therefore, equivalent variations made in accordance with the claims of this application fall within the scope of this application.

What is claimed is:

1. A method for annotating video data performed by a computer device, comprising:
   displaying target video data in a video application;
   displaying annotated media data in the video application at a triggered progress time point in response to a trigger operation performed by a first user of the video application on a progress time point annotation function in the video application, the annotated media data indicating a current progress time point of the target video data corresponding to the trigger operation, including:
      obtaining intercepted video data having an interception duration from the target video data, a progress time point of a start video frame in the intercepted video data being equal to the triggered progress time point;
      in accordance with a determination that a ration between a quantity of video frames in the intercepted video data having scene classification information equal to start scene classification information and a total quantity of video frames in the intercepted video data is less than a ratio threshold, obtaining the annotated media data having the interception duration from the target video data based on the start scene classification information and the start video frame in the intercepted video data, wherein:
      the start scene classification information being scene classification information corresponding to the start video frame in the intercepted video data,
      the annotated media data includes the start video frame in the intercepted video data, and
      a ratio between a quantity of video frames in the annotated media data having scene classification information equal to the start scene classification information and the total quantity of video frames in the intercepted video data is greater than or equal to the ratio threshold; and
   sharing the annotated media data with a second user of the video application in response to a confirmation operation performed on the annotated media data by the first user of the video application, wherein the annotated media data enables the second user to perform a progress jump on the target video data based on the current progress time point.

2. The method according to claim 1, wherein the displaying annotated media data in the video application in response to a trigger operation performed by a first user of the video application on a progress time point annotation function in the video application comprises:
   displaying a media image interception control associated with the progress time point annotation function on a video playback interface of the video application; and
   intercepting annotated image data from the target video data in an image annotation area of the video application at the current progress time point in response to a trigger operation performed on the media image interception control.

3. The method according to claim 1, wherein the displaying annotated media data in the video application in response to a trigger operation performed by a first user of the video application on a progress time point annotation function in the video application comprises:
   displaying a media text interception control associated with the progress time point annotation function on a video playback interface of the video application;
   displaying annotated text data in a text annotation area of the video application at the current progress time point in response to a trigger operation performed on the media text interception control; and
   displaying comment media data in the text annotation area in response to an input operation performed by the first user of the video application on the text annotation area.

4. The method according to claim 3, wherein the displaying annotated text data in a text annotation area of the video application at the current progress time point in response to a trigger operation performed on the media text interception control comprises:
   transmitting a progress time point annotation instruction to a video player at the current progress time point in response to the trigger operation performed on the media text interception control;
   obtaining progress time point information corresponding to a playback progress of the target video data from the video player; and displaying the annotated text data corresponding to the progress time point information in the text annotation area of the video application.

5. The method according to claim 1, wherein the displaying annotated media data in the video application in response to a trigger operation performed by a first user of the video application on a progress time point annotation function in the video application comprises:

displaying a media video interception control associated with the progress time point annotation function on a video playback interface of the video application; and displaying annotated video data in a video annotation area of the video application at a triggered progress time point in response to a trigger operation performed on the media video interception control, the annotated video data being started according to the current progress time point.

6. The method according to claim 1, wherein the displaying annotated media data in the video application in response to a trigger operation performed by a first user of the video application on a progress time point annotation function in the video application comprises:

displaying a comment display control associated with the progress time point annotation function on a video playback interface of the video application;

displaying a comment display area on the video playback interface in response to a trigger operation performed on the comment display control, the comment display area comprising a comment input area;

displaying a media annotation area on the video playback interface in response to a trigger operation performed on the comment input area, the media annotation area comprising a media annotation control; and displaying the annotated media data in the media annotation area in response to a trigger operation performed on the media annotation control.

7. The method according to claim 1, further comprising:

displaying the shared annotated media data on a media data display interface of the video application; and performing a progress jump on the target video data in the video application based on the current progress time point in response to a trigger operation performed on the shared annotated media data.

8. A computer device comprising: a processor and a memory, the processor being connected to memory, the memory being configured to store a computer program, and the processor being configured to call the computer program, to cause the computer device to perform a method for annotating video data including:

displaying target video data in a video application;

displaying annotated media data in the video application at a triggered progress time point in response to a trigger operation performed by a first user of the video application on a progress time point annotation function in the video application, the annotated media data indicating a current progress time point of the target video data corresponding to the trigger operation, including:

obtaining intercepted video data having an interception duration from the target video data, a progress time point of a start video frame in the intercepted video data being equal to the triggered progress time point;

in accordance with a determination that a ration between a quantity of video frames in the intercepted video data having scene classification information equal to start scene classification information and a total quantity of video frames in the intercepted video data is less than a ratio threshold, obtaining the annotated media data having the interception duration from the target video data based on the start scene classification information and the start video frame in the intercepted video data, wherein:

the start scene classification information being scene classification information corresponding to the start video frame in the intercepted video data, the annotated media data includes the start video frame in the intercepted video data, and a ratio between a quantity of video frames in the annotated media data having scene classification information equal to the start scene classification information and the total quantity of video frames in the intercepted video data is greater than or equal to the ratio threshold; and sharing the annotated media data with a second user of the video application in response to a confirmation operation performed on the annotated media data by the first user of the video application, wherein the annotated media data enables the second user to perform a progress jump on the target video data based on the current progress time point.

9. The computer device according to claim 8, wherein the displaying annotated media data in the video application in response to a trigger operation performed by a first user of the video application on a progress time point annotation function in the video application comprises:

displaying a media image interception control associated with the progress time point annotation function on a video playback interface of the video application; and intercepting annotated image data from the target video data in an image annotation area of the video application at the current progress time point in response to a trigger operation performed on the media image interception control.

10. The computer device according to claim 8, wherein the displaying annotated media data in the video application in response to a trigger operation performed by a first user of the video application on a progress time point annotation function in the video application comprises:

displaying a media text interception control associated with the progress time point annotation function on a video playback interface of the video application;

displaying annotated text data in a text annotation area of the video application at the current progress time point in response to a trigger operation performed on the media text interception control; and displaying comment media data in the text annotation area in response to an input operation performed by the first user of the video application on the text annotation area.

11. The computer device according to claim 10, wherein the displaying annotated text data in a text annotation area of the video application at the current progress time point in response to a trigger operation performed on the media text interception control comprises:

transmitting a progress time point annotation instruction to a video player at the current progress time point in response to the trigger operation performed on the media text interception control;

obtaining progress time point information corresponding to a playback progress of the target video data from the video player; and displaying the annotated text data corresponding to the progress time point information in the text annotation area of the video application.

12. The computer device according to claim 8, wherein the displaying annotated media data in the video application in response to a trigger operation performed by a first user of the video application on a progress time point annotation function in the video application comprises:

displaying a media video interception control associated with the progress time point annotation function on a video playback interface of the video application; and displaying annotated video data in a video annotation area of the video application at a triggered progress time point in response to a trigger operation performed on the media video interception control, the annotated video data being started according to the current progress time point.

13. The computer device according to claim 8, wherein the displaying annotated media data in the video application in response to a trigger operation performed by a first user of the video application on a progress time point annotation function in the video application comprises:

displaying a comment display control associated with the progress time point annotation function on a video playback interface of the video application;

displaying a comment display area on the video playback interface in response to a trigger operation performed on the comment display control, the comment display area comprising a comment input area;

displaying a media annotation area on the video playback interface in response to a trigger operation performed on the comment input area, the media annotation area comprising a media annotation control; and displaying the annotated media data in the media annotation area in response to a trigger operation performed on the media annotation control.

14. The computer device according to claim 8, wherein the method further comprises:

displaying the shared annotated media data on a media data display interface of the video application; and performing a progress jump on the target video data in the video application based on the current progress time point in response to a trigger operation performed on the shared annotated media data.

15. A non-transitory computer-readable storage medium, having a computer program stored therein, the computer program being adapted to be loaded and executed by a processor of a computer device, to cause the computer device to perform a method for annotating video data including:

displaying target video data in a video application;

displaying annotated media data in the video application at a triggered progress time point in response to a trigger operation performed by a first user of the video application on a progress time point annotation function in the video application, the annotated media data indicating a current progress time point of the target video data corresponding to the trigger operation, including:

obtaining intercepted video data having an interception duration from the target video data, a progress time point of a start video frame in the intercepted video data being equal to the triggered progress time point;

in accordance with a determination that a ration between a quantity of video frames in the intercepted video data having scene classification information equal to start scene classification information and a total quantity of video frames in the intercepted video data is less than a ratio threshold, obtaining the annotated media data having the interception duration from the target video data based on the start scene classification information and the start video frame in the intercepted video data, wherein:

the start scene classification information being scene classification information corresponding to the start video frame in the intercepted video data, the annotated media data includes the start video frame in the intercepted video data, and a ratio between a quantity of video frames in the annotated media data having scene classification information equal to the start scene classification information and the total quantity of video frames in the intercepted video data is greater than or equal to the ratio threshold; and sharing the annotated media data with a second user of the video application in response to a confirmation operation performed on the annotated media data by the first user of the video application, wherein the annotated media data enables the second user to perform a progress jump on the target video data based on the current progress time point.

16. The non-transitory computer-readable storage medium according to claim 15, wherein the displaying annotated media data in the video application in response to a trigger operation performed by a first user of the video application on a progress time point annotation function in the video application comprises:

displaying a media image interception control associated with the progress time point annotation function on a video playback interface of the video application; and intercepting annotated image data from the target video data in an image annotation area of the video application at the current progress time point in response to a trigger operation performed on the media image interception control.

17. The non-transitory computer-readable storage medium according to claim 15, wherein the displaying annotated media data in the video application in response to a trigger operation performed by a first user of the video application on a progress time point annotation function in the video application comprises:

displaying a media text interception control associated with the progress time point annotation function on a video playback interface of the video application;

displaying annotated text data in a text annotation area of the video application at the current progress time point in response to a trigger operation performed on the media text interception control; and displaying comment media data in the text annotation area in response to an input operation performed by the first user of the video application on the text annotation area.

18. The non-transitory computer-readable storage medium according to claim 15, wherein the displaying annotated media data in the video application in response to a trigger operation performed by a first user of the video application on a progress time point annotation function in the video application comprises:

displaying a media video interception control associated with the progress time point annotation function on a video playback interface of the video application; and displaying annotated video data in a video annotation area of the video application at a triggered progress time point in response to a trigger operation performed on the media video interception control, the annotated video data being started according to the current progress time point.

19. The non-transitory computer-readable storage medium according to claim 15, wherein the displaying annotated media data in the video application in response to a trigger operation performed by a first user of the video application on a progress time point annotation function in the video application comprises:

displaying a comment display control associated with the progress time point annotation function on a video playback interface of the video application;

displaying a comment display area on the video playback interface in response to a trigger operation performed on the comment display control, the comment display area comprising a comment input area;

displaying a media annotation area on the video playback interface in response to a trigger operation performed on the comment input area, the media annotation area comprising a media annotation control; and displaying the annotated media data in the media annotation area in response to a trigger operation performed on the media annotation control.

20. The non-transitory computer-readable storage medium according to claim 15, wherein the method further comprises:

displaying the shared annotated media data on a media data display interface of the video application; and performing a progress jump on the target video data in the video application based on the current progress time point in response to a trigger operation performed on the shared annotated media data.

* * * * *